(12) United States Patent
Palumbo et al.

(10) Patent No.: US 12,374,709 B2
(45) Date of Patent: Jul. 29, 2025

(54) SOFC-CONDUCTION

(71) Applicant: UPSTART POWER, INC., Southborough, MA (US)

(72) Inventors: Nathan Palumbo, West Boylston, MA (US); Paul Osenar, Boxborough, MA (US); Matthew Otis, Allston, MA (US); James Pilczak, Grafton, MA (US)

(73) Assignee: UPSTART POWER, INC., Southborough, MA (US)

( * ) Notice: Subject to any disclaimer, the term of this patent is extended or adjusted under 35 U.S.C. 154(b) by 109 days.

(21) Appl. No.: 17/631,916

(22) PCT Filed: Aug. 14, 2020

(86) PCT No.: PCT/US2020/046458
§ 371 (c)(1),
(2) Date: Feb. 1, 2022

(87) PCT Pub. No.: WO2021/030728
PCT Pub. Date: Feb. 18, 2021

(65) Prior Publication Data
US 2022/0285716 A1 Sep. 8, 2022

Related U.S. Application Data

(60) Provisional application No. 62/886,406, filed on Aug. 14, 2019.

(51) Int. Cl.
*H01M 8/2475* (2016.01)
*H01M 8/04007* (2016.01)
(Continued)

(52) U.S. Cl.
CPC ..... *H01M 8/1231* (2016.02); *H01M 8/04022* (2013.01); *H01M 8/04067* (2013.01);
(Continued)

(58) Field of Classification Search
CPC .. H01M 8/2483; H01M 8/2475; H01M 8/243; H01M 8/004; H01M 8/04067; H01M 8/04014; H01M 2008/1293
See application file for complete search history.

(56) References Cited

U.S. PATENT DOCUMENTS

| 3,162,411 A | 12/1964 | Duggan |
| 3,224,187 A | 12/1965 | Breihan |

(Continued)

FOREIGN PATENT DOCUMENTS

| CN | 102619624 A | 8/2012 |
| CN | 104205455 A | 12/2014 |

(Continued)

OTHER PUBLICATIONS

Final Office Action in KR application No. 10-2018-7014225, dated Feb. 2, 2023, 9 pages (English Translation).

(Continued)

*Primary Examiner* — Miriam Stagg
*Assistant Examiner* — Brent C Thomas
(74) *Attorney, Agent, or Firm* — DAY PITNEY LLP; George N. Chaclas

(57) ABSTRACT

A solid oxide fuel cell (SOFC) system includes high thermal conductivity materials such as copper to increase thermal energy transfer by thermal conduction. The copper is protected from oxidation by nickel electroplating and protected from thermal damage by providing oxidation resistant liners inside combustion chambers.

19 Claims, 21 Drawing Sheets

(51) Int. Cl.
  *H01M 8/04014*    (2016.01)
  *H01M 8/04223*    (2016.01)
  *H01M 8/04225*    (2016.01)
  *H01M 8/0432*     (2016.01)
  *H01M 8/04746*    (2016.01)
  *H01M 8/0612*     (2016.01)
  *H01M 8/1231*     (2016.01)
  *H01M 8/243*      (2016.01)
  *H01M 8/2483*     (2016.01)
  *H01M 8/12*       (2016.01)

(52) U.S. Cl.
  CPC ... *H01M 8/04225* (2016.02); *H01M 8/04268* (2013.01); *H01M 8/04365* (2013.01); *H01M 8/04753* (2013.01); *H01M 8/04761* (2013.01); *H01M 8/04776* (2013.01); *H01M 8/0618* (2013.01); *H01M 8/243* (2013.01); *H01M 8/2475* (2013.01); *H01M 8/2483* (2016.02); *H01M 2008/1293* (2013.01)

(56) References Cited

U.S. PATENT DOCUMENTS

| | | |
|---|---|---|
| 3,372,960 A | 3/1968 | Fisher |
| 4,656,689 A | 4/1987 | Dennis |
| 4,910,100 A | 3/1990 | Nakanishi et al. |
| 4,997,726 A | 3/1991 | Akiyama et al. |
| 5,169,730 A | 12/1992 | Reichner et al. |
| 5,415,233 A | 5/1995 | Roussakis et al. |
| 5,501,472 A | 3/1996 | Brancher et al. |
| 5,732,440 A | 3/1998 | Wright |
| 5,733,675 A | 3/1998 | Dederer et al. |
| 5,750,278 A | 5/1998 | Gillett et al. |
| 5,827,620 A | 10/1998 | Kendall |
| 6,221,522 B1 | 4/2001 | Zafred et al. |
| 6,265,092 B1 | 7/2001 | Meltser et al. |
| 6,306,531 B1 | 10/2001 | Clingerman et al. |
| 6,358,640 B1 | 3/2002 | Kendall et al. |
| 6,458,477 B1 | 10/2002 | Hsu |
| 6,485,852 B1 | 11/2002 | Miller |
| 6,492,050 B1 | 12/2002 | Sammes |
| 6,514,468 B2 | 2/2003 | Decourcy et al. |
| 6,551,734 B1 | 4/2003 | Simpkins |
| 6,608,463 B1 | 8/2003 | Kelly et al. |
| 6,627,339 B2 | 9/2003 | Haltiner |
| 6,696,187 B2 | 2/2004 | Kendall et al. |
| 6,770,106 B1 | 8/2004 | Okamoto et al. |
| 6,824,907 B2 | 11/2004 | Sarkar et al. |
| 6,841,284 B2 | 1/2005 | Brown et al. |
| 7,001,682 B2 | 2/2006 | Haltiner |
| 7,008,711 B2 | 3/2006 | Pondo et al. |
| 7,014,822 B1 | 3/2006 | Shinke et al. |
| 7,150,931 B1 | 12/2006 | Jaffrey |
| 7,195,663 B2 | 3/2007 | Edlund et al. |
| 7,226,681 B2 | 6/2007 | Florence et al. |
| 7,235,321 B2 | 6/2007 | Sarkar et al. |
| 7,249,884 B2 | 7/2007 | Torii et al. |
| 7,252,902 B2 | 8/2007 | Bram et al. |
| 7,256,516 B2 | 8/2007 | Buchanan et al. |
| 7,335,432 B2 | 2/2008 | Koripella |
| 7,349,959 B2 | 3/2008 | Imamura et al. |
| 7,419,060 B2 | 9/2008 | Arthur et al. |
| 7,422,810 B2 | 9/2008 | Venkataraman et al. |
| 7,425,381 B2 | 9/2008 | Gilman et al. |
| 7,452,622 B2 | 11/2008 | Sarkar et al. |
| 7,645,535 B2 | 1/2010 | Rehg et al. |
| 7,655,337 B2 | 2/2010 | Kaye |
| 7,674,543 B2 | 3/2010 | Chiang et al. |
| 7,767,329 B2 | 8/2010 | Crumm et al. |
| 7,862,631 B2 | 1/2011 | Burch et al. |
| 7,875,403 B2 | 1/2011 | Finnerty |
| 7,887,959 B2 | 2/2011 | Gallet et al. |
| 7,897,292 B2 | 3/2011 | Schaevitz et al. |
| 7,943,263 B2 | 5/2011 | Brantley et al. |
| 8,026,011 B2 | 9/2011 | Ooshima et al. |
| 8,043,760 B2 | 10/2011 | Okamoto et al. |
| 8,071,251 B2 | 12/2011 | Eshraghi et al. |
| 8,133,622 B2 | 3/2012 | Park et al. |
| 8,163,433 B2 | 4/2012 | Zafred et al. |
| 8,178,256 B2 | 5/2012 | Ogawa et al. |
| 8,179,249 B2 | 5/2012 | Teramoto |
| 8,188,382 B2 | 5/2012 | Monden et al. |
| 8,197,249 B1 | 6/2012 | Nguyen |
| 8,197,976 B2 | 6/2012 | Poshusta et al. |
| 8,273,485 B2 | 9/2012 | Schaevitz et al. |
| 8,304,122 B2 | 11/2012 | Poshusta et al. |
| 8,343,684 B2 | 1/2013 | Devoe et al. |
| 8,377,604 B2 | 2/2013 | Nakajima et al. |
| 8,389,180 B2 | 3/2013 | Hawkes et al. |
| 8,530,114 B2 | 9/2013 | Kirkwood |
| 8,580,452 B2 | 11/2013 | Yaguchi et al. |
| 8,614,023 B2 | 12/2013 | Poshusta et al. |
| 8,628,891 B2 | 1/2014 | Brown et al. |
| 8,652,707 B2 | 2/2014 | Finnerty et al. |
| 8,658,327 B2 | 2/2014 | Mook et al. |
| 8,714,563 B2 | 5/2014 | Yamamoto et al. |
| 8,715,879 B2 | 5/2014 | Devoe et al. |
| 8,854,389 B2 | 10/2014 | Wong et al. |
| 8,890,474 B2 | 11/2014 | Kim et al. |
| 9,056,768 B2 | 6/2015 | Langan |
| 9,065,159 B2 | 6/2015 | Chan et al. |
| 9,105,917 B2 | 8/2015 | Kuehn et al. |
| 9,190,673 B2 | 11/2015 | Venkataraman et al. |
| 9,343,758 B2 | 5/2016 | Poshusta et al. |
| 9,452,475 B2 | 9/2016 | Armstrong et al. |
| 9,500,116 B2 | 11/2016 | Foos et al. |
| 9,559,364 B2 | 1/2017 | Wood et al. |
| 9,722,435 B2 | 8/2017 | Park |
| 9,831,043 B2 | 11/2017 | Roumi et al. |
| 9,863,557 B2 | 1/2018 | Haynes et al. |
| 10,446,858 B2 | 10/2019 | Palumbo et al. |
| 11,108,072 B2 | 8/2021 | Palumbo et al. |
| 2001/0041159 A1 | 11/2001 | Tamhankar et al. |
| 2002/0081253 A1 | 6/2002 | Abe |
| 2003/0054215 A1 | 3/2003 | Doshi et al. |
| 2003/0064612 A1 | 4/2003 | England et al. |
| 2004/0005268 A1 | 1/2004 | Bruck et al. |
| 2004/0081872 A1 | 4/2004 | Herman et al. |
| 2004/0086765 A1 | 5/2004 | Florence et al. |
| 2005/0053531 A1 | 3/2005 | Sakurai et al. |
| 2005/0053819 A1 | 3/2005 | Paz |
| 2005/0081444 A1 | 4/2005 | Anumakonda et al. |
| 2005/0089465 A1 | 4/2005 | Anumakonda et al. |
| 2005/0118482 A1 | 6/2005 | Sriramulu et al. |
| 2005/0217991 A1 | 10/2005 | Dahlquist |
| 2005/0269234 A1 | 12/2005 | Gore et al. |
| 2006/0051261 A1 | 3/2006 | Rong et al. |
| 2006/0127725 A9 | 6/2006 | Sarkar et al. |
| 2006/0137246 A1 | 6/2006 | Kumar et al. |
| 2006/0153273 A1 | 7/2006 | Torii et al. |
| 2006/0153751 A1 | 7/2006 | Tonkovich et al. |
| 2006/0263665 A1 | 11/2006 | Schaevitz et al. |
| 2007/0243444 A1 | 4/2007 | Zheng |
| 2007/0099065 A1 | 5/2007 | Rawson et al. |
| 2007/0111069 A1 | 5/2007 | Rehg et al. |
| 2007/0137104 A1 | 6/2007 | Kamijo et al. |
| 2007/0141424 A1 | 6/2007 | Armstrong et al. |
| 2007/0231593 A1 | 10/2007 | Ryu et al. |
| 2007/0237998 A1 | 10/2007 | Armstrong et al. |
| 2008/0118803 A1 | 5/2008 | Dekker et al. |
| 2008/0211226 A1 | 9/2008 | Whitney |
| 2009/0044971 A1 | 2/2009 | Kataoka et al. |
| 2009/0050680 A1 | 2/2009 | Martin et al. |
| 2009/0142639 A1 | 6/2009 | Gregorski |
| 2009/0202878 A1 | 8/2009 | Schild |
| 2009/0311570 A1 | 12/2009 | Chou et al. |
| 2010/0001689 A1 | 1/2010 | Hultman et al. |
| 2010/0018215 A1 | 1/2010 | Razi et al. |
| 2010/0044971 A1 | 2/2010 | Henry |
| 2010/0104902 A1 | 4/2010 | Ogawa et al. |
| 2010/0305762 A1 | 12/2010 | Chan et al. |
| 2010/0329940 A1 | 12/2010 | Takahashi et al. |
| 2012/0077095 A1 | 3/2012 | Roumi et al. |

(56) References Cited

U.S. PATENT DOCUMENTS

| | | |
|---|---|---|
| 2012/0178003 A1 | 7/2012 | Venkataraman et al. |
| 2013/0040216 A1 | 2/2013 | Poshusta et al. |
| 2013/0216473 A1 | 8/2013 | Florian |
| 2013/0230644 A1 | 9/2013 | Armstrong et al. |
| 2014/0106246 A1 | 4/2014 | Poshusta et al. |
| 2014/0140919 A1 | 5/2014 | Langan |
| 2015/0004528 A1 | 1/2015 | Palumbo et al. |
| 2015/0086887 A1* | 3/2015 | Matsuo ............ H01M 8/0252 429/423 |
| 2015/0144841 A1 | 5/2015 | Finnerty et al. |
| 2015/0249256 A1 | 9/2015 | Devoe et al. |
| 2015/0357655 A1 | 12/2015 | Choi et al. |
| 2016/0099476 A1 | 4/2016 | Palumbo et al. |
| 2016/0156041 A1 | 6/2016 | Wood et al. |
| 2017/0110748 A1 | 4/2017 | Palumbo et al. |
| 2018/0191009 A1* | 7/2018 | Palumbo ........... H01M 8/04365 |
| 2018/0366741 A1 | 12/2018 | Devoe et al. |
| 2019/0181482 A1 | 6/2019 | Palumbo et al. |

FOREIGN PATENT DOCUMENTS

| | | |
|---|---|---|
| CN | 105706282 B | 6/2016 |
| CN | 106797044 B | 7/2020 |
| CN | 108649245 B | 12/2020 |
| CN | 109845009 B | 10/2022 |
| DE | 102007046297 B4 | 12/2016 |
| EP | 1202366 A2 | 5/2002 |
| EP | 1966850 A2 | 9/2008 |
| JP | 2003501796 A | 1/2003 |
| JP | 2006019119 B2 | 1/2006 |
| JP | 200759377 A | 3/2007 |
| JP | 2007506256 A | 3/2007 |
| JP | 2008243589 A | 10/2008 |
| JP | 2009140695 A | 6/2009 |
| JP | 2009217959 A | 9/2009 |
| JP | 2009231172 A | 10/2009 |
| JP | 2010140656 A | 6/2010 |
| JP | 2011129280 A1 | 6/2011 |
| JP | 2012099348 A | 5/2012 |
| JP | 2011129280 A | 2/2014 |
| JP | 2014222123 A | 11/2014 |
| JP | 2016091867 A | 5/2016 |
| JP | 201818701 A | 2/2018 |
| JP | 2018532680 A | 11/2018 |
| JP | 2019110059 A2 | 7/2019 |
| WO | 2002/05368 A1 | 1/2002 |
| WO | 2007/076440 A2 | 7/2007 |
| WO | 2007110587 A2 | 10/2007 |
| WO | 2011/113280 A1 | 9/2011 |
| WO | 2013/088122 A1 | 6/2013 |
| WO | 2015/069749 A2 | 5/2015 |
| WO | 2016/057026 A1 | 4/2016 |
| WO | 2018/031742 A1 | 2/2018 |

OTHER PUBLICATIONS

First Examiner's Report in CA application No. 3,077,312, dated Sep. 21, 2022, 3 pages.
First JP Office Action in corresponding application No. 2020-545482, dated Nov. 2, 2022, 4 pages (English Translation).
JP Office Action in corresponding application No. 2019-529144 dated Mar. 2, 2022, 12 pages (English Translation).
JP Office Action in corresponding application No. 2019-529144, dated Oct. 4, 2022, 1 page (English Translation).
JP Office Action in corresponding JP application No. 2019-529144 dated Jul. 1, 2021, 5 pages (English Translation).
International Search Report issued in corresponding international patent application No. PCT/US2020/046458, mailed Jan. 6, 2021, 4 pages.
Written Opinion issued in corresponding international patent application No. PCT/US2020/046458, mailed Jan. 6, 2021, 7 pages.
CN First Office Action in corresponding Application No. 202080067906. 9, dated Jun. 8, 2023, 11 pages. (English translation unavailable).
ENrG Incorporated, HEXIM—Improved Thermal Management of SOFC, MCFC, PEM, and HTPEM Fuel Cell and Reformer Systems, Apr. 6, 2014, 1 page.
European Search Report for European Patent Application No. 14903601.4, dated Oct. 23, 2018, 4 pages.
International Search Report and Written Opinion for PCT International Application No. PCT/US2014/059447 dated Jun. 30, 2015, 14 pages.
K. Burke et al., "Development of Passive Fuel Cell Thermal Management Materials", May 12, 2009, 13 pages.
Singapore Search and Examination Report dated Nov. 20, 2017 for Singapore Patent Application No. 11201702330X, 6 pages.
Baukal Jr., The John Zink Hamworthy Combustion Handbook, Second Edition; vol. 3, Applications, 2013, pp. 321-322, vol. 3, ISBN; 1439839662, CRC Press.
Flash Back and Flame Arrestors, International Industrial Gases Ltd., 7 pages (Date Unknown).
HHO 3/8" Flashback Arrestor Hydrogen Fuel Cell Generator Flash Flame Browns Gas, eBay Jan. 19, 2015, 3 pages.
International Search Report for Application No. PCT/US2017/046246 dated Dec. 14, 2017, 6 pages.
International Search Report for Application No. PCT/US2017/055554 dated Dec. 14, 2017, 7 pages.
Lessing, A review of sealing technologies applicable to solid oxide electrolysis cells, Journal of Materials Science, 2007, pp. 3465-3476, vol. 42, No. 10.
M.K. Mahapatra et al., "Glass-based seals for solid oxide fuel and electrolyzer cells—A review", Materials Science and Engineering R, 67 (2010), pp. 65-85.
International Search Report and Written Opinion for International PCT Application No. PCT/US2019/019183, dated May 2, 2019, 13 pages.
International Preliminary Report on Patentability for PCT Application No. PCT/US2019/019183, dated Sep. 10, 2020, 10 pages.
Office Action issued in corresponding Canadian patent application No. 3,072,005, mailed Dec. 9, 2021, 4 pages.
European Search Report for European patent application No. 17840258, dated Feb. 20, 2020, 5 pages.
Baukal Jr., The John Zink Hamworthy Combustion Handbook, Second Edition, Applications, 2013, pp. 321-322, vol. 3, ISBN 1439839662, CRC Press.
SG Search Report and Written Opinion corresponding to Application No. 11202201183S, dated Aug. 19, 2024, 13 pages.
JP Notice of Refusal corresponding to Application No. 2022-508536, dated Sep. 27, 2024, 5 pages (English Translation).

* cited by examiner

FUEL FLOW DIAGRAM

AIR FLOW DIAGRAM

Detail of wall
2075

Detail of wall
2175

Detail of wall
2170

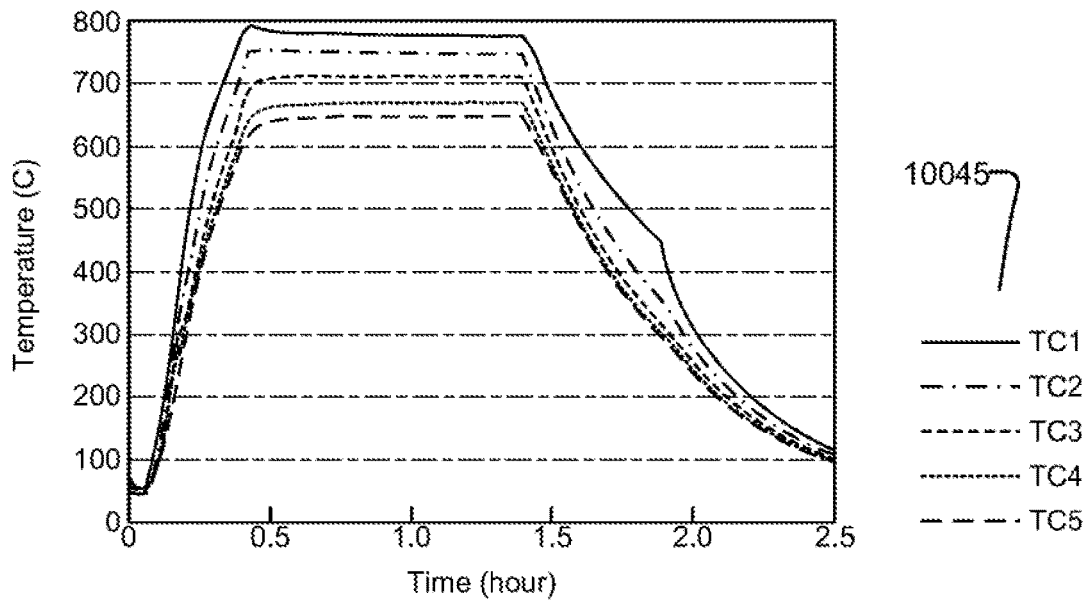
FIGURE 11A – SOFC stack (10005) temperature vs time when operated in first test condition without a thermally conductive core
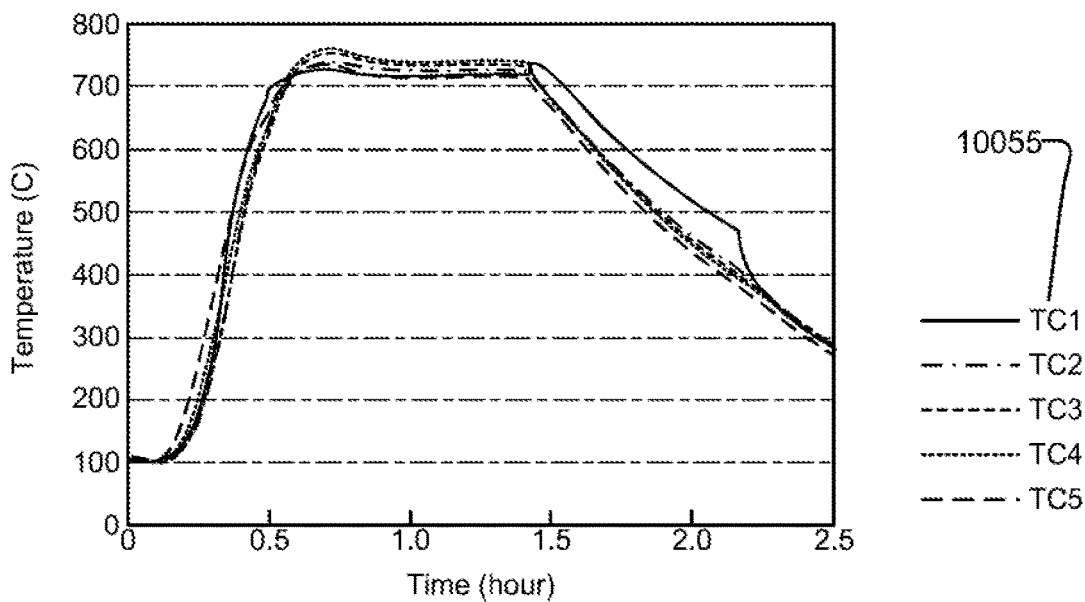
FIGURE 11B – SOFC stack (10005) temperature vs time when operated in second test condition with thermally conductive core (8200)

SOFC-CONDUCTION

1 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: © 2020 Upstate Power Inc.

2 BACKGROUND OF THE TECHNOLOGY

2.1 Field of the Technology

The exemplary, illustrative, technology herein relates to Solid Oxide Fuel Cell (SOFC) systems, methods of use, and methods of manufacturing SOFC systems. In particular, the exemplary, illustrative technology relates to improved systems and methods for thermal energy management within the SOFC system.

2.2 The Related Art

A conventional SOFC system includes a hot zone, which contains or at least partially encloses system components that are maintained at higher operating temperatures, e.g. above 350 or 500° C., during operation, depending on the SOFC technology. The hot zone houses a SOFC energy generator or solid oxide fuel cell stack. Conventional SOFC fuel cell stacks are formed by one or more fuel cells with each cell participating in an electro-chemical reaction that generates an electrical current. The fuel cells are electrically interconnected in series or in parallel as needed to provide a desired output voltage of the cell stack. Each fuel cell includes three primary layers, an anode layer or fuel electrode, a cathode layer or air electrode and an electrolyte layer that separates the anode layer from the cathode layer.

The anode layer is exposed to a gaseous or vaporous fuel that at least contains hydrogen gas ($H_2$) and/or carbon monoxide (CO). At the same time the cathode layer is exposed to a cathode gas such as air or any other gas or vaporous oxygen ($O_2$) source. In the cathode layer oxygen (air) supplied to the cathode layer receives electrons to become oxygen ions ($O^{-2}$). The oxygen ions pass from the cathode layer to the anode layer through the ceramic electrolyte layer. At the triple phase boundary, in the anode layer, hydrogen ($H_2$) and/or carbon monoxide (CO) supplied to the anode layer by the fuel react with oxide ions to produce water and carbon dioxide and electrons emitted during this reaction produce electricity and heat. Other reaction by products in the fuel stream may include methane, ethane or ethylene. The electricity produced by the electro-chemical reaction is extracted to DC power terminals to power an electrical load.

Common anode materials include cermets such as nickel and doped zirconia (Ni-YSZ), nickel and doped ceria (Ni-SDC and or Ni-GDC), copper and doped ceria. Perovskite anode materials such as $La_{0.75}Sr_{0.25}Cr_{0.5}Mn_{0.5}O_{3-\delta}$ (LSCM) and other $ABO_3$ structures are also usable. Common cathode materials include Lanthanum Strontium Cobalt Oxide (LSC), Lanthanum Strontium Cobalt Iron Oxide (LSCF) and Lanthanum Strontium Manganite (LSM). The electrolyte layer is an ion conducting ceramic, usually an oxygen ion conductor such as yttria doped zirconia or gadolinium doped ceria. Alterably the electrolyte layer is a proton conducting ceramic such as barium cerates or barium ziconates. The electrolyte layer acts as a near hermetic barrier to prevent the fuel and air from mixing and combusting.

Conventional SOFC systems use cross flow or parallel flow heat exchangers, commonly referred to as recuperators, to heat cathode gasses (air) entering the SOFC system. The gas flow heat exchangers heat cool air entering the hot zone by exchanging thermal energy between the cool entering air and hot exhaust gas exiting the hot zone. Air to air cross flow heat exchangers are inefficient as compared with thermal energy transfer by thermal conduction. Conventional SOFC power generating systems largely rely on incoming cathode air flow to manage thermal energy distribution. However, the cathode air flow rate is conventionally selected to redistribute thermal energy instead of optimizing a SOFC reaction. When selecting the cathode air volume rate (e.g., liters per second) or mass flow rate (e.g., kg/s) to optimize the SOFC reaction, the required volume or mass flow rates is significantly less than is required to redistribute thermal energy and in some cases thermal energy distribution requires 300% greater cathode air flow rates than would be required to for SOFC reaction. One consequence of using higher volume air flow rates in the SOFC system is a drop in power generation efficiency due to the energy required to move the excess air flow. In addition, the thermal energy used to heat the excessive air flow is not available to heat the SOFC stack and other surfaces, especially during start up.

In conventional SOFC systems, a recuperator or gas counter flow heat exchanger, is disposed to receive hot gases exiting from a tail gas combustion chamber and to receive cool gases entering into the SOFC system in counter flow conduits separated by a common wall. Again, convection and radiation are the dominant thermal energy transfer mechanisms as hot gases from the combustor heat conduit walls as they pass to an exit port and the conduit walls heat incoming air. In short, the thermal energy exchange both inside the tail gas combustor and inside the recuperator is not efficient. The result is that conventional SOFC systems are notoriously difficult to control and often develop hot spots, e.g. in the combustion enclosures, that can damage the enclosure walls even burning through walls when a combustion enclosure wall gets too hot. Alternately when the temperature of the SOFC system is lowered, e.g. by reducing a fuel input flow rate, and increasing an input cathode air flow rate to cool hot spots, the SOFC reaction is altered which often leads to undesirable operation such as reduced electrical power output, incomplete fuel processing which results in carbon formation on anode surfaces which ultimately leads to decreased electrical output and eventual failure.

To better address hot and cold spots conventional SOFC systems often include a plurality of thermocouples or thermistors disposed at various system points to monitor temperature and adjust operation in order to avoid hot spots and prevent cold spots. However, the temperature sensing and monitoring systems are costly and prone to failure due to the high operating temperatures of the SOFC systems (e.g. 350-1200° C. near the tail gas combustion chamber). Moreover, the need to modulate fuel input as a measure to avoid damaging the SOFC system leads to inefficient and variable electrical power output. Thus, there is a need in the art to avoid thermal gradients and eliminate hot spots in order to avoid damaging the SOFC system and in order to deliver more consistent electrical power output with improve power generation efficiency. Additionally, there is a need to provide a more efficient and passive method for thermal energy management in SOFC system that does not rely modifying fuel and air flow rates to manage thermal energy distribution, e.g. to reduce the temperature of hot spots.

Conventional SOFC systems use heat and corrosion resistant materials to survive the effects of extended operation at high temperatures and the severely corrosive environment which continuously oxidizes metal surfaces sometimes to the point of failure. Use of specialty high temperature corrosion resistant nickel-chromium alloys such as Inconel, Monel, Hastelloy or the like are commonly used in SOFC systems. However, while these materials perform well in the high temperature corrosion prone environment of SOFC power generator these material tend to have a very low coefficient of thermal conductivity, e.g. as compared to highly thermally conduct materials such as copper, aluminum, molybdenum or allows thereof. As an example, Inconel has a thermal conductivity ranging from 17-35 W/(m° K) over a temperature range of 150 to 875° C. as compared to copper which has a thermal conductivity approximately ranging from 370 W/(m° K) at 500° C. and 332 W/m° K at 1027° C. Thus, copper has a thermal conductivity that is more than 10 times the thermal conductivity of Inconel. While copper provides increased thermal conductivity over high temperature non-corrosive metal alloys, copper is highly susceptible to breakdown by oxidation at high temperatures and has thus far been avoided as a SOFC enclosure material.

3 BRIEF SUMMARY OF THE TECHNOLOGY

The present technology overcomes the problems associated with conventional SOFC systems by providing various embodiments of an improved SOFC system that includes configurations of a hot zone enclosure assembly (8042) formed with a U-shaped primary enclosure wall assembly (8045) and a hot zone enclosure assembly (12042) that includes two L-shaped primary enclosure wall assemblies (12045) as well as other hot zone enclosure assembly embodiments (14042, 15042) that utilizes one or more U-shaped and L-shaped primary enclosure wall assemblies. Each primary enclosure wall assembly is formed to enclose a SOFC stack (8005), a cathode chamber (8055, 12055) and a combustion region (8030) located above the fuel output end (8025) of each individual fuel cell. Each primary enclosure wall assembly includes a combustion region wall (8060, 12060) that is formed to bound the combustion region and at least one opposing primary enclosure sidewalls (8065, 8070, 12070) that each extends from an edge of the combustion region wall (8060, 12060) to the cathode input end of the individual fuel cells such that the SOFC stack is enclosed by the primary enclosure wall assembly along the input end (8020) at least along the full longitudinal length (x) of the SOFC stack.

Each primary enclosure wall (8060, 12060), (8065) and (8070, 12070) includes a thermally conductive core (8200) protected from oxidation by outer layers applied to exposed surfaces thereof. The thermally conductive core (8200) comprises one or more materials having a coefficient of thermal conductivity that is greater than 100 W/(m° K) and preferably greater than 200 W/(m° K). The thermally conductive core is formed from copper or molybdenum, or aluminum copper or a copper nickel alloy or a combination thereof. The thermally conductive core has a thickness in the range of 0.127 to 6.0 mm, (0.005 to 0.24 inches).

To prevent oxidation of the thermally conductive core (8200), each of the core portions (8205, 8210, 8215, 12010, 12015, 12017) is protected by a protective layer applied over or attached to exposed surfaces of the thermally conductive core. The protective layer may include nickel plating applied to surfaces of each core portion by an electro-plating process to a thickness of at least 0.0005 inches and ranging up to 0.002 inches. Alternately, or additionally, the protective layer comprises one or more metal sheets disposed in mating contact with exposed surfaces of each of the three core portions (8205), (8210, 12010) and (8215, 12015, 12017). The metal sheets are applied directly to uncoated surfaces of the thermally conductive core or are applied over electro-plated surfaces of the thermally conductive core. An inner protective sheet metal layer (8220) is fabricated as a U-shaped structure formed to attach to the inside surfaces of each of the three core portions (8205), (8210), (8215) with the inside surfaces of the inner protective layer (8220) face the SOFC stack. An outer protective layer (8250) comprises two substantially identical outer side wall portions (8255) and (8260) and an outer top portion (8265). The three outer protective layer portions, when joined together with each other, and joined together with corresponding outer surfaces of the thermally conductive core form a U-shaped sheet metal structure shaped to attach to and protect the outside surfaces of the thermally conductive core (8200) from exposure to oxygen rich cathode air flow. Preferably, the inside surfaces of the outer protective layer are in mating contact with corresponding outside surfaces of the thermally conductive core that face away from the SOFC stack. A second embodiment of the inner protective layer (12220) and an outer protective layer (12250) is also described herein.

Each wall portion of the inner protective layer and of the outer protective layer is fabricated from ferritic steel such as Alloy 18 SR® Stainless Steel, e.g. distributed by Rolled Metal Products, of Alsip, IL, US. The Alloy 18 SR® Stainless Steel is an aluminum stabilized ferritic stainless steel designed for high temperature applications with improved scaling and corrosion resistance which is achieved by the addition of aluminum in a range of 1.5 to 2.5 weight percent. The Alloy 18 SR® Stainless Steel is preferred because under operating temperatures and conditions of the SOFC system (8000) the added aluminum content advantageously forms a surface layer of aluminum oxide which prevents oxidation of exposed surfaces of the inner protective layer and of the outer protective layer, which prevents oxidation and prevents chromium from leaching from the Alloy 18 SR® Stainless Steel.

Each hot zone enclosure assembly (8042, 12042, 14042, 15042) optionally include end walls (8080, 8085) and a bottom wall (8075) that further enclose the cathode chamber (8055, 12055) or the cathode chamber is further enclosed by an intermediate enclosure (9000) which includes end walls (9020, 9025) and a bottom wall (9010). The end walls (8080, 8085) and a base wall (8075) may include a thermally conductive core configured with protective layers provided prevent oxidation damage to the core material.

4 BRIEF DESCRIPTION OF THE DRAWINGS

The features of the present technology will best be understood from a detailed description of the technology and example embodiments thereof selected for the purposes of illustration and shown in the accompanying drawings in which.

Figure 7A:
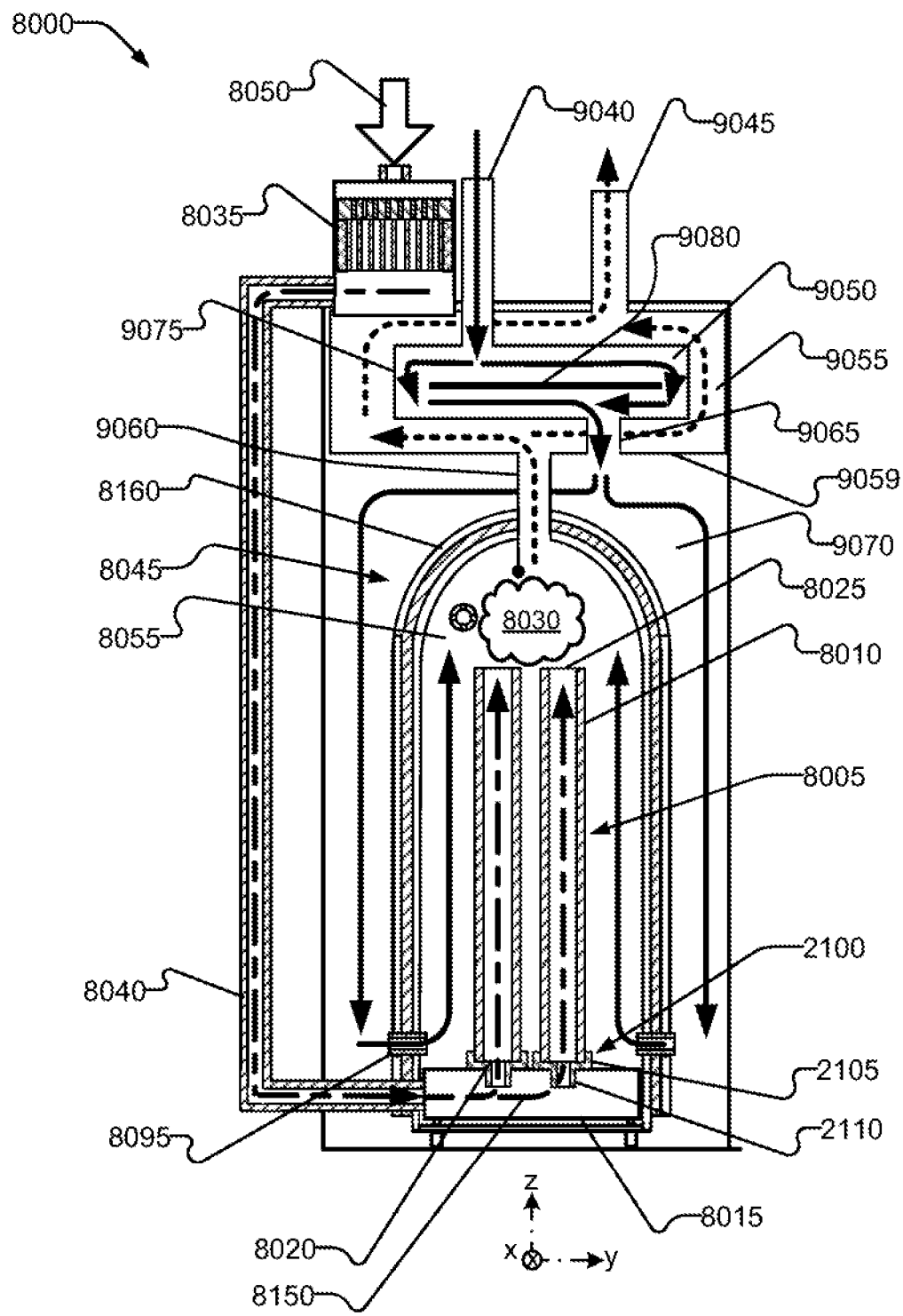

FIG. 7A schematically depicts a first improved fuel cell system that includes a first U-shaped primary enclosure wall assembly disposed over a single SOFC stack according to the present technology.

Figure 7B:
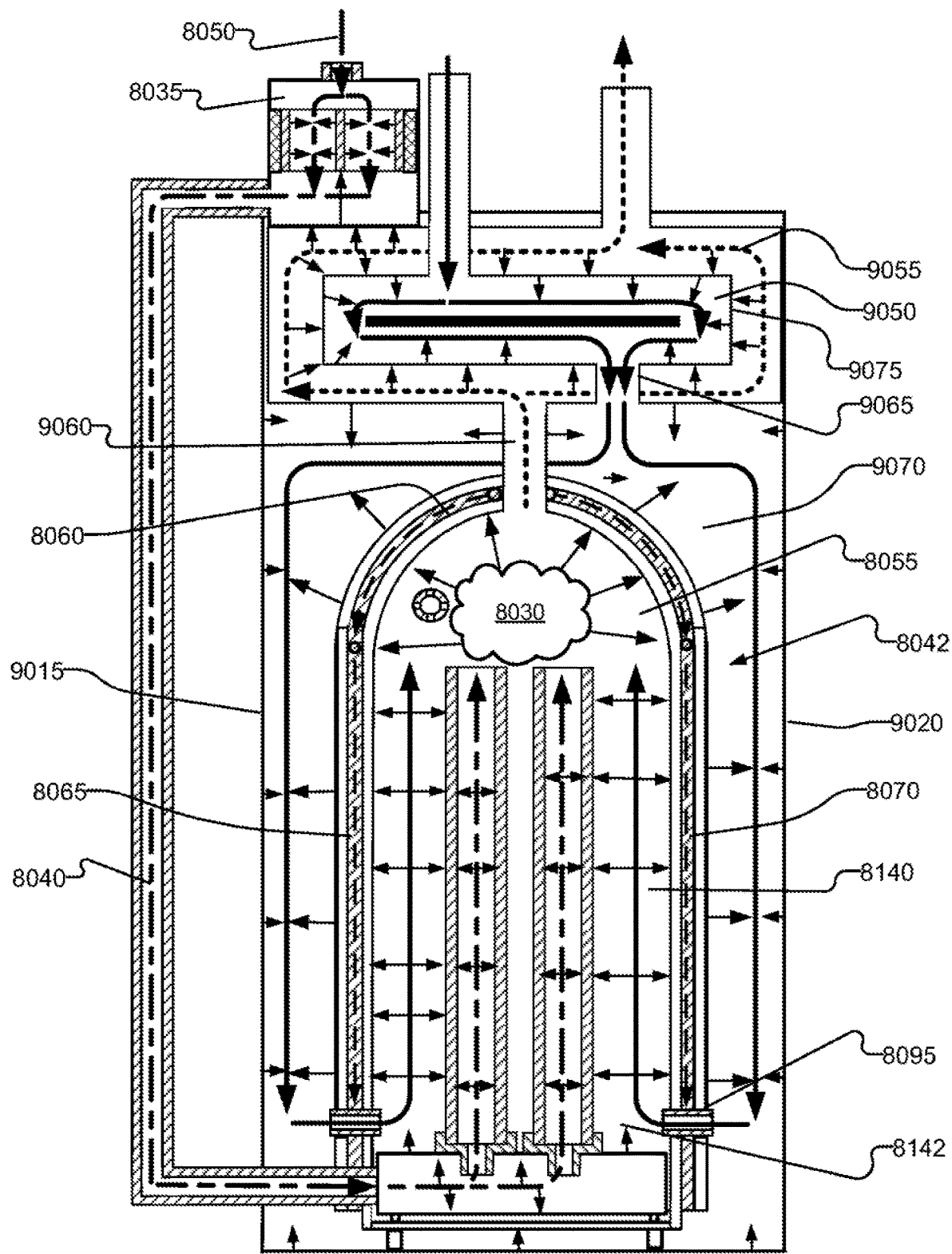

FIG. 7B schematically depicts the first improved fuel system of FIG. 7A with dashed lines with arrow heads showing syngas flow and thermally conductive heat flow through the U-shaped primary enclosure and with solid lines with arrow heads showing cathode gas flow and radiate emission from high temperature regions, according to the present technology.

Figure 8A:
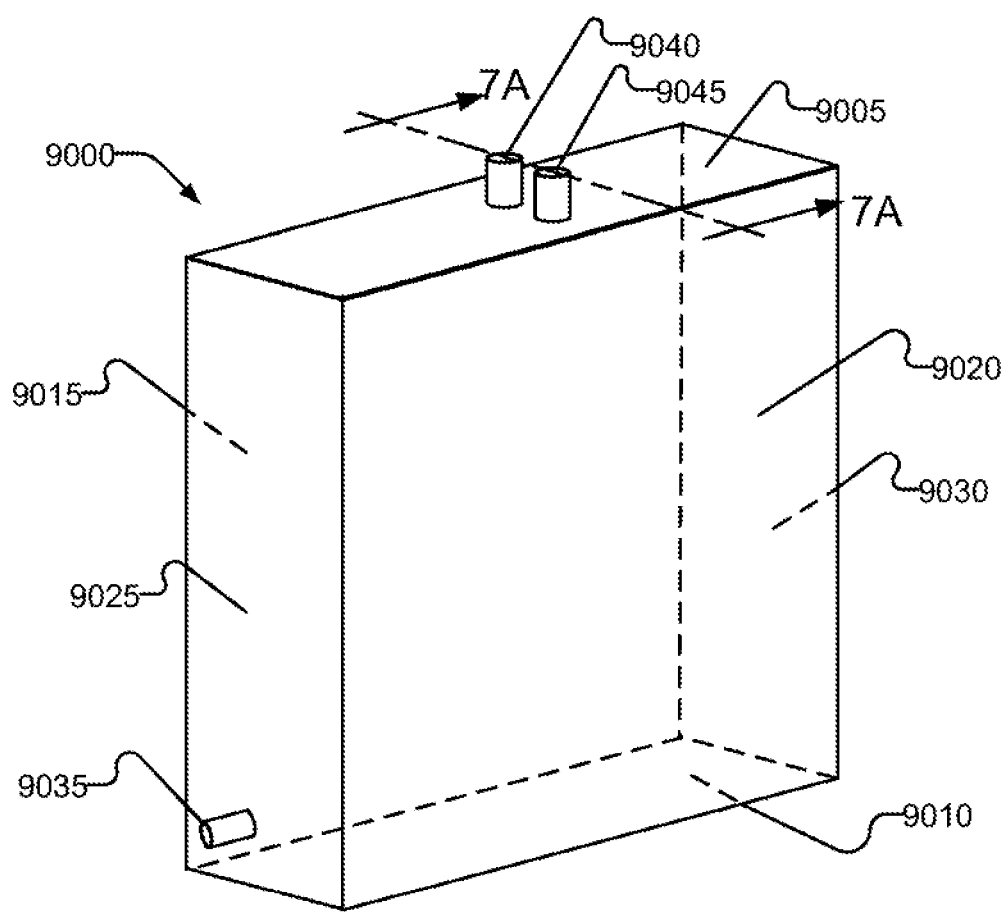

FIG. 8A depicts an isometric transparent view of an intermediate enclosure for a hot zone assembly according to the present technology.

Figure 8B:
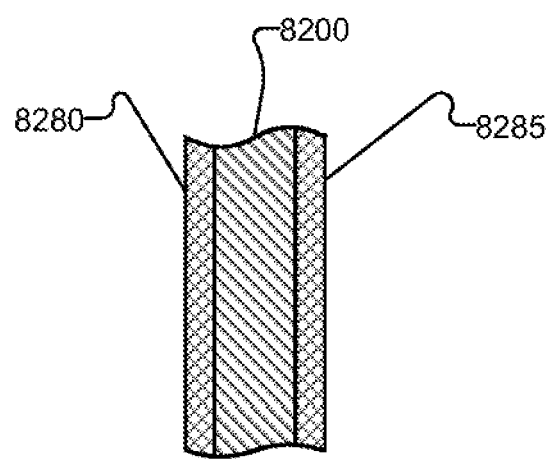

FIG. 8B depicts a section view taken through the primary enclosure wall assembly according to the present technology.

Figure 9A:
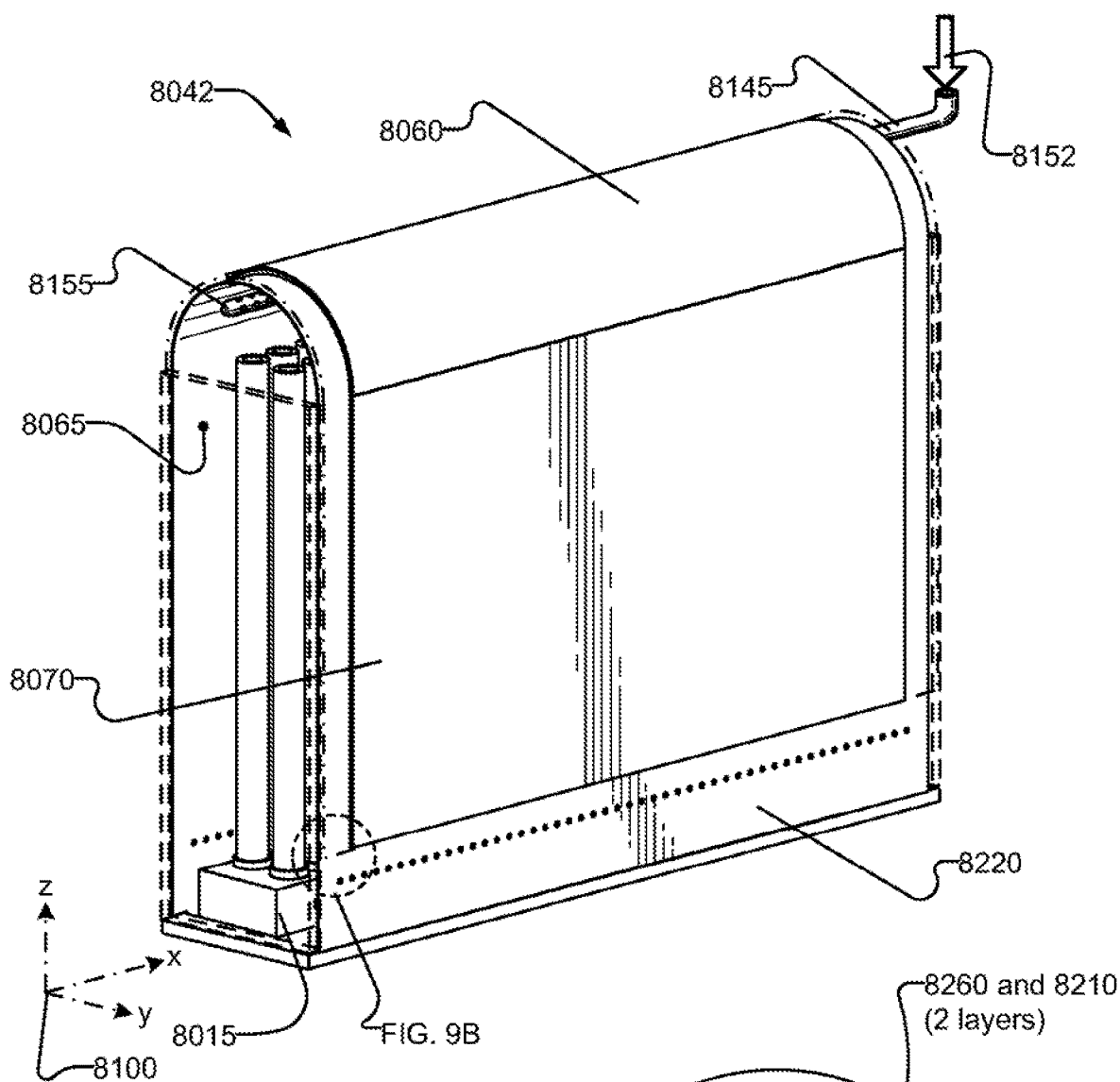

FIG. 9A depicts an isometric side view of an improved hot zone configuration according to the present technology.

Figure 9B:
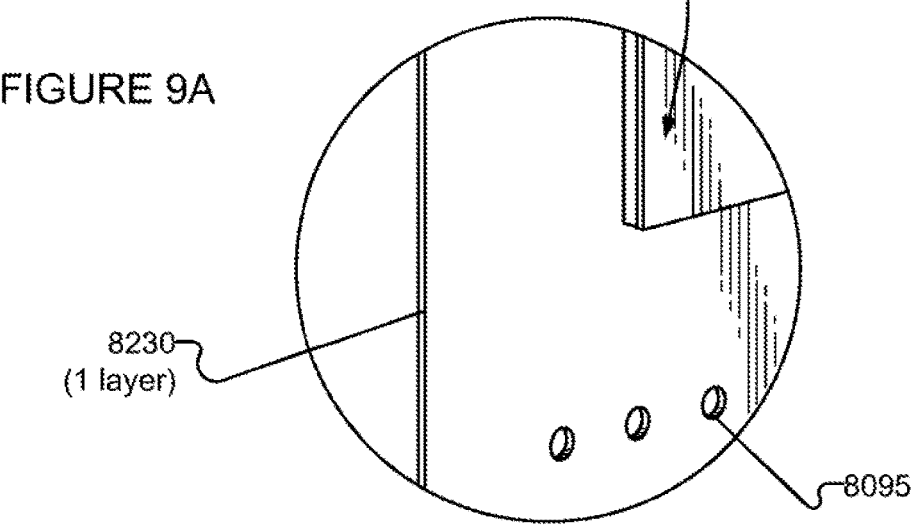

FIG. 9B depicts a detailed isometric side view of cathode flow passages for receiving a cathode into the hot zone enclosure assembly according to the present technology.

Figure 9C:
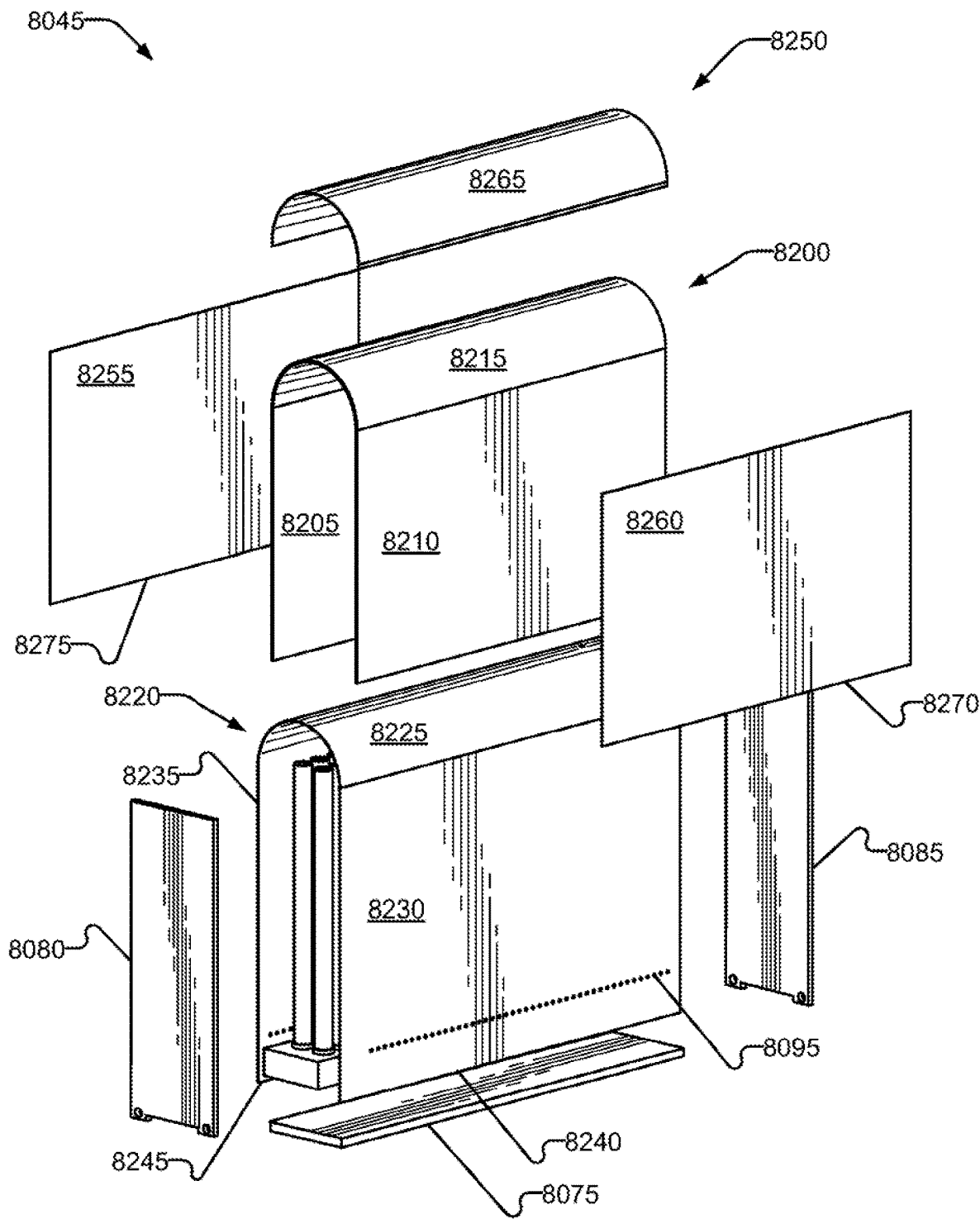

FIG. 9C depicts an exploded isometric view of the primary enclosure assembly according to the present technology.

Figures 10A, 10B:
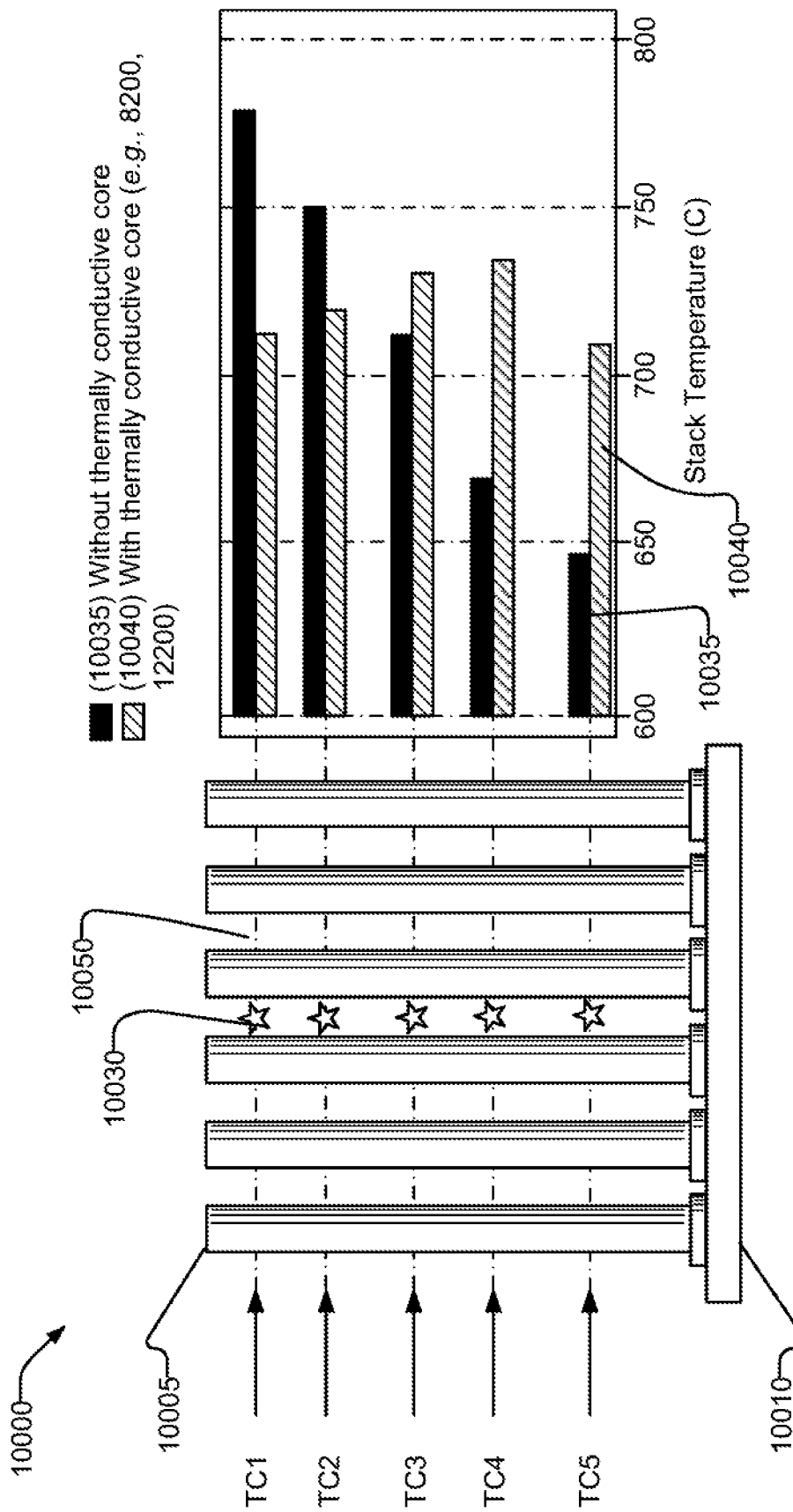

FIG. 10A schematically depicts a SOFC stack test fixture used to measure fuel cell temperature at five points along the SOFC stack axis when operating the text fixture fuel cell to generate DC current output.

FIG. 10B graphically depicts a comparison of fuel cell temperature at the five points along the SOFC stack axis when operating the test fixture without a thermally conductive core, shown in black, and when operating the test fixture with a thermally conductive core layer installed, shown cross-hashed.

FIG. 11A graphically depicts temperature measurements at five locations along a SOFC stack axis over a 2.5-hour startup and shut down cycle without the thermally conductive core of the present technology.

FIG. 11B graphically depicts temperature measurements at five locations along a SOFC stack axis over a 2.5-hour startup and shut down cycle with the thermally conductive core of the present technology.

Figure 12:
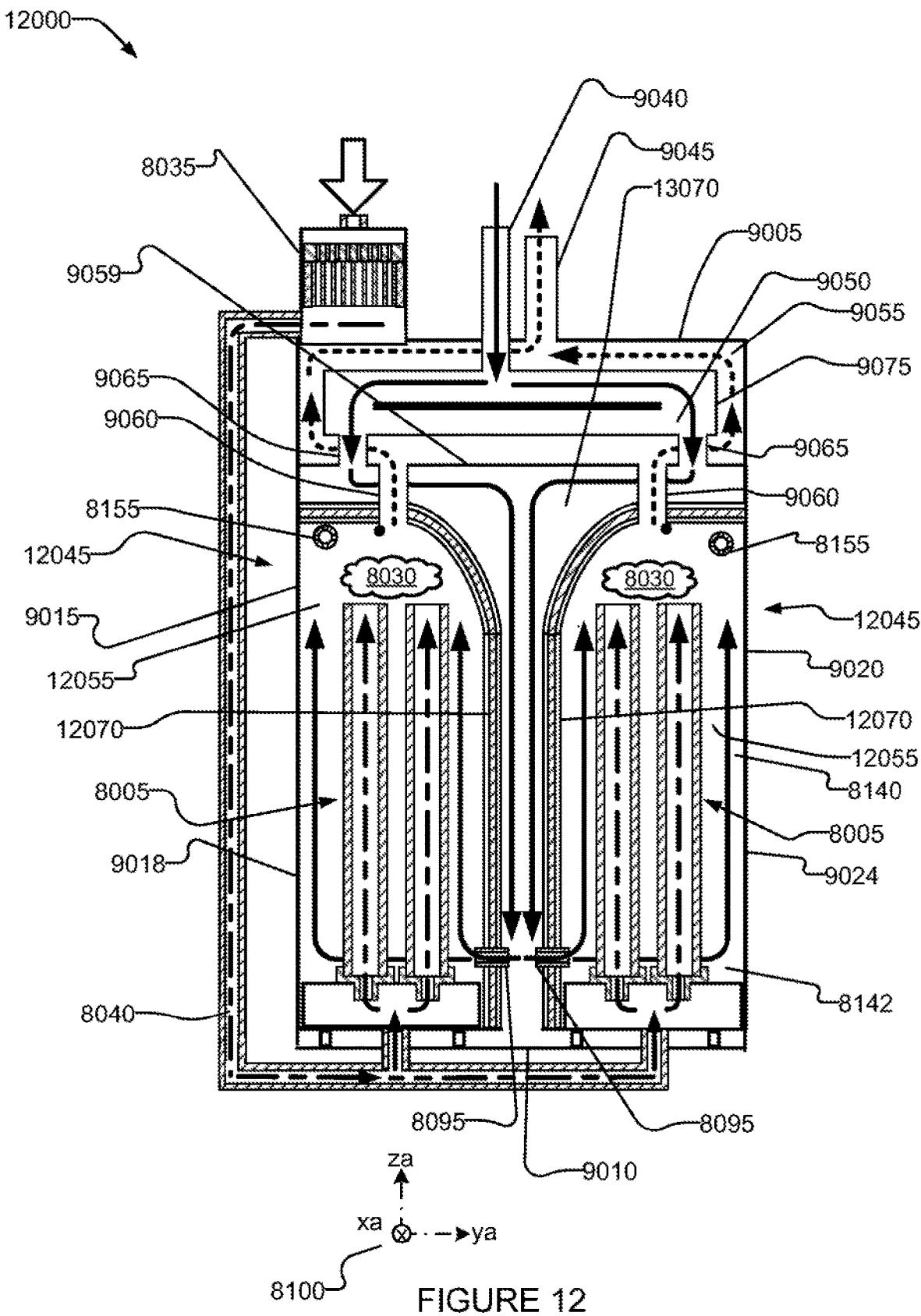

FIG. 12 schematically depicts a fuel cell system that includes a T-shaped primary enclosure wall assembly disposed over two SOFC stacks according to an aspect of the present technology.

Figure 13:
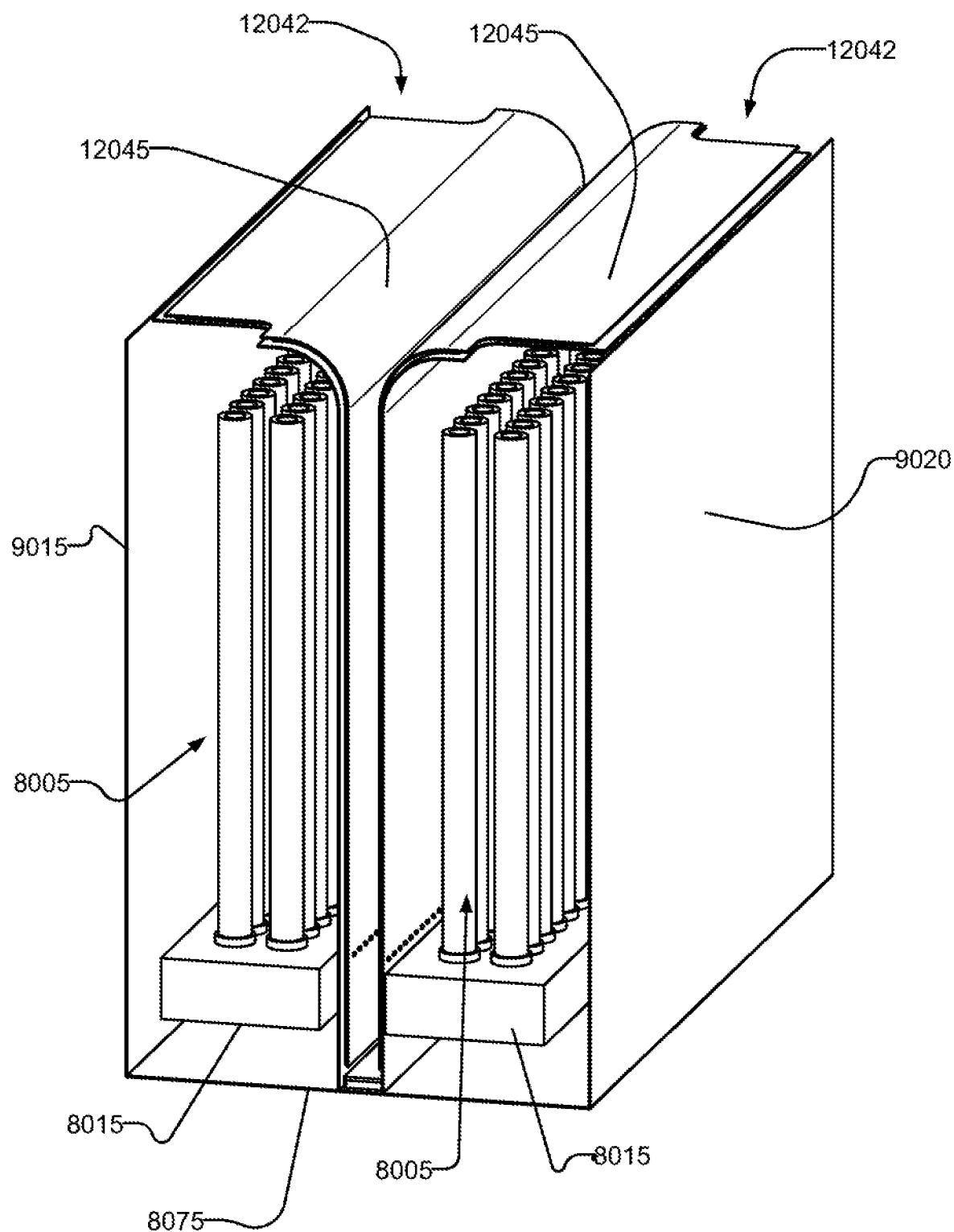

FIG. 13 depicts an isometric side view of a hot zone enclosure assembly including two halves of the T-shaped primary enclosure wall with each half enclosing a SOFC stack and other cathode chamber portions according to an aspect of the present technology.

Figure 13A:
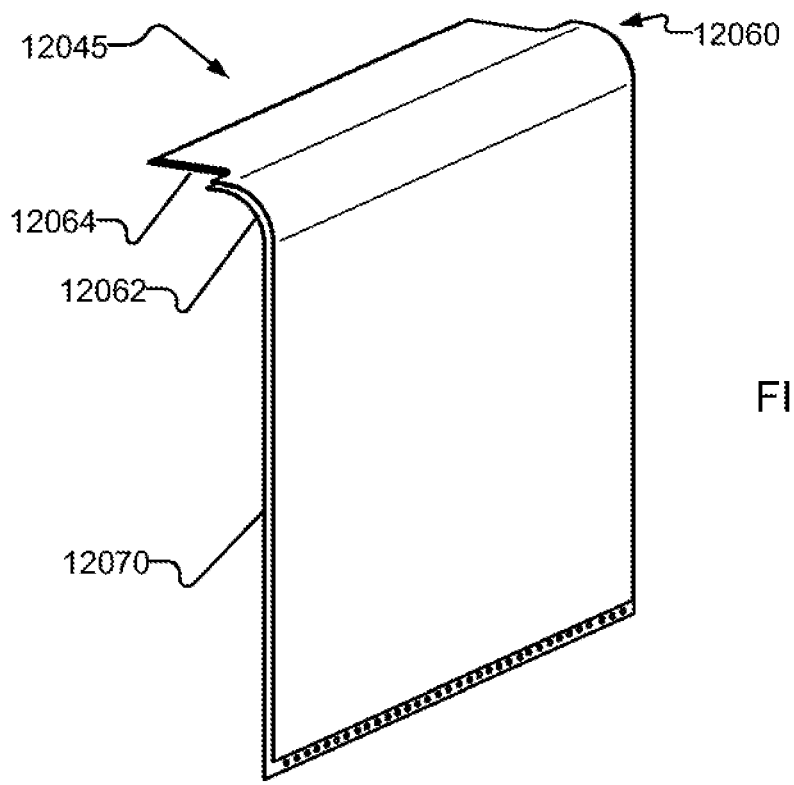

FIG. 13A depicts an isometric side view of an assembled L-shaped primary enclosure wall assembly according to an aspect of the present technology.

Figure 13B:
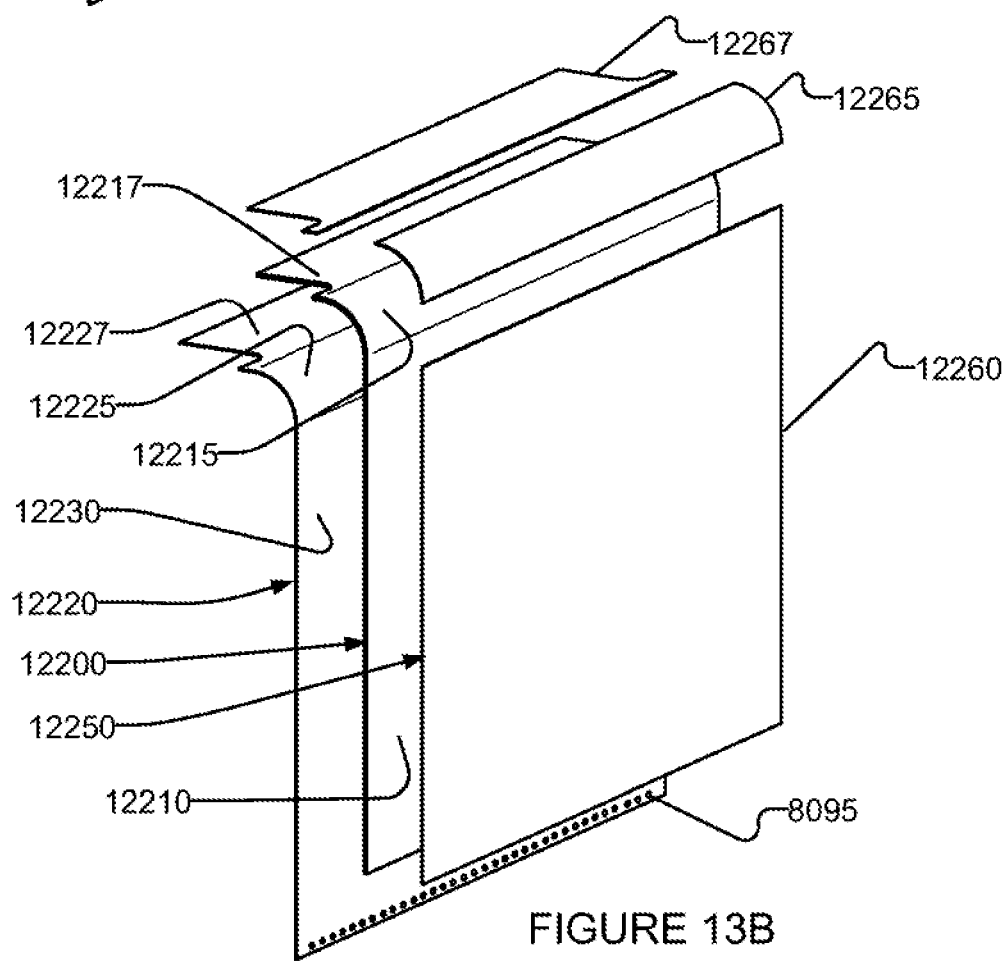

FIG. 13B depicts an exploded isometric side view of a half of the T-shaped primary enclosure wall assembly according to an aspect of the present technology.

Figure 14:
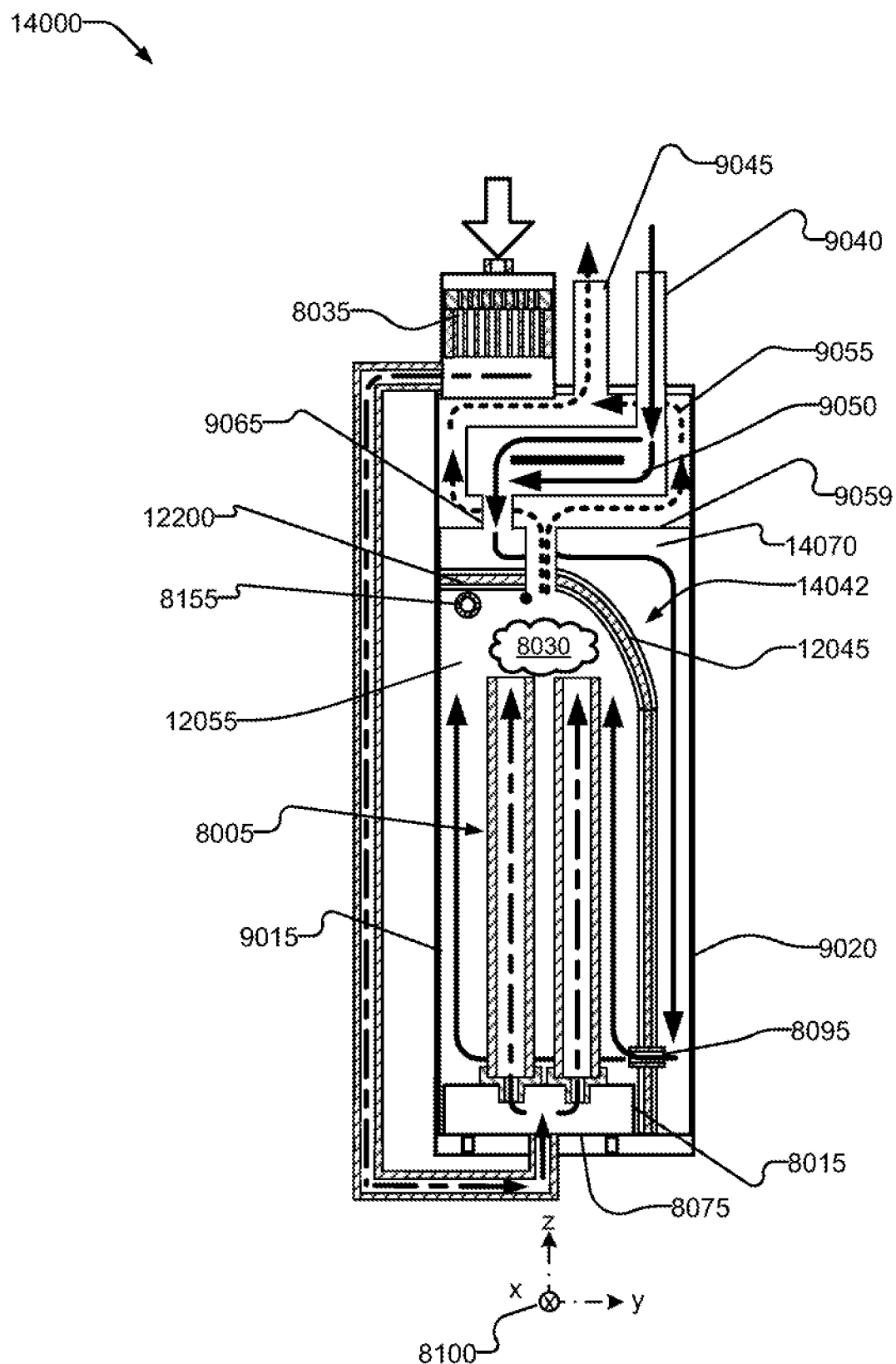

FIG. 14 schematically depicts a fuel cell system that includes a L-shaped primary enclosure wall assembly disposed over one SOFC stack according to an aspect of the present technology.

Figure 15:
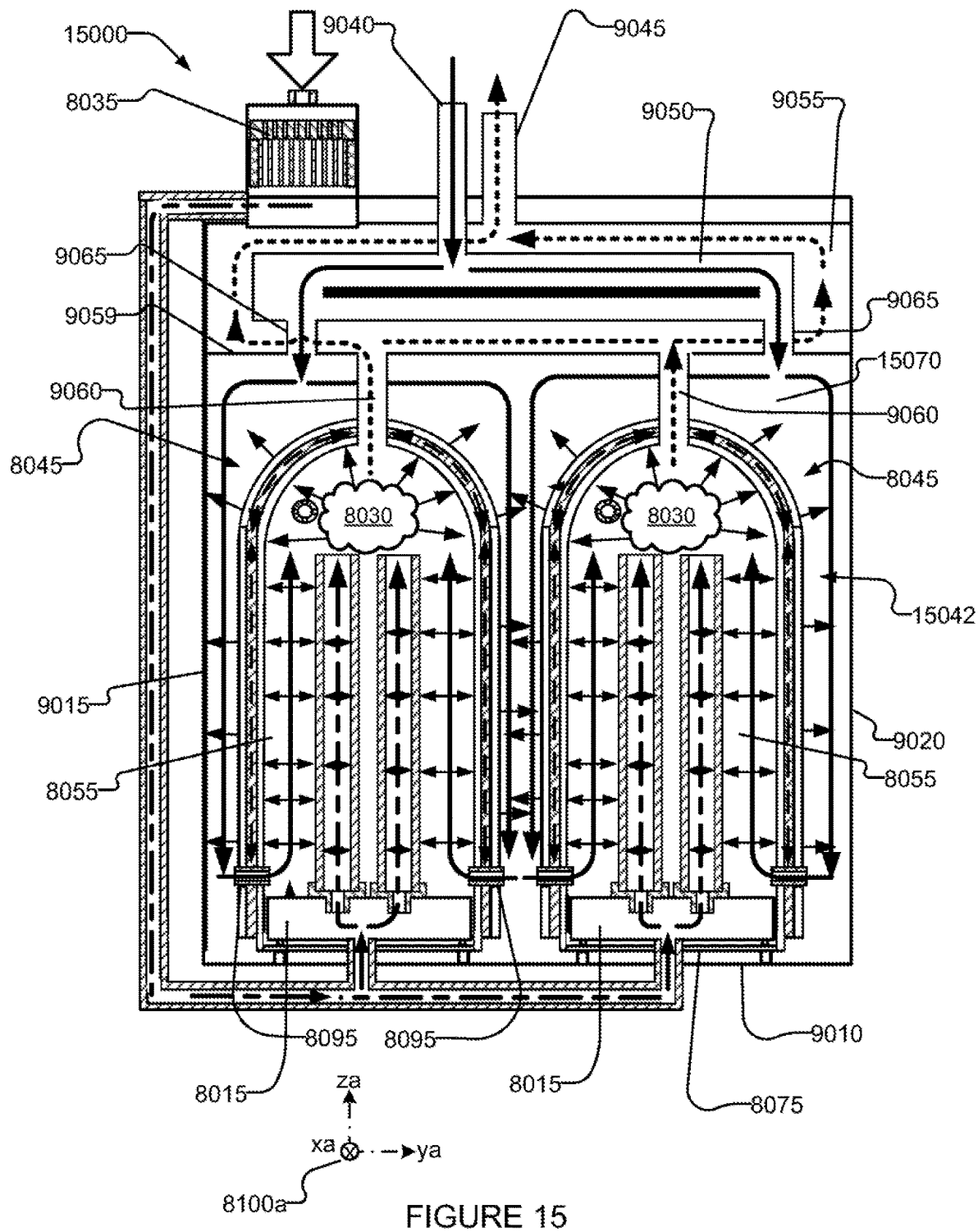

FIG. 15 schematically depicts a fuel cell system that includes two SOFC stacks each enclosed by a U-shaped primary enclosure wall assembly according to an aspect of the present technology.

Figures 16A, 16B:
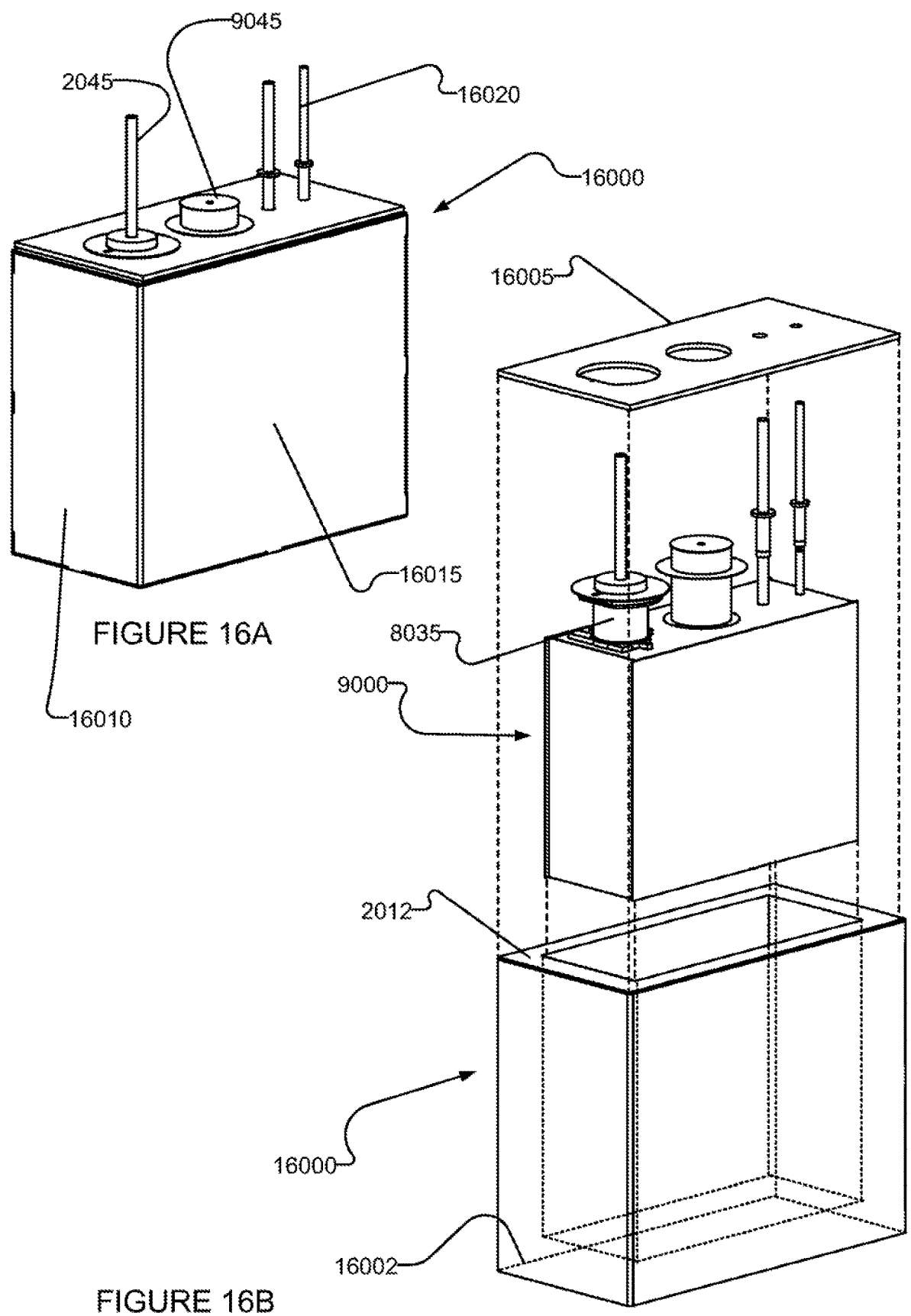

FIG. 16A depicts a side isometric view of an outer enclosure for enclosing a hot zone assembly of FIGS. 12, 14, and 15 according to an aspect of the present technology.

FIG. 16B depicts an exploded side isometric view of an outer enclosure and an intermediate enclosure for enclosing a hot zone assembly of FIGS. 12, 14, and 15 according to an aspect of the present technology.

Figure 17:
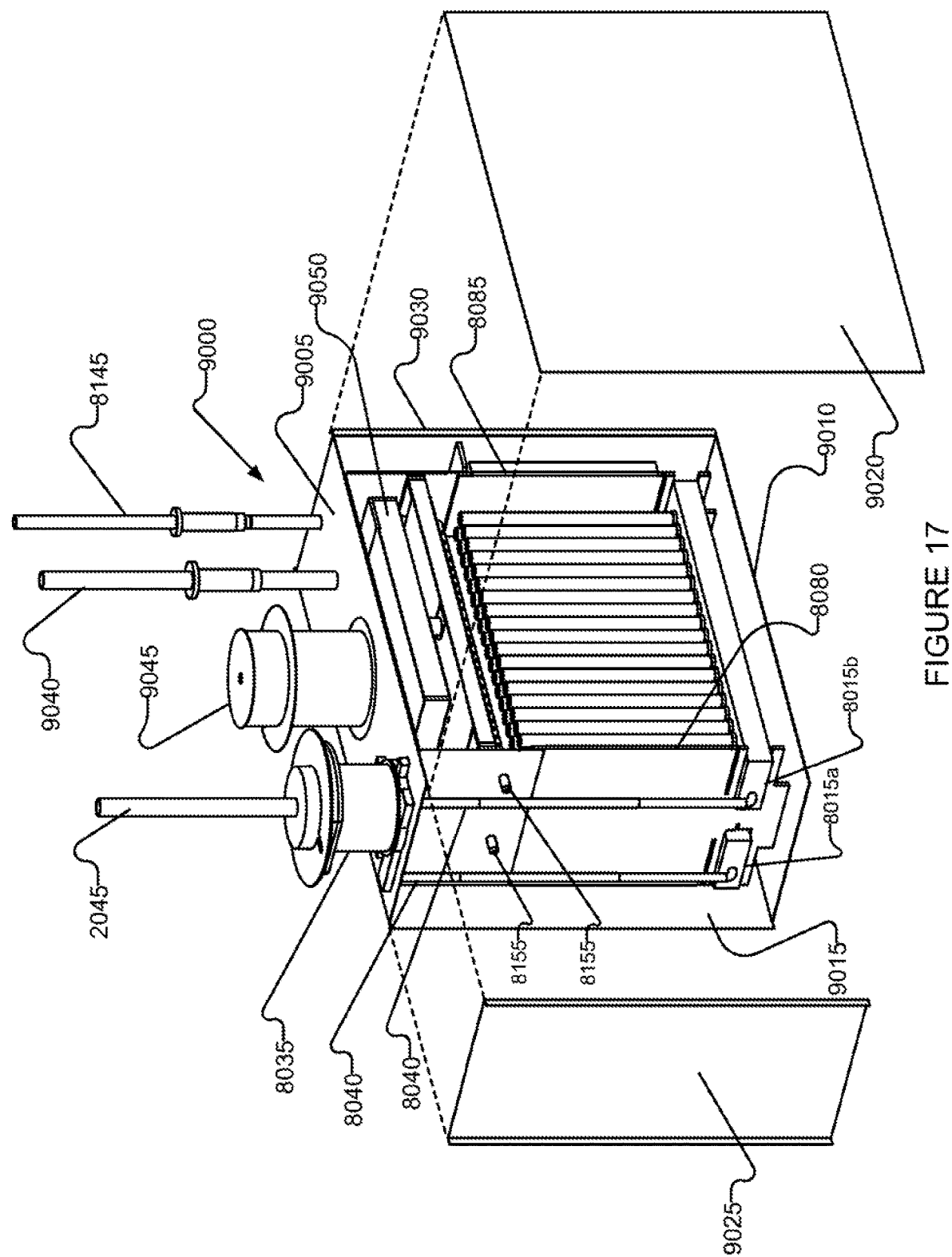

FIG. 17 depicts an exploded side isometric view of an intermediate enclosure for enclosing a hot zone assembly of FIGS. 12, 14, and 15 according to an aspect of the present technology.

4.1 DEFINITIONS

The following definitions are used throughout, unless specifically indicated otherwise:

| TERM | DEFINITION |
|---|---|
| Hastelloy | A group of alloys comprising predominantly metal nickel plus molybdenum, chromium, cobalt, iron, copper, manganese titanium, zirconium, aluminum and tungsten in varying percentages including zero in some alloys.<br>Hastelloy alloys are primarily used for effective survival under high temperature and or high stress in moderate to severely corrosive environments. Available from Haynes International Inc. of Kokomo IN, USA. |

| TERM | DEFINITION |
|---|---|
| Monel | A group of alloys comprising up to 67% metal nickel and about 30% copper with smaller amounts of iron, manganese, carbon and silicon. Monel is used for its resistance to corrosion. Available from Special Metals Corp. of New Hartford NY, USA. |
| SOFC | Solid Oxide Fuel Cell |
| Inconel | A family of austenitic nickel-chromium alloys comprising nickel 40-70% chromium 14-30%, iron 3-9% manganese 0.3-1% plus silicon, carbon, sulfur and other elements used for its resistance to oxidation and corrosion and strength over a wide range of temperatures. When heated, Inconel forms a thick stable passivating oxide layer protecting the surface from further attack. Attractive for high temperature applications to reduce creep. Available from Special Metals Corp. of New Hartford NY, USA. |
| Cermet | Any of a class of heat-resistant materials made of ceramic and sintered metal. Often formed and sintered as a ceramic oxide mixture and converted through the reduction from an oxide ceramic to the metallic phase. (NiO—YSZ → Ni—YSZ) |
| Perovskite | A ternary material with the general structure $A^{[12]}B^{[6]}X\text{-}3^{[6]}$ same type of crystal structure as calcium titanium oxide ($CaTiO_3$). |

4.2 ITEM NUMBER LIST

The following item numbers are used throughout, unless specifically indicated otherwise.

| ITEM NUMBER | DESCRIPTION |
|---|---|
| 100 | SOFC system |
| 105 | Hot zone |
| 110 | Cold zone |
| 115 | Enclosure walls |
| 120 | Hot zone cavity |
| 125 | Air gap |
| 130 | Thermal insulation layer |
| 135 | Fuel cell stack |
| 140 | DC current output terminals |
| 145 | Electrolyte layer |
| 150 | Anode layer |
| 155 | Cathode layer |
| 157 | Thermocouple temperature sensor |
| 160 | Supply fuel input line |
| 165 | Fuel reformer |
| 170 | Air input line |
| 175 | Recuperator |
| 180 | Combustor |
| 185 | Exhaust port |
| 190 | Electronic controller |
| 195 | Cold start module |
| 197 | Supply fuel delivery controller |
| 198 | Air delivery controller |
| 2000 | Hot zone |
| 2002 | Hot zone enclosure side wall |
| 2004 | Disc-shaped top wall |
| 2005 | SOFC stack |
| 2006 | Disc-shaped bottom wall |
| 2010 | Hot zone cavity |
| 2012 | Thermal insulation layer |
| 2015 | Hot zone enclosure walls |
| 2020 | Reformer |
| 2025 | Supply fuel and air mixture |
| 2027 | Fuel (e.g., reformate) |
| 2030 | Reformer enclosure walls |
| 2035 | Catalyzing cavity |
| 2040 | Catalyzing medium |
| 2045 | Reformer input port |
| 2050 | Reformer exit port |
| 2055 | Fuel input manifold |
| 2060 | Longitudinal axis |
| 2065 | Annular thermal insulating element |
| 2070 | Top tube support wall |
| 2075 | Bottom tube support wall |
| 2080 | Fuel cells |
| 2085 | Annular tube wall |
| 2090 | Cathode chamber |
| 2095 | Top end cap |
| 2100 | Bottom end cap |
| 2105 | Attaching end |
| 2110 | Journal-shaped supporting end |
| 2115 | Cell input port |
| 2120 | Cell output port |
| 2125 | Electrical lead |
| 2130 | Electrical lead |
| 2135 | Tail gas combustion region or chamber |
| 2140 | Combustor region end wall |
| 2145 | Cathode feed tube |
| 2150 | Combustor exit port |
| 2155 | Air gap |
| 2160 | Thermally conductive mass |
| 2165 | Hot zone exit port |
| 2170 | Fuel input manifold top wall |
| 2175 | Thermally conductive mass |
| 2180 | Thermally conductive mass |
| 2185 | Combustor baffle |
| 2200 | Incoming air |
| 2205 | Air input port |
| 2210 | Recuperator chamber |
| 2215 | Recuperator baffle |
| 2225 | Air input port |
| 2230 | Recuperator air input port |
| 2235 | Recuperator air output port |
| 2240 | Cathode chamber air input port |
| 2245 | Cathode chamber air output port |
| 2300 | Cold start combustor |
| 2305 | Annular cold start combustion chamber |
| 2310 | Combustor inlet port |
| 2315 | Startup fuel |
| 2320 | Igniter |
| 2325 | Startup combustor exit port |
| 5005 | Section of wall 2002 |
| 5010 | Copper core |
| 5015 | Nickel layer |
| 5020 | Nickel layer |
| 5025 | Sidewall recuperator chamber |
| 5030 | Hastelloy liner element |
| 5040 | Section of bottom tube wall |
| 5045 | Monel liner element |
| 5050 | Hastelloy liner element |
| 5055 | Section of wall 2140 |
| 5060 | Hastelloy liner element |
| 5065 | Monel liner element |

| ITEM NUMBER | DESCRIPTION |
|---|---|
| 5070 | Section of fuel input manifold top wall |
| 5075 | Nickel layer |
| 5080 | Hastelloy layer |
| 7000 | SOFC system |
| 7010 | Cathode chamber |
| 7015 | Hot zone enclosure wall |
| 7020 | Insulation layer |
| 7025 | Cathode feed tube |
| 7030 | Center axes |
| 7035 | Inner circular pattern |
| 7040 | Inner rod shaped fuel cells |
| 7045 | Outer circular pattern |
| 7050 | Outer rod shaped fuel cells |
| 16000 | Outer enclosure |
| 16002 | Bottom outer enclosure wall |
| 8000 | SOFC hot zone |
| 8005 | SOFC stack |
| 8010 | Fuel Cell |
| 8015 | Fuel input manifold |
| 8020 | Fuel input end |
| 8025 | Fuel output end |
| 8030 | Combustion region |
| 8035 | Fuel reformer |
| 8040 | Fuel delivery conduit |
| 8042 | Hot zone enclosure assembly |
| 8045 | U-shaped primary enclosure wall assembly |
| 8050 | Supply fuel |
| 8055 | Cathode chamber |
| 8060 | Combustion region wall |
| 8065 | Primary enclosure sidewall |
| 8070 | Primary enclosure sidewall |
| 8075 | Hot zone enclosure base wall |
| 8080 | Hot zone enclosure end wall |
| 8085 | Hot zone enclosure end wall |
| 8095 | Cathode flow passage |
| 8100 | System coordinate axes diagram |
| 8140 | Middle volume cathode chamber |
| 8142 | Lower volume cathode chamber |
| 8145 | Startup fuel input conduit |
| 8150 | Fuel |
| 8152 | Startup fuel |
| 8155 | Burner element |
| 8160 | Fuel ignitor element |
| 8200 | Thermally conductive core |
| 8205 | Core side wall portion |
| 8210 | Core side wall portion |
| 8215 | Core top wall portion |
| 8220 | Inner protective layer |
| 8225 | Inner top wall portion |
| 8230 | Inner side wall portion |
| 8235 | Inner side wall portion |
| 8240 | Inner side wall bottom edge |
| 8245 | Inner side wall bottom edge |
| 8250 | Outer protective layer |
| 8255 | Outer side wall portion |
| 8260 | Outer side wall portion |
| 8265 | Outer top wall portion |
| 8270 | Outer side wall bottom edge |
| 8275 | Outer side wall bottom edge |
| 8280 | Inner protective layer |
| 8285 | Outer protective layer |
| 9000 | Intermediate enclosure |
| 9005 | Intermediate enclosure top wall |
| 9010 | Intermediate enclosure bottom wall |
| 9015 | Intermediate enclosure side wall |
| 9020 | Intermediate enclosure side wall |
| 9022 | Cathode input manifold side wall |
| 9024 | Cathode chamber side wall |
| 9025 | Intermediate enclosure end wall |
| 9030 | Intermediate enclosure end wall |
| 9035 | Fuel access port |
| 9040 | Cathode input port |
| 9045 | Hot zone exhaust port |
| 9050 | Recuperator Chamber |
| 9055 | Hot zone exhaust conduit |
| 9059 | Bottom wall of exhaust conduit |
| 9060 | Combustion exhaust port |
| 9065 | Recuperator exit port |
| 9070 | Cathode input manifold |
| 9075 | Shared wall |
| 9080 | Baffle |
| 10000 | Test fixture |
| 10005 | Fuel cell |
| 10010 | Fuel input manifold |
| 10030 | Star symbols |
| 10035 | Black Bars |
| 10040 | White Bars |
| 10045 | Legend |
| 10050 | Dashed lines (indicating related thermocouple) |
| 10055 | Legend |
| 12000 | SOFC hot zone |
| 12042 | Hot zone enclosure assembly |
| 12045 | L-shaped primary enclosure wall assembly |
| 12055 | Cathode chamber |
| 12060 | Combustion region wall |
| 12062 | Combustion region curved wall portion |
| 12064 | Combustion region flat top wall portion |
| 12070 | Primary enclosure sidewall |
| 12200 | Thermally conductive core |
| 12210 | Core side wall portion |
| 12215 | Core curved wall portion |
| 12217 | Core top wall portion |
| 12220 | Inner protective layer |
| 12225 | Inner protective layer portion |
| 12227 | Inner protective layer portion |
| 12230 | Inner protective layer portion |
| 12250 | Outer protective layer |
| 12260 | Outer protective layer portion |
| 12265 | Outer protective layer portion |
| 12267 | Outer protective layer portion |
| 13070 | Cathode input manifold |
| 14000 | SOFC hot zone |
| 14042 | L-shaped hot zone enclosure assembly |
| 14070 | Cathode input manifold |
| 15000 | SOFC hot zone |
| 15042 | Double U-shaped hot zone enclosure assembly |
| 15070 | Cathode input manifold |
| 16005 | Top outer enclosure wall |
| 16010 | Side outer enclosure wall |
| 16015 | Side outer enclosure wall |

4.3 DETAILED DESCRIPTION OF THE EMBODIMENTS

Figure 1:
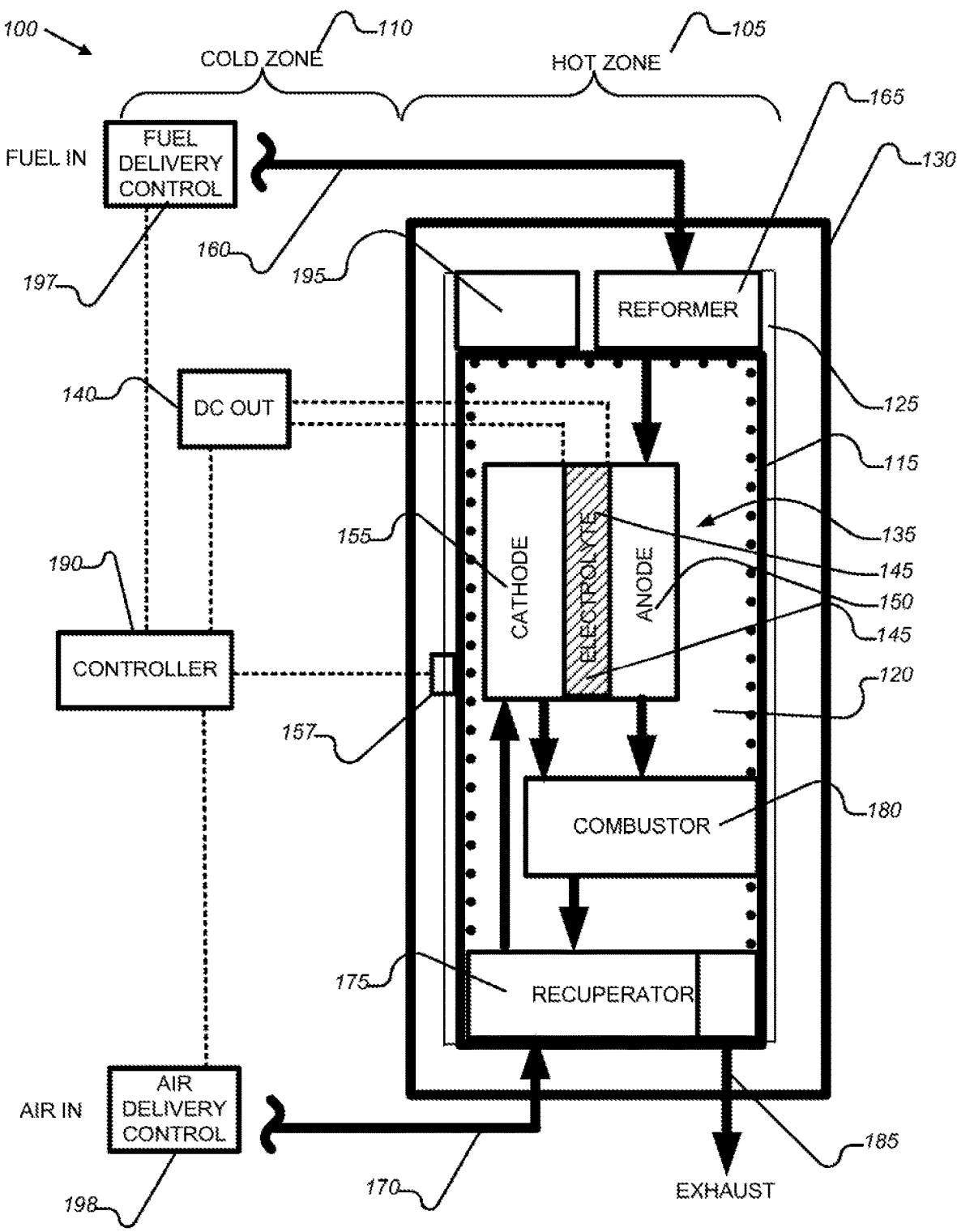
FIG. 1 depicts a schematic view of a first exemplary SOFC system according to the present technology.

Referring to FIG. 1, a schematic diagram of a first embodiment of the present technology depicts a Solid Oxide Fuel Cell (SOFC) system (100). The system (100) includes a hot zone (105), that includes at least one SOFC fuel cell and preferably a plurality of fuel cells forming a SOFC stack maintained at a high operating temperature, and a cold zone (110) that includes fuel input and exhaust modules, a DC power output module and other control elements. Hot zone enclosure walls (115) are disposed to enclose a hot zone cavity (120) therein. A thermal insulation layer (130) surrounds the enclosure walls (115) to thermally insulate the hot zone (105). An air gap (125) is provided between the thermal insulation layer (130) and a side wall of the hot zone enclosure walls (115) and the air gap provides a gas flow conduit for gases to flow over outer surfaces of the hot zone enclosure walls.

According to an important aspect of the present technology, the hot zone enclosure walls (115) and associated thermal energy management elements described below are in thermal communication with each other in order to provide thermally conductive pathways for thermal energy transfer to all regions of the hot zone by thermal conduction through the hot zone enclosure walls (115). More specifically the hot zone enclosure walls (115) and any thermal energy management elements, described below, comprise materials having a high coefficient of thermal conductivity, e.g. between 100 and 300 W/(m° K), and preferably above 200 W/(m° K) at temperatures ranging from 350 to 1200° C. Accordingly, the hot zone enclosure external walls and other thermal energy management elements, described below, are fabricated from one or more of copper, molybdenum, aluminum copper, copper nickel alloys or a combination thereof. Specifically, the hot zone enclosure walls (115) and associated thermal energy management elements are configured to provide thermally conducive pathways for rapid conduction of thermal energy from one area of the hot zone to another. More specifically the hot zone enclosure walls (115) and associated thermal energy management elements are configured to manage thermal energy within the hot zone by rapidly conducting thermal energy from high temperature areas of the hot zone to lower temperature areas of the hot zone in order to ensure that the entire hot zone is maintained at a more uniform temperature than would be typical of traditional SOFC systems.

An electrochemical energy generator or fuel cell stack (135) comprising one or more Solid Oxide Fuel Cells (SOFCs) or other types of fuel cells is enclosed within the hot zone (105) and supported with respect to the enclosure walls (115) by one or more support elements, described below. The fuel cell stack (135) includes one or more fuel cells with each cell participating in an electro-chemical reaction that generates an electrical current. The fuel cells are electrically interconnected in series or in parallel as needed to provide a desired output voltage of the cell stack (135). Each fuel cell includes three primary layers, an anode layer or fuel electrode (150), a cathode layer or air electrode (155) and an electrolyte layer (145) that separates the anode layer from the cathode layer.

The anode layer (150) is exposed to a reactant such as a gaseous or vaporous reformate that at least contains hydrogen gas ($H_2$) and/or carbon monoxide (CO). At the same time the cathode layer (155) is exposed to air or vaporous oxygen ($O_2$) source or any other oxidizing gas. In the cathode layer (155) oxygen (air) supplied to the cathode layer receives electrons to become oxygen ions ($O^{-2}$). The cathode reaction is $1/2O_2+2e^-=O^{-2}$, sometimes written as $O^{II}$.

The oxygen ions pass from the cathode layer to the anode layer (150) through the electrolyte layer (145). In the anode layer hydrogen ($H_2$) and/or carbon monoxide (CO) supplied to the anode layer by the fuel react with oxide ions to produce water and carbon dioxide and electrons emitted during this reaction produce electricity and heat. The electricity produced by the electro-chemical reaction is extracted to DC current output terminals (140) to power an electrical load.

Common anode materials include cermets such as nickel and doped zirconia, nickel and doped ceria, copper and ceria. Perovskite anode materials such as $Sr_2Mg_{1-x}MnxMoO_{6-\delta}$ or $La_{0.75}Sr_{0.25}Cr_{0.5}Mn_{0.5}O_{3-\delta}$ are also usable. Common cathode materials include Lanthanum Strontium Cobalt Oxide (LSC), Lanthanum Strontium Cobalt Iron Oxide (LSCF) and Lanthanum Strontium Manganite (LSM). The electrolyte layer is an ion conducting ceramic, usually an oxygen ion conductor such as yttria doped zirconia or gadolinium doped ceria. Alterably the electrolyte layer is a proton conducting ceramic such as barium cerates or barium ziconates. The electrolyte layer acts as a near hermetic barrier to prevent the fuel and air from mixing and combusting.

Generally each fuel cell is configured with one of the anode layer (150), the cathode layer (155) or the electrolyte layer (145) formed as a support or mechanically structural element and the other two layers are coated onto the support element e.g. by dipping, spraying or the like. Various support element structures are usable including one non-limiting example embodiment shown in FIG. 2 wherein each fuel cell comprises an anode support element configured as a hollow tube forming a cylindrical gas conduit wherein the anode layer (150) forms the inside diameter of the cylindrical conduit, the ceramic electrolyte layer (145) is coated over the outside diameter of the structural anode layer (150) and the cathode layer (155) is coated over the outside diameter of the electrolyte layer (145).

A fuel at least comprising hydrogen ($H_2$) and/or carbon monoxide (CO) flows through the hollow ceramic tube in contact with the anode layer and air flows over and outside surface of the hollow tube in contact with the cathode layer. Electrical current is generated as described above.

Figure 2:
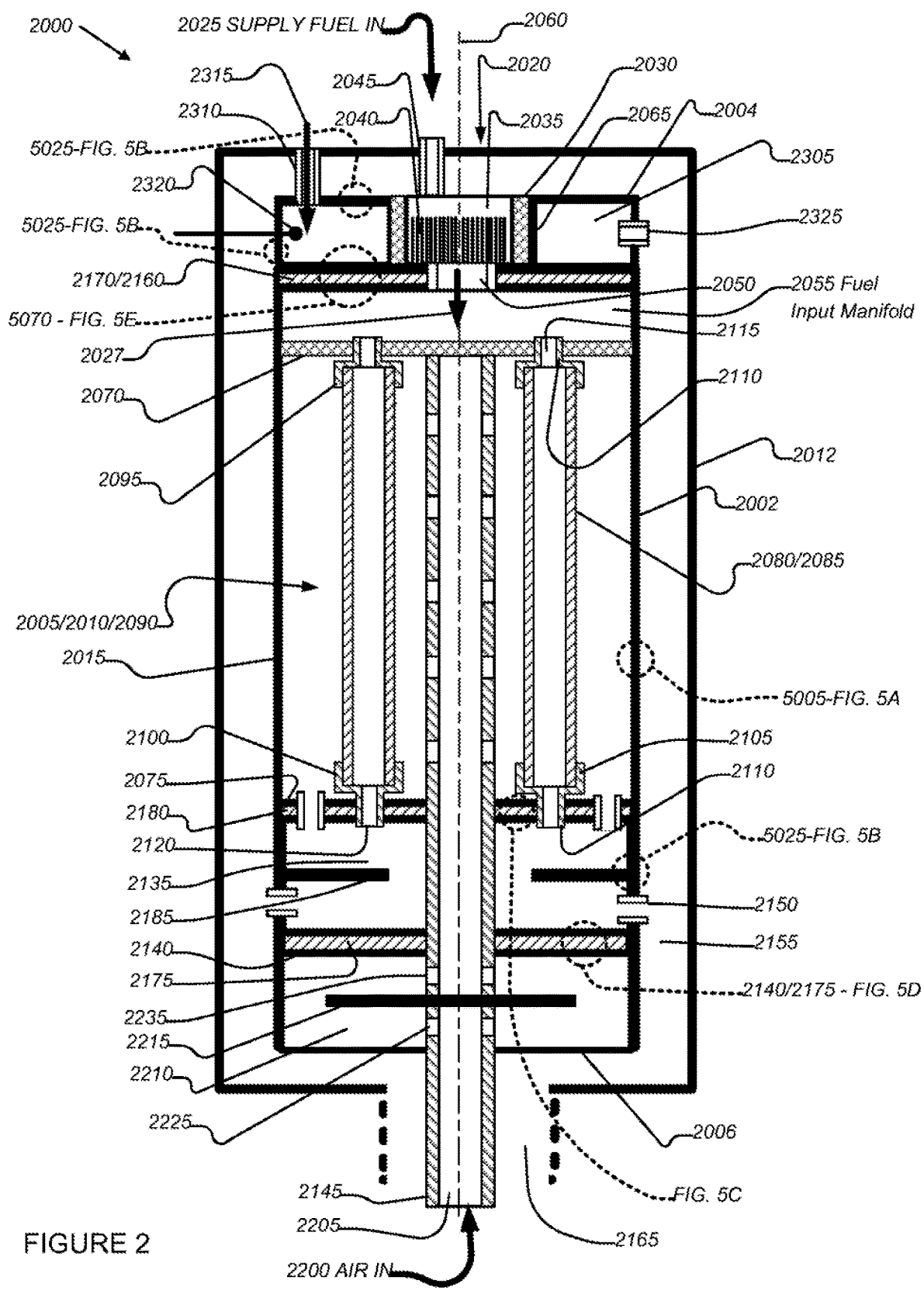
FIG. 2 depicts a schematic view of an exemplary hot zone of a SOFC system according to the present technology.

While the specific cell stack of FIG. 2 comprises a plurality of tubular fuel cells, other cell stacks formed by fuel cells having different known form factors are usable without deviating from the present technology. These may include a fuel cell stack (135) formed from a plurality of flat sheet type fuel cells formed in a stack with each cells including a sheet shaped support layer with the other layers coated onto the support layer and a separator disposed between adjacent flat support layer with other layers coated onto the support layer.

A supply fuel input line (160) delivers a supply fuel (8050) comprising a gaseous or vaporous hydrocarbon fuel received from a supply fuel container stored in the cold zone (110) or from an external supply fuel source. A supply fuel delivery controller (197) in communication with an electronic controller (190) is disposed along the supply fuel input line (160) in the cold zone to regulate supply fuel input volume or mass flow rate as needed to control the supply fuel input rate and to mix the supply fuel with air. The supply fuel input line (160) delivers the supply fuel air mixture (2025) into a fuel reformer (165) for fuel processing. The supply fuel and air mixture (2025) is flowed to the fuel reformer (165) which decomposes the mixture (2025) forming a reformate, herein after called fuel (2027). The fuel (2027) is a reactant suitable for chemical reaction with an anode surface of the SOFC stack. The fuel (2027) or reformate typically includes a mixture of H2, CO, CO2 and H20 with traces of CH4 and other hydrocarbons. Other reformate contents may include methane, ethane or ethylene. In an alternative embodiment the supply fuel (8050) comprises primarily hydrogen ($H_2$) with little or no additional components and a reformer (165) is not required. The fuel received from the fuel reformer or directly from the supply fuel sources is passed over the surface of the anode layer (150) for electro-chemical reaction therewith.

A cathode gas input line (170) delivers gaseous or vaporous oxygen such ambient air or another oxygen source into the cold zone (110) e.g. through an intake fan or the like. An air delivery controller (198) in communication with the electronic controller (190) is optionally disposed along the air input line (170) in the cold zone to regulate air input volume or mass flow rate as needed. The air input line (170) delivers room temperature air into a recuperator (175) which heats the input air by a thermal energy exchange between hot gases exiting the hot zone and the incoming cooler air. The heated incoming air is passed over the surface of the cathode layer (155) for chemical reaction therewith.

Both the spent fuel and oxygen diminished air exit the fuel cell stack (135) and mix in a combustion region or tail gas combustor (180). The mixture of unreacted fuel and unreacted air delivered into the tail gas combustor (180) spontaneously combusts therein locally generating thermal energy. The combustor walls, detailed below, comprise materials having a high coefficient of thermal conductivity, e.g. between 100 and 300 W/(m° K), and preferably above 200 W/(m° K). Additionally the combustor walls are in thermal communication with the hot zone enclosure walls (115) such that thermal energy generated by combustion inside the combustor (180) heats the combustor walls to a high temperature which quickly initiates thermal energy transfer to all regions of the hot zone by conductive thermal energy transfer through the hot zone enclosure walls (115).

Combustion byproduct exiting from the tail gas combustor (180) comprising hot gas is delivered into the recuperator (175). The recuperator comprises a cross flow heat exchanger with counter flow conduits provided to transfer thermal energy from the combustion hot byproduct to cooler incoming air to thereby heat the incoming air before it enters the SOFC fuel cell stack (135). After passing through the recuperator (175) the combustion byproduct is exhausted through an exhaust port (185).

A thermocouple or other temperature sensor (157) is affixed to a surface of the enclosure walls (115) to sense a temperature thereof and the temperature information is communicated to the electronic controller (190). The controller (190) is in communication with other electronic elements such as one or more electrically operable gas flow valves, gas flow rate detectors and or modulators, associated with the supply fuel delivery controller (197), the air delivery controller (198) and electrical power output detectors, or the like, and other elements as may be required to control various operating parameters of the SOFC (100). The electronic controller (190) monitors DC current output as well as temperature measured at the thermocouple and further operates to vary the supply fuel input and air flow rates as a means of controlling the temperature. Additionally, an optional cold start module (195) may be provided to preheat input supply fuel and/or air at start up. The cold start module (195) may be a supply fuel igniter usable to ignite a portion of the supply fuel for preheating the enclosure walls and the SOFCs or the cold start module (195) may comprise an electrical heater usable to preheat input fuel, or both.

4.4 EXEMPLARY HOT ZONE ARCHITECTURE

Turning now to FIG. 2 a first non-limiting exemplary embodiment of an improved SOFC system hot zone (2000), according to the present technology, includes a SOFC fuel cell stack (2005) comprising a plurality of individual fuel cells enclosed within a hot zone cavity (2010). The hot zone cavity (2010) is surrounded by enclosure walls (2015) wherein the enclosure walls are formed from one or more of copper, molybdenum, aluminum copper, copper nickel alloys or a combination thereof. The enclosure walls are surrounded by a thermal insulation layer (2012) which limits thermal energy from exiting the hot zone. An air gap (2155) is disposed between the hot zone enclosure walls (2015) and the thermal insulation layer (2012). The air gap (2155) provides a fluid flow conduit that leads to a hot zone exit port (2165) and is used to carry exhaust gases out of the hot zone.

The enclosure walls (2015) are configured to provide thermally conducting pathways comprising materials having a coefficient of thermal conductivity, of between 100 and 300 W/(m° K) and preferably more 200 W/(m° K). Moreover, the thermally conducing pathways are disposed to act as thermal energy conduits suitable for conducting thermal energy from high temperature areas of the hot zone to lower temperature areas of the hot zone in order to narrow the temperature differences of each area of the hot zone.

4.4.1 Reformer

The hot zone cavity (2010) of the present non-limiting exemplary embodiment is a can-shaped cylindrical volume bounded by the hot zone enclosure walls (2015) which include a side wall (2002) a top wall (2004) and a bottom wall (2006). The hot zone (2000) operates most efficiently at a temperature above 350 or above 500° C. depending upon the SOFC reactions being used and may be operated at temperatures in the range of 350 to 1200° C. Accordingly, each of the elements of the hot zone of the present technology is configured to operate reliably at highest temperatures expected for that element, e.g., 350° C. in some zones and up to 1200° C. inside the fuel reformer, e.g. proximate to the catalytic reaction or inside the combustion regions.

According to a preferred non-limiting example embodiment of the present technology a fuel reformer (2020) that uses an exothermic reaction to reform the supply fuel and air mixture (2025) is provided inside or partially inside the hot zone to reform the supply fuel to generate fuel (2027) or reformate for delivery into each of the fuel cells of the fuel cell stack (2005). The reformer (2020) of the present exemplary embodiment comprises a Catalytic Partial Oxidation (CPOX) reactor which partially combusts a supply fuel and air mixture (2025) delivered thereto. The supply fuel reforming process creates a hydrogen rich fuel (2027), e.g., a reformate. The CPOX reactor includes a catalyzing medium (2040) such as a metallic or oxide phase of rhodium (Rh) or other suitable catalyzers (e.g. Pt, Pd, Cu, Ni, Ru and Ce) coated on internal surfaces thereof. The supply fuel and air mixture (2025) passing through the CPOX reactor is catalyzed as it passes over the catalyzing medium (2040) coated surfaces and the heat released by the reaction is radiated and thermally conducted to the hot zone enclosure walls (2015) and helps to heat the fuel cell stack.

The CPOX reformer (2020) comprises reformer enclosure walls (2030) surrounding a cylindrical catalyzing cavity (2035). The cylindrical catalyzing cavity (2035) supports a catalyzing medium (2040) therein. In the present example embodiment, the catalyzing medium (2040) is a square cell extruded monolith with exposed surfaces thereof coated with a suitable catalyst. The monolith is positioned such that the incoming supply fuel and air mixture (2025) flows past the exposed surfaces of the square cell extruded monolith for catalyzation. Other suitable catalyzing structures may include a plurality of parallel plate or concentric ring structures or a porous metal or ceramic foam structure such as a sintered or extruded element formed with exposed surfaces thereof coated with the catalyzing agent. Alternately, the catalyzing structure may comprise a plurality of mesh screens having exposed surfaces coated with the catalyzing agent. The supply fuel and air mixture (2025) enters the reformer (2020) through a reformer input port (2045) and flows through the catalyzing medium (2040) for reforming by contact with the catalyzed surfaces. The reformed fuel or reformate, herein after "fuel", flows out of the reformer through a reformer exit port (2050) and into a fuel input manifold (2055).

In the present non-limiting exemplary embodiment, the reformer enclosure walls (2030) comprises a cylindrical or square wall enclosing a cylindrical or square cross sectioned catalyzing cavity (2035). The catalyzing medium (2040) is supported inside the catalyzing cavity (2035) disposed to force the incoming supply fuel and air mixture (2025) to flow through the catalyzing structure past the catalyzing surfaces. A thermal insulating element (2065) is disposed to surround outside surfaces of the catalyzing cavity (2035). The thermal insulating element (2065) is provided to limit thermal energy from entering or exiting the catalyzing cavity (2035): The reformer enclosure walls (2030) may comprise a high temperature steel alloy such as Inconel, a high temperature copper alloy e.g. Monel or other suitable high temperature material.

4.4.2 SOFC Fuel Cell Stack

The SOFC fuel cell stack (2005) is supported inside the can-shaped hot zone enclosure walls (2015). A plurality of rod shaped fuel cells (2080) is supported longitudinally inside a cathode chamber (2090). The cathode chamber (2090) is a cylindrical-shaped chamber bounded by the hot zone enclosure side wall (2002) and by a pair of opposing disk-shaped top and bottom tube support walls (2070) and (2075). Each tube support wall (2070, 2075) is attached to the side wall (2002) by suitable attaching means such as by welding or brazing, by bracketing and mechanical fastening or held in place without fasteners by a clamping force, or the like. Preferably the fuel cell stack (2005) is assembled prior to installation into the hot zone enclosure walls (2015) and is removable from the hot zone enclosure walls (2015) as a unit, e.g. to repair or inspect the cell stack as needed. Accordingly, the top and bottom tube support walls (2070, 2075) may be captured in place between opposing end stops, not shown. The top tube support wall (2070) mechanically engages with and fixedly supports a top or input end of each of the plurality of rod shaped fuel cells (2080). The mechanical interface between the top support wall (2070) and each of the plurality of fuel cell input ends is a substantially gas tight interface in order to prevent the supply fuel and air mixture (2025) in the fuel input manifold (2055) from entering the cathode chamber (2090). The top tube support wall (2070) is preferably formed with Inconel. Additionally, each of the top end caps (2095) is also formed with Inconel, which is an effective material for avoiding creep in high temperature environments. The bottom tube support wall (2075) mechanically engages with and movably supports a bottom or output end of each of the plurality of rod shaped fuel cells (2080). In particular the output end of each fuel cell (2080) is longitudinally movable with respect to the bottom tube support wall (2075) in order to accommodate changes in the length of each fuel cell as the fuel cells are heated to an operating temperature between 350 and 1200° C. An example tube support system usable with the present technology is disclosed by Palumbo in related U.S. patent application Ser. No. 13/927,418, filed on Jun. 26, 2013 entitled, SOLID OXIDE FUEL CELL WITH FLEXIBLE ROD SUPPORT STRUCTURE.

Figure 5A:
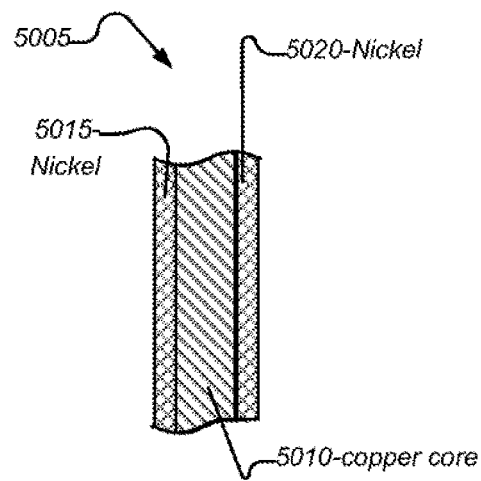
FIG. 5A depicts a section view taken through a first exemplary hot zone external wall of a SOFC system according to the present technology.
Figure 5B:
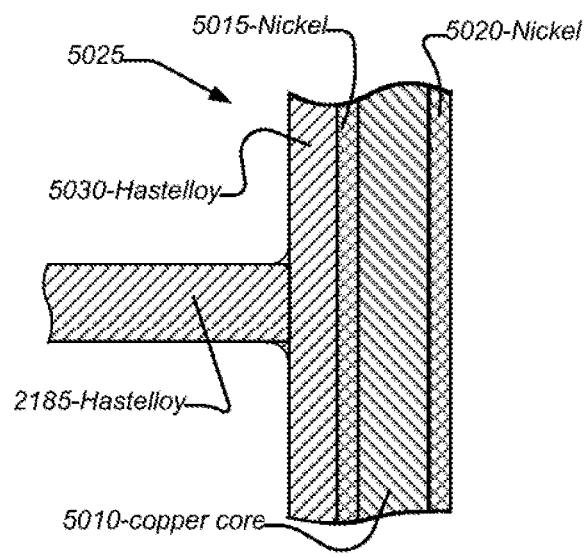
FIG. 5B depicts a section view taken through a second exemplary hot zone external wall of a SOFC system according to the present technology.
Figure 5C:
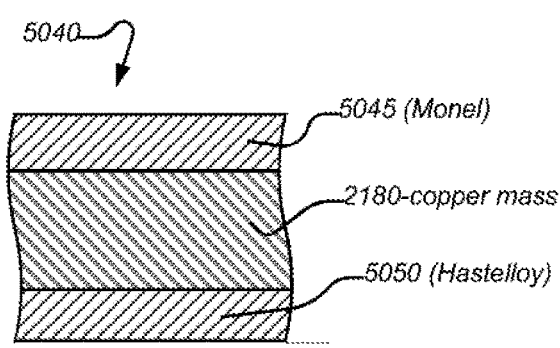
FIG. 5C depicts a section view taken through an exemplary bottom tube support wall including a thermally conductive mass of a SOFC system according to the present technology.

Referring now to FIGS. 2 and 5C, the bottom tube support wall (2075) includes a disk shaped thermally conductive mass (2180) comprising one or more materials having a coefficient of thermal conductivity, of more than 100 W/(m° K) and preferably more than 200 W/(m° K) such as one or more of copper, molybdenum, aluminum copper, copper nickel alloys or a combination thereof. The disk shaped thermally conductive mass (2180) is protected by top and bottom protective surface layers (5045) and (5050) described below in relation to FIG. 5C. In one non-limiting exemplary embodiment, each top (5045) and bottom (5050) protective surface layer comprises a separate disk shaped element in thermally conductive contact with the disk shaped thermally conductive mass (2180). Specifically, the top surface layer (5045) facing the cathode chamber (2090) comprises a disk-shaped chromium free high temperature metal alloy such as Monel and the bottom surface layer (5050) that faces a combustion region (2135), or tail gas combustor, comprises a disk-shaped high temperature, corrosion resistant metal such a Hastelloy alloy.

Preferably, each of the top and bottom protective surface layers (5045) and (5050) is in thermally conductive contact with the thermally conductive mass (2180) which is also in thermally conductive contact with the hot zone enclosure cylindrical sidewall (2002). Accordingly as the fuel air mixture is combusted in the tail gas combustor or combustion region (2135) thermal energy generated by combustion is radiated to the walls enclosing the combustion region (2135) and from the enclosing walls is thermally conducted to the thermally conductive mass (2180) and to other regions of the hot zone through the hot zone enclosure walls (2015). In addition, thermal energy emitted from the thermally conductive mass (2180) is radiated into the cathode chamber (2090) where it heats the cathode gas, or air flowing there through and heats surfaces of the fuel cells enclosed therein.

Each of the rod shaped fuel cells (2080) comprises a tube shaped annular wall (2085) wherein the anode layer is the support layer. The tube shaped annular wall (2085) is open at both ends. The tube-shaped annular wall (2085) forms a fuel conduit that extends through the cathode chamber (2090) to carry fuel (2027) there through. Other rod shapes including square, triangular, pentagonal, hexagonal or the like, are usable without deviating from the present technology. Additionally, other support layers are usable to provide structural integrity. Each fuel cell includes two metal end caps (2095) and (2100) or tube manifold adaptors with one end cap attached to each of two opposing ends of the tube annular wall (2085).

Each end cap (2095) and (2100) or tube manifold adaptor comprises a cup shaped attaching end (2105) and a journal shaped supporting end (2110). The attaching end (2105) includes a blind hole sized to receive the outside diameter of the annular wall (2085) therein. Each attaching end (2105) is fixedly attached to a rod end by a press or inference fit or by another fastening means such as brazing or an adhesive bond using materials suitable for the operating temperature of the hot zone (350-1200° C.). The journal shaped supporting end (2110) includes an annular wall formed with an outside diameter sized to engage with a corresponding through hole passing through the top tube support wall (2070) on the input side and a corresponding through hole passing through the bottom tube support wall (2075) on the output side. The journal shaped supporting end (2110) further includes a through hole passing there through which serves as a cell input port (2115) at the top end of the rod shaped fuel cell or as a cell output port (2120) at the bottom end of the rod shaped fuel cell (2080). Preferably the endcaps (2095 & 2100) or tube manifold adaptors each comprise a high temperature low Cr, corrosion resistant metal alloy thermally compatible with the fuel cell. The caps may be comprised of a ceramic coating on the metal cap to prevent Cr contamination.

Figure 3:
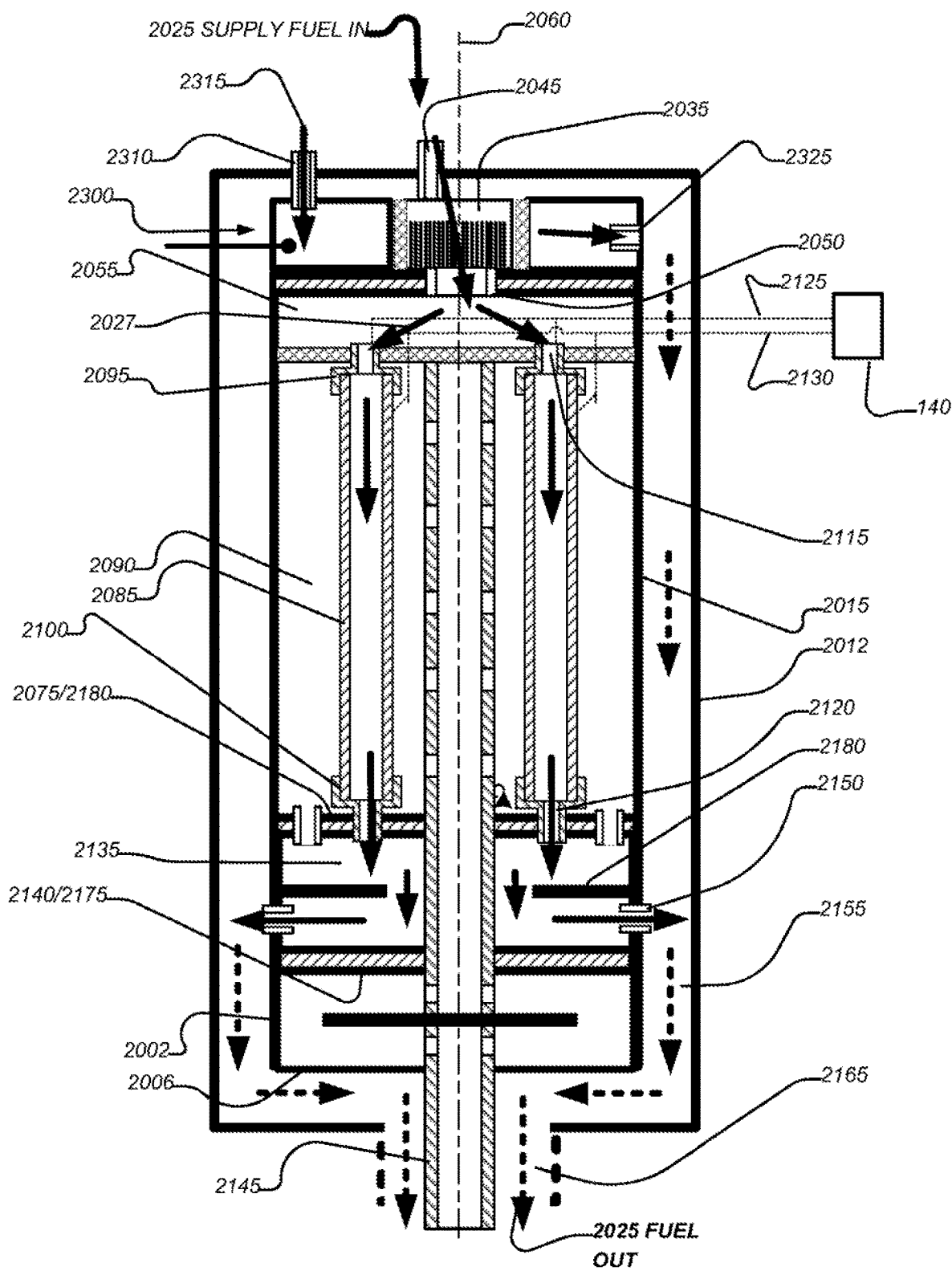
FIG. 3 depicts a schematic view of exemplary fuel flow pathways of a SOFC system according to the present technology.

Referring to FIGS. 2 and 3, the top end cap (2095) of each fuel cell (2080) may provide electrical communication with an outside diameter or cathode layer of the annular wall (2085) such that the outside diameter of the annular wall (2085) is in electrical communication with one of the DC current output terminals (140) over an electrical lead (2125) through the end cap (2095). A second electrical lead (2130) is in electrical communication with an inside diameter of the annular wall (2085) or anode layer and with a different terminal of the DC current output terminals (140). Additionally electrical insulators (not shown) are provided between each end cap (2095) and (2100) and the corresponding top and bottom tube support walls (2070) and (2075) to electrically isolate the hot zone enclosure walls (2015) from electrical current being generated by the fuel cell stack (2005).

Each rod shaped fuel cell is formed by the annular wall (2085) comprises an anode support layer which is a structural anode material layer formed with an inside and an outside diameter. The anode support layer may comprise a cermat, as previously described. The outside diameter of the anode support layer annular wall (2085) is a least partially coated with a ceramic electrolyte layer such as a Yttria stabilized zirconia or a cerium (Ce) or lanthanum gallate based ceramic. The outside diameter of the ceramic electrolyte layer is at least partially coated with a cathode material layer such as lanthanum strontium cobalt oxide (LSC), lanthanum strontium cobalt oxide (LSCF), lanthanum strontium manganite (LSM) or the like.

In a second non-limiting example embodiment of the system hot zone (2000) the mechanical structure of the hot zone enclosure walls and internal end walls is similar to that shown in FIG. 2 and described above however; the anode and cathode layers are on opposite sides of the ceramic electrolyte layer. Specifically in the second embodiment the inside diameter of the anode support layer annular wall (2085), (as opposed to the outside diameter), is a least partially coated with a ceramic electrolyte layer such as a Yttria stabilized zirconia or a cerium (Ce) or lanthanum gallate based ceramic and the inside diameter of the ceramic electrolyte layer is at least partially coated with a cathode material layer such as lanthanum strontium cobalt oxide (LSC), lanthanum strontium cobalt oxide (LSCF), lanthanum strontium manganite (LSM) or the like. In this example embodiment the anode support layer of the annular wall (2085) is an outside diameter of each fuel cell and the inside diameter of each fuel cell is the cathode layer. Thus in the second example embodiment the cathode chamber (2090) becomes an anode chamber and fuel is delivered into the anode chamber while the cathode gas, air is flowed through the rod shaped fuel cells.

The fuel 2027) is flowed over the anode material layer while the cathode gas, an oxygen-containing gas (e.g., air), is flowed over the cathode material layer in order to generate electrical current flow. The current flow passes out of the cell stack over the electrical leads (2125) and (2130) to the DC current output terminals (140) and may be used to power external devices. It is noted that in other embodiments such as the second embodiment briefly described above, the anode and cathode surfaces can be reversed with the cathode layer on the inside diameter of the fuel cells and the anode layer on the outside diameter of the fuel cells and air flowing through the gas flow conduit formed by the fuel cells and fuel flowing over outside surface of the fuel cells without deviation from the present technology.

The fuel input manifold (2055) comprises a cylindrical chamber bounded by a disk-shaped top wall (2170) and the opposing disk-shaped top tube support wall (2070). The disk-shaped fuel input manifold top wall (2170) includes a thermally conductive mass (2160). The thermally conductive mass (2160) comprises one or more materials having a coefficient of thermal conductivity of more than 100 W/(m° K) and preferably more than 200 W/(m° K) such as one or more of copper, molybdenum, aluminum copper, copper nickel alloys or a combination thereof. The thermally conductive mass (2160) is in thermally conductive communication with the hot zone enclosure walls (2015) and specifically with the side wall (2002). The thermally conductive mass (2160) is positioned proximate to an annular cold start combustion chamber (2305), described below, in order to receive thermal energy from fuel that is combusted within the annular cold start combustion chamber (2305) during startup and to thermally conduct thermal energy received therefrom to the hot zone external walls (2015). Additionally, the thermally conductive mass (2160) radiates thermal energy received from fuel combustion within the annular cold start combustion chamber (2305) and received by thermal conduction through the hot zone enclosure walls to fuel (2027) as it passes through the fuel input manifold (2055).

The top tube support wall (2070) forms a gas tight seal with the journal-shaped supporting ends (2110) of each of the fuel cell top end caps (2095). Additionally each of the fuel cells (2080) is fixedly hung from the top tube support wall (2070) by the mechanical interface formed in the top tube support wall (2070) which includes through holes for receiving the journal-shaped supporting ends (2110) or manifold adaptors there through. Additionally, the fuel input manifold (2055) is bounded by the side wall (2002).

Since the present exemplary embodiment utilizes a CPOX reformer (2002) which uses an exothermal reaction to reform supply fuel, the reformer (2020) is a thermal energy source which is beneficially disposed inside the hot zone (2000) to heat incoming supply fuel and air mixture (2025) as the fuel enters the hot zone. However in other embodiments of SOFC systems of the present technology the reformer (2020) may utilize an endothermic reaction, e.g. a steam reformer or a thermally neutral reaction e.g. an autothermal reformer to reform the fuel and in these cases the reformer (2020) could be disposed outside the hot zone (2000) and placed instead in the cold zone (110), shown in FIG. 1. Thus, the improved hot zone (2000) of the present technology can be operated without a reformer (2020) without deviating from the present technology.

4.5 TAIL GAS COMBUSTOR

The tail gas combustor or combustion region (2135) is an annular volume disposed between the disk shaped bottom tube support wall (2075), which includes a thermal mass (2180), both described above and shown in FIG. 2 and a disk-shaped combustor end wall (2140) which also includes a thermal mass (2175). Both thermal masses (2180) and (2175) comprise one or more materials having a coefficient of thermal conductivity of more than 100 W/(m° K) and preferably more than 200 W/(m° K) such as one or more of copper, molybdenum, aluminum copper, copper nickel alloys or a combination thereof. The thermal masses (2180) and (2175) are positioned to receive thermal energy from the combustion region (2135) and are configured to conduct the thermal energy received from the combustion region to the hot zone enclosure walls (2015) as well as to radiate the thermal energy received from the combustion region into the cathode chamber (2090) and the recuperator chamber (2210).

An annular combustor baffle (2185) is provided inside the annual combustor region to redirect gas flow through the combustion region (2135) and create turbulence which increases convective energy transfer to the side walls of the combustion region (2135). The combustor baffle (2185) may be fixedly attached to the hot zone enclosure side wall (2002) or may comprise a portion of a combustion chamber liner described below.

A cathode feed tube (2145), described below, passes through the combustion region (2135) along the central longitudinal axis (2060). The walls of the cathode feed tube (2145) are heated by convective thermal energy transfer from combustion gases inside the combustion region (2135). Air flowing through the cathode feed tube (2145) toward the cathode chamber (2090) is heated by thermal energy radiated from the cathode feed tube (2145) to the air flowing there through.

Internal walls of the combustion region (2135) are lined with a high temperature, corrosion resistant metal such a Hastelloy alloy. In the case of the disk-shaped bottom tube support wall (2075), the surface facing the combustor region comprises Hastelloy. In the case of the combustor region end wall (2140), the surface facing the combustor region comprises Hastelloy. In each case the wall (2075) and (2140) is formed as a composite structure having a Hastelloy disk shaped liner in thermally conductive contact with the corresponding thermal mass (2180) and (2175) respectively. The side wall of the combustion region (2135) is also lined with a high temperature, corrosion resistant metal such a Hastelloy. In one non-limiting example embodiment the sidewall liner comprises separate element formed as a tube shaped open ended cylindrical wall with the combustor baffle (2185) formed integral therewith. Moreover the side wall liner is formed to be inserted into the hot zone enclosure side wall (2002) and from either of its open ends and to make thermally conductive contact with the side wall (2002) substantially over the entire surface of the wall liner.

4.6 RECUPERATOR

Air (2200) enters the cathode feed tube (2145) through an input port (2205) and flows into a recuperator chamber (2210). The recuperator chamber (2210) is positioned in close proximity to the tail gas combustion region (2135) in order to heat incoming air (2200) using thermal energy generated by combustion of the spent fuel occurring inside the combustion region (2135). The recuperator chamber (2210) is an annular chamber surrounding the cathode feed tube (2145) and is bounded on a top side by the disk-shaped combustor end wall (2140), on a bottom side by the disk shaped hot zone enclosure bottom wall (2006) and on its sides by the hot zone enclosure side wall (2002).

Thermal energy is conducted to walls of the recuperator chamber (2210) by the hot zone enclosure walls (2015), by the combustor end wall (2140) and to a lesser extent by the cathode feed tube (2145). Thermal energy is radiated from the recuperator chamber walls to the air (2200) as it passes through the recuperator chamber (2210). Outside walls of the recuperator chamber (2210) are further heated by hot exhaust gasses exiting from the combustion region (2135). In particular the recuperator chamber (2210) is surrounded by the air gap (2155) which carries hot exhaust gases exiting from the combustion region (2135) through combustor exit ports (2150) to the hot zone exit port (2165). Thermal energy from hot exhaust gases heats outside wall portions of the recuperator chamber walls by convective heat transfer.

A recuperator baffle (2215) is disposed inside the recuperator chamber (2210) and passes through the cathode feed tube (2145) preventing air flow through the cathode feed tube (2145). Thus air (2200) entering the cathode feed tube (2145) through the input port (2205) impinges on the recuperator baffle (2215) inside the cathode feed tube and is forced into the recuperator chamber (2210) through one or more air input ports (2225). The input air (2200) flowing into the recuperator chamber through the air input ports (2225) passes around the recuperator baffle (2215) and reenters the cathode feed tube through one or more recuperator air output ports (2235) after being heated in the recuperator chamber (2210).

4.7 COLD START COMBUSTOR

Referring to FIG. 2, the SOFC hot zone (2000) optionally includes a cold start combustor (2300) provided to initially heat the hot zone to an operating temperature above 350° C. or at least until spontaneous combustion occurs in the tail gas combustor region. The cold start combustor includes an annular startup combustion chamber (2305). The annular startup combustion chamber (2305) surrounds the catalyzing cavity (2035) and the annular thermal insulating element (2065). The annular startup combustion chamber (2305) is bounded on top by the disk shaped hot zone enclosure top wall (2004) and on bottom by the disk-shaped fuel input manifold top wall (2170), which includes the annular thermal mass (2175). The annular startup combustion chamber (2305) is further bounded by the hot zone enclosure side wall (2002).

A startup combustor inlet port (2310) receives unreformed startup fuel (2315) therein from a startup fuel source, not shown. The startup fuel (2315) may comprise various combustible gaseous or vaporized liquid fuels such as natural gas, propane, methane, hydrogen, alcohols, or a mixture of fuels and air. In some exemplary embodiments, the startup fuel (2315) includes the supply fuel and air mixture (2025). The startup fuel (2315) is delivered, along with air or another oxygen-containing gas, into the annular startup combustion chamber (2305) through the combustor inlet port (2310) and is ignited by an electric spark igniter (2320) or some other ignition source.

During startup combustion, thermal energy generated by startup fuel combustion inside the annular startup combustion chamber (2305) is transferred by convective thermal energy transfer to the hot zone enclosure top wall (2004) and side wall (2002) as well as to the fuel input manifold top wall (2170). From each of these walls the thermal energy from startup combustion is conducted to other regions of the hot zone by the thermally conductive hot zone enclosure walls (2015).

Exhaust gases from the start up combustion exit the annular startup combustion chamber (2305) through the startup combustor exit port (2325) which is in fluid communication with the air gap (2155) which leads to the hot zone exit port (2165). Thus, the exhaust gases flowing from the annular startup combustion chamber (2305) to the hot zone exit port (2165) further heat external surfaces of the hot zone enclosure walls (2015) by convective heat transfer.

Internal walls of the annular startup combustion chamber (2305) are lined with a high temperature, corrosion resistant metal such Hastelloy. In the case of the disk shaped hot zone enclosure top wall (2004) this wall is lined with a Hastelloy material layer on its inner surface wherein the Hastelloy layer is in thermally conductive contact with the hot zone enclosure top wall (2004). In the case of the disk-shaped fuel input manifold top wall (2170), a top side of this wall comprises a Hastelloy material layer in thermally conductive contact with the annular thermally conductive mass (2175).

In the case of the side walls a cylindrical wall liner comprising a Hastelloy material is inserted into the startup combustion chamber in thermally conductive contact with the hot zone enclosure side wall (2002).

4.8 GAS FLOW DIAGRAMS

4.8.1 Fuel Flow Diagram

Referring now to FIG. 3 a schematic fuel flow diagram depicts the flow path of the supply fuel and air mixture (2025) as it passes through the hot zone (2000). The supply fuel and air mixture (2025) enters the reformer input port (2045) and passes through the reformer catalyzing cavity (2035) to produce the fuel (2027), e.g., reformate (reformed fuel). The fuel (2027) exits the reformer through the reformer exit port (2050) and enters the fuel input manifold (2055). From the input manifold (2055), fuel enters each of the fuel cells (2080) through corresponding cell input ports (2115) and flows through each fuel cell and exits the fuel cells through corresponding cell output ports (2120). Inside the fuel cell (2080) the fuel reacts on the anode material layer forming the inside surface of the cell annular walls (2085). After exiting the fuel cells through the cell exit ports (2120) the remaining fuel (2027), which comprises unreacted fuel and reaction by-products enters the combustion region (2135) where it mixes with air exiting from the cathode chamber (2090) forming a mixture which is spontaneously combusted therein. As described above, thermal energy generated by combustion in the combustion region (2135) is transferred to side walls of the combustor region by radiation and convection and thermally conducted to other regions of the hot zone through the hot zone enclosure walls (2015). Additionally thermal energy generated by combustion in the combustion region (2135) may be transfer to each of the thermally conductive masses (2175) and (2180) proximate to the combustor region by gas to surface thermal transfer by convection and thermal conduction through the enclosure walls. Additionally, the thermally conductive masses (2175) and (2180) proximate to the combustor region respectively radiate thermal energy into the recuperator chamber (2210) and the cathode chamber (2090) to heat air passing there through.

After combustion exhaust gases from the combusted mixture (shown as dashed arrows) exit the combustion region (2135) through one or more combustor exit ports (2150) to the air gap (2155). From the air gap (2155) the exhaust gas from the combusted mixture exit the hot zone through a hot zone exit port (2165).

4.8.2 Fuel Flow Diagram Cold Start

As further shown in FIG. 3, startup fuel (2315) and air enters the annular startup combustion chamber (2305) through the startup combustor inlet port (2310) where the startup fuel is combusted.

After combustion exhaust gases (shown as dashed arrows) exit the combustion region (2135) through one or more startup combustor exit ports (2325) to the air gap (2155). From the air gap (2155) the exhaust gas from the startup combustor exit the hot zone through a hot zone exit port (2165).

4.8.3 Air Flow Diagram

Figure 4:
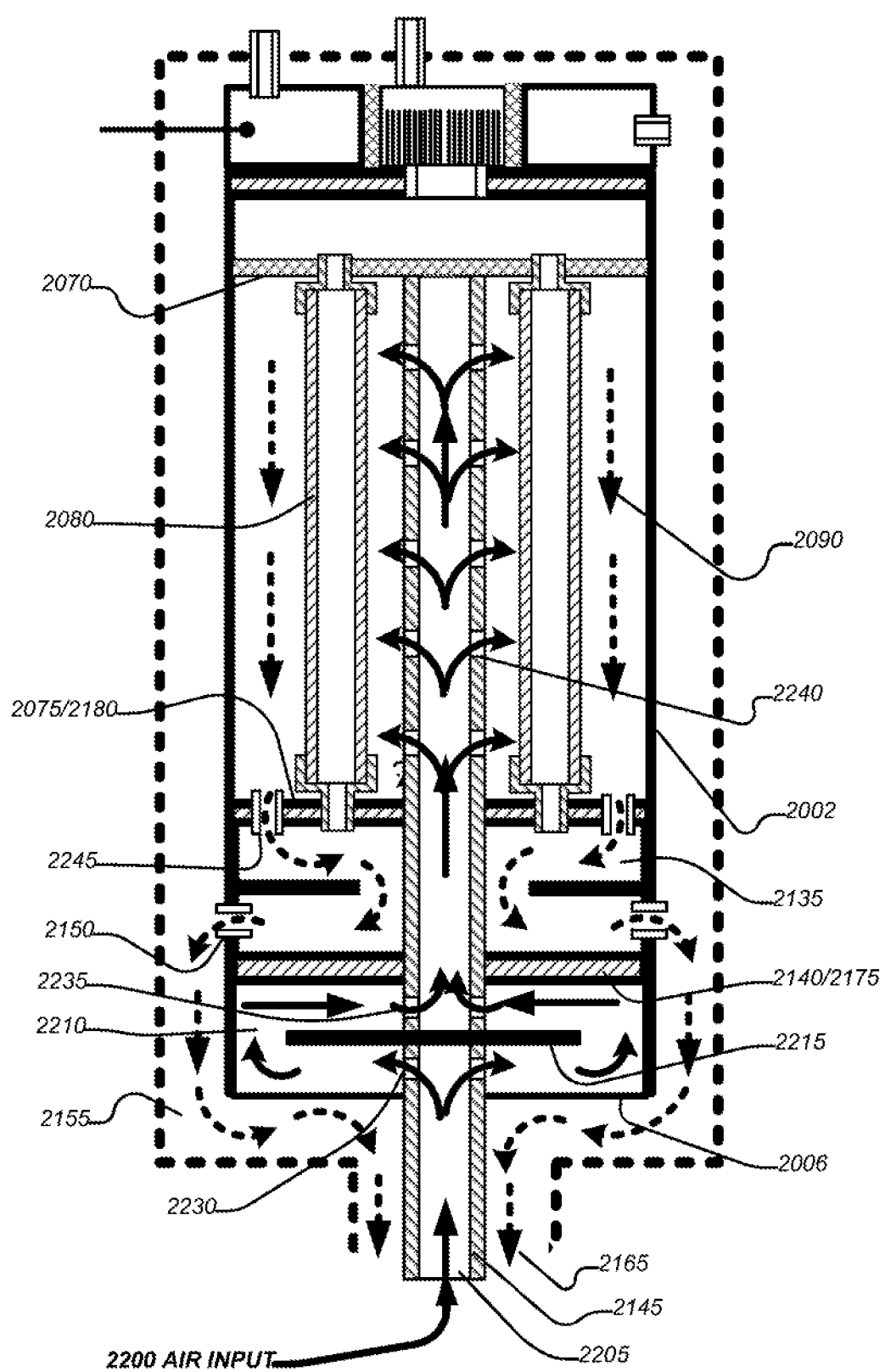
FIG. 4 depicts a schematic view of exemplary air flow pathways of a SOFC system according to the present technology.

Referring now to FIG. 4 a schematic air flow diagram depicts the flow path of air (2200) as it passes through the hot zone (2000). The air (2200) enters the cathode feed tube (2145) through an air input port (2205). The air (2200) exits the cathode feed tube through a recuperator air input port (2230) to enter the recuperator chamber (2210). Air flows around the recuperator baffle (2215) and reenters the cathode feed tube (2145) through a recuperator air output port (2235). Inside the recuperator chamber (2210) the air (2200) is heated by thermal energy radiated from the recuperator chamber walls (2006), (2002) and the combustor end wall (2140) and associated the annular thermally conductive mass (2175).

The air (2200) passes through the combustion region (2135) as it flows through cathode feed tube (2145). In the combustion region the air is further heated by thermal energy radiating from surfaces of the cathode feed tube (2145) before entering the cathode chamber (2090) while still flowing through the cathode feed tube (2145). The air (2200) exits the cathode feed tube and enters the cathode chamber (2090) through a plurality of cathode chamber air input ports (2240) disposed along a portion of the length of the cathode feed tube (2145) that extends into the cathode chamber (2090).

Once inside the cathode chamber (2090) the air (2200) fills the cathode chamber and impinges on the outside diameter or cathode layer of each of the fuel cells (2080) and reacts on the cathode material layer coated over at least a portion of the outside diameter of each of the fuel cells. The reaction between air passing over the cathode material layer coupled with the reaction of fuel (2027) passing over the anode material layer forming the inside diameter of each of the fuel cells generates a current flow which is conveyed to the DC current output terminals (140) over the electrical leads (2125) and (2130) shown in FIG. 3.

After reacting with the cathode material layers coated on each of the fuel cells, the oxygen reduced air (2200), (shown as dashed flow lines) exits the cathode chamber (2090) through one or more cathode chamber output ports (2245) which lead into the combustion region (2135). In the combustion region (2135) the oxygen depleted air mixes with unconsumed fuel (2027) exiting from the fuel cells and the mixture of is combusted. Exhaust gasses from the combusted mixture exit the combustion region (2135) through the combustor exit ports (2150) which lead to the air gap (2155). The air gap (2155) carries the exhaust gasses to the hot zone exit port (2165) and out of the hot zone.

While FIG. 4 schematically shows two diametrically opposing recuperator air input ports (2230), two diametrically opposing recuperator air output ports (2235) and pairs of two diametrically opposing cathode chamber air input ports (2240), however the actual device may include any hole pattern having one or more holes arranged around the circumference of the cathode feed tube (2145) as required for air flow distribution. Similarly FIG. 4 shows two diametrically opposed cathode chamber air output ports (2245) and two diametrically opposing combustor exit ports (2150), however, the actual device may include any hole pattern having one or more holes arranged around the circumference of the disk shaped wall (2004) or the side wall (2002) as may be required for air flow distribution. Alternate any of the gas ports described above may have non-circular shapes e.g. square, rectangular, and oval or slotted without deviating from the present technology.

4.9 ENCLOSURE WALL SURFACE TREATMENTS

According to an aspect of the present technology no copper surface is exposed to oxygen/air in order to avoid oxidation damage to the copper. This includes all surfaces forming the entire fuel flow pathway and all surfaces forming the entire airflow pathway since both the fuel and the air contain or could contain oxygen. Copper surfaces that may be exposed to fuel flow or to air flow are at least protected by a layer of nickel plating applied to a thickness of 0.0005 to 0.0015 inches, (12.5 to 38.1 µm) by electro-deposition plating or the like. The thickness of the nickel plating is more than 100 times the normal thickness of conventional nickel electro-deposition coatings and the thicker nickel coating is used to substantially prevent oxygen diffusion through the nickel coating.

This aspect of the present technology is shown in FIG. 5A which depicts a non-limiting exemplary section view taken through any one of the hot zone enclosure walls (2015). The hot zone cavity wall section (5005) includes a copper core (5010) comprising copper having a thermal conductivity approximately ranging from 370 W/(m° K) at 500° C. and 332 W/(m° K) at 1027° C. The copper core (5010) has a thickness in the range of 0.01-0.125 inches (0.25-3.2 mm) however other thicknesses are usable without deviating from the present technology. More generally the hot zone cavity wall thickness may increase or decrease as needed for a particular application. Generally thicker enclosure walls e.g. up to about 0.25 inches take longer to heat to a desired operating temperature but have the advantage that once heated to the operating temperature the thicker walls have a higher capacity for thermal conduction and are less prone to thermal gradient formation and provide a longer operating life than thinner walls when surface oxidation is the failure mode simply because it takes long to for thicker walls oxidize to a degree that the wall becomes unusable.

The copper core (5010) includes two opposing surfaces forming inside and outside surfaces of the enclosure wall and in a preferred embodiment each of the inside and outside surfaces of the copper core (5010) is completely covered by electro-deposition nickel coating layers (5015) on the inside surface and (5020) on the outside surface. Each nickel coating layer is applied to a layer thickness of at least 0.0005 inches, (12.5 µm) which is suitably thick to prevent oxygen diffusion through the nickel coating layer. More generally a desired nickel coating layer thickness in the range of 0.0005 to 0.0015 (12.5 to 38.1 µm) provides adequate surface protection from oxidation for a product life of up to about 40,000 hours and thicker nickel coatings are usable to increase product life time without deviating from the present technology. Referring to FIG. 2 the wall section (5005) is at least representative of outer walls of the hot zone enclosure walls (2015) including the side wall (2002), the disk-shaped top wall (2004), the disk shaped bottom wall (2006) and may be representative of some walls of the reformer enclosure walls (2030).

According to an aspect of the present technology combustion chamber surfaces are lined with a high temperature, corrosion resistant metal such a Hastelloy alloy in order to protect internal surfaces of the combustion chamber from surface damage from exposure to high temperatures, combustion byproducts and corrosive elements. Alternate Monel or Inconel is usable without deviating from the present technology.

This aspect of the present technology is shown in FIG. 5B which depicts a non-limiting exemplary section view (5025) taken through a combustion chamber side wall. The side wall section (5025) includes the copper core (5010) of the hot zone enclosure side wall (2002) and the electro-deposition nickel coating layers (5015) and (5020) applied over opposing sides of the copper core as described above. Specifically, the section view (5025) includes the same hot zone external wall (5005) shown in FIG. 5A. In addition, the combustion chamber side wall section (5025) further includes a Hastelloy alloy liner (5030) positioned to line the inside surface of the combustion chamber. Referring to FIG. 2 the side wall section (5025) is at least representative of cylindrical outer wall of the annular tail gas combustion region (2135) and the cylindrical outer wall of the annular cold start combustion chamber (2305). The sidewall section (5025) shows the hot zone side wall (2002) protected by the Hastelloy alloy liner element (5030). In the specific example of the tail gas combustion region (2135) the Hastelloy alloy liner element (5030) also includes the combustor baffle (2185) attached thereto or formed integral therewith. However, except for the presence of the combustor baffle (2185) the section (5025) is also representative of the top and side walls of the annular cold start combustion chamber (2305).

Each of the combustion regions (2135) and (2305) is also lined by a pair of opposing disk shaped Hastelloy alloy liner elements positioned to line the inside top and the inside bottom surfaces of the combustor region. In the case of the tail gas combustor region (2135) its chamber top wall is formed by the bottom tube support wall (2075) which includes a disk shaped Hastelloy alloy liner element (5050), shown in FIG. 5C. The liner element (5050) is disposed to face the inside of the annular tail gas combustion region or chamber (2135). The tail gas combustion region bottom wall is formed by the combustor end wall (2140) which also includes a disk shaped Hastelloy alloy liner (5060) facing the inside of the annular combustion region chamber (2135).

In the case of the annular cold start combustion chamber (2305) of the cold start combustor (2300) its top chamber wall is formed by the hot zone enclosure top wall (2004) which includes an annular shaped Hastelloy alloy liner element (5030) in contact with the inside top wall of the annular cold start combustion chamber (2305). Specifically the hot zone enclosure top wall (2004), also the top wall of the annular cold start combustion chamber (2305) is detailed in the section view of FIG. 5B which shows the copper core (5010) covered by electro-deposited nickel layers (5015) on the inside surface and (5020) on the outside surface and includes a Hastelloy alloy liner element (5030) in contact with the nickel layer (5015). While the section view (5025) is vertically oriented and includes the Hastelloy combustor baffle (2185) the section is the same as the top wall (2004) without the combustor baffle (2185) and rotated to a horizontal orientation like the top wall (2004).

The bottom wall of the annular cold start combustion chamber (2305) is formed by the top wall of the fuel input manifold (2170). This wall also includes an annular shaped Hastelloy alloy liner element (5060), similar to the one shown in FIG. 5B, in mating contact with the inside bottom wall of the annular cold start combustion chamber (2305).

According to an aspect of the present technology no incoming air (2200) is exposed to a surface that is formed from a material that includes chromium in order to avoid poisoning the cathode layer applied to exterior surfaces of the fuel cells (2080). This includes all surfaces forming the entire incoming air flow pathway which includes interior surfaces of the cathode feed tube (2145), the recuperator chamber (2210), the recuperator baffle (2215), exterior surfaces of the cathode feed tube (2145), interior surfaces of the cathode chamber (2090) and elements housed within the cathode chamber including the fuel cell end caps (2095) and (2100) and the top and bottom tube support walls (2070) and (2075).

In one non-limiting exemplary embodiment, the cathode feed tube (2145), the recuperator baffle (2215) and each of the bottom end caps (2100) are formed from a high temperature metal alloy that is chromium free and resistance to corrosion; e.g. a Monel alloy. Additionally at least a bottom surface of the combustor end wall (2140) which forms a top surface of the recuperator chamber (2210) is formed by or lined by a protective element formed from a high temperature metal alloy that is chromium free and resistant to corrosion; e.g. a Monel alloy. Similarly at least a top surface of the bottom tube support wall (2075) which forms a bottom surface of the cathode chamber (2090) is formed by or lined by a protective element formed from a high temperature metal alloy that is chromium free and resistance to corrosion; e.g. a Monel.

Internal surfaces associated with incoming air flow that are coated with the above descried electro-deposited nickel plating layer can be exposed to air flow without exposure to chromium. Nickel plated surfaces that may contact incoming air flow include the side wall (2002) which forms the sidewall of each of the recuperator chamber (2210) and the cathode chamber (2090), and the disk shaped bottom wall (2006) which forms the bottom wall of the recuperator chamber (2210). The surfaces each have a cross-section (5005) shown in FIG. 5A. Additionally other surfaces inside the cathode chamber (2090) formed by chromium containing materials such as the top tube support wall (2070) and the top end caps (2095) which are each formed from Inconel are covered by a layer of nickel plating applied to a thickness of 0.0005 to 0.0015 inches, (12.5 to 38.1 μm) by electro-deposition plating or the like in order to avoid air contamination with chromium.

Referring now to FIG. 5C a detailed section view depicts a section (5040) taken through the bottom tube support wall (2075). The detailed section view shows the thermally conductive mass (2180) which comprises a copper mass having a thermal conductivity approximately ranging from 370 W/(m° K) at 500° C. and 332 W/(m° K) at 1027° C. The copper mass (2180) has a thickness in the range of 0.01-0.375 inches (2.5-9.5 mm) however other thicknesses are usable without deviating from the present technology. A top surface of the bottom tube support wall (2075) faces the inside of the cathode chamber (2090) and is therefore lined with a disk shaped liner element (5045) formed from a high temperature metal alloy that is chromium free and resistant to corrosion; e.g. a Monel alloy in order to avoid contaminating the cathode gas with chromium. A bottom surface of the bottom tube support wall (2075) faces the tail gas combustion region (2135) and is lined with a disk-shaped liner (5050) formed from a Hastelloy alloy.

Figure 5D:
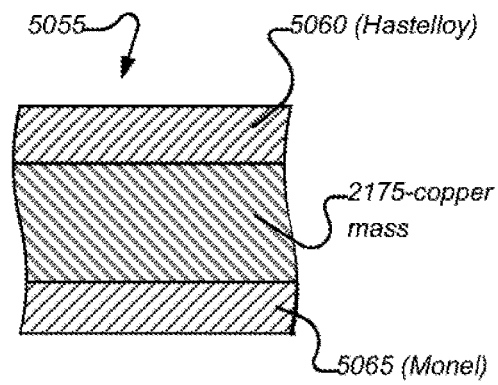
FIG. 5D depicts a section view taken through an exemplary combustion region end wall including a thermally conductive mass of a SOFC system according to the present technology.

Referring now to FIG. 5D a non-limiting exemplary detailed section view depicts a section (5055) taken through the combustor end wall (2140). The detailed section shows the thermally conductive mass (2140) which comprises a copper mass having a thermal conductivity approximately ranging from 370 W/(m° K) at 500° C. and 332 W/(m° K) at 1027° C. The copper mass (2175) has a thickness in the range of 0.01-0.375 inches (2.5-9.5 mm) however other thicknesses are usable without deviating from the present technology. A top surface of the wall (2140) faces the inside of the tail gas combustion region (2135) and is therefore lined with an annular liner element (5060) formed from a solid Hastelloy alloy. A bottom surface of the wall (2140) faces the recuperator chamber (2210) and is lined with an annular liner (5065) formed from a high temperature metal alloy that is chromium free and resistant to corrosion; e.g. a Monel alloy.

Figure 5E:
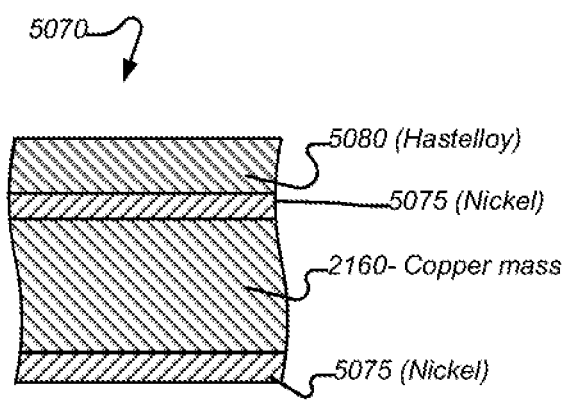
FIG. 5E depicts a section view taken through an exemplary combustion region bottom wall including a thermally conductive mass of a SOFC system according to the present technology.

Referring now to FIG. 5E a non-limiting exemplary detailed section view depicts a section (5070) taken through the fuel input manifold top wall (2170). The detail section view shows the thermally conductive mass (2160) which comprises a copper mass having a thermal conductivity approximately ranging from 370 W/(m° K) at 500° C. and 332 W/(m° K) at 1027° C. The thermally conductive copper mass (2160) has a thickness in the range of 0.01-0.375 inches (2.5-9.5 mm) however other thicknesses are usable without deviating from the present technology. Opposing top and bottom surfaces of the thermally conductive copper mass (2160) are optionally covered by a layer of nickel plating (5075) applied to a thickness of 0.0005 to 0.0015 inches, (12.5 to 38.1 μm) by electro-deposition plating or the like. The nickel plating is applied in order to avoid contact between the supply fuel and air mixture (2025) and the thermally conductive copper mass (2160) to avoid oxidizing the copper mass surfaces. A top surface of the fuel input manifold top wall (2170) faces the inside of the annular cold start combustion chamber (2305) and is therefore lined with an annular liner element (5080) formed from a solid Hastelloy alloy to protect the thermally conductive mass (2160) from thermal damage.

A further variation of the walls (2075) and (2180) shown in detail in FIGS. 5D and 5C is that both sides of the copper mass (2180) and (2175) are covered by a layer of nickel plating applied to a thickness of 0.0005 to 0.0015 inches, (12.5 to 38.1 μm) by electro-deposition plating or the like as described above e.g. with respect to FIG. 5E. The nickel plating is included in order to avoid contact between supply fuel and air mixture (2025) and or air (2200) and the corresponding copper mass (2180) and (2175) so that oxidizing the copper mass surfaces is avoided. In cases where the Hastelloy elements (5050) and (5060) and the Monel elements (5045) and (5065) comprise separate liner elements, i.e. not integrally formed with the copper mass (2180), the copper mass is preferably nickel plated on both of its opposing surfaces (e.g. as shown in FIG. 5E). However, in other cases where the disk or annular shaped liner elements (5045), (5050), (5060), (5065) are integrally formed with the copper mass (2180) and or (2175) nickel plating the copper mass may not be needed.

Generally, Hastelloy and Monel elements described above are used to protect various surfaces from damage or to avoid contaminating incoming air by contact with chromium containing surfaces such as Inconel or Hastelloy surfaces. In one nonlimiting example embodiment one or more protective elements is fabricated separately from the hot zone enclosure walls (2015) and installed in place at assembly such as by brazing a protective material layer onto a surface being protected. In the example copper mass (2180, 2175) shown in FIGS. 5C and 5D the protective Monel and Hastelloy layers are brazed directly to opposing surfaces of the copper mass without nickel plating the copper mass. Preferably the brazing step substantially gas seals the copper mass preventing air or fuel from contacting and oxidizing surfaces of the copper mass.

In the example thermally conductive copper mass (2160) shown in FIG. 5E the protective Hastelloy layer is brazed directly to a nickel layer (5075) of one surface of the copper mass that is disposed inside the combustion region (2135). In this non-limiting example embodiment, the Hastelloy layer is installed to protect the copper mass surface from direct exposure to combustion and corrosive elements. On the opposing surface, only a nickel plated protective layer (5075) is applied onto the copper mass surface which is disposed inside the recuperator chamber (2210) since only a nickel layer is needed to protect the copper mass surface from oxidation by incoming air. In the example of FIG. 5E the Hastelloy layer (5080) can be mechanically attached, e.g. by fasteners or clamped in place, without the need to gas seal the copper surface since the copper surface is already protected by the nickel layer (5075) disposed between the thermally conductive copper mass (2160) and the Hastelloy layer (5080).

Thus as described above, and particularly with respect to FIGS. 5B, 5C, 5D and 5E the Hastelloy and Monel elements may include a plurality of separate elements such as disk shaped elements (5040), (5050) (5060), (5065) (5080) in mating contact with disk shaped thermal mass elements (2180), (2175), (2160) or the Hastelloy and Monel elements may include cylindrical wall portions e.g. (5030) disposed in mating contact with internal cylindrical wall surfaces of combustion chambers such as the side wall (2002) of the hot zone enclosure walls. The cylindrical wall portions are inserted in appropriate positions inside the hot zone enclosure walls, e.g. inside the annular cold start combustion chamber (2305) and inside the tail gas combustion region (2135) and brazed, welded or otherwise fastened or clamped in place in mating contact with surfaces being protected. In some embodiments the Hastelloy and Monel elements may be applied directly to the conductive core surface (e.g. brazed directly onto a surface of the thermally conductive mass) with a substantially gas tight seal. In other embodiments the thermally conductive mass or core wall surface is nickel plated and the Hastelloy or Monel elements may be applied over the nickel plating without the need to provide a substantially gas seal and instead of brazing over the entire surface to provide a gas seal the elements may be held in place by clamping, by mechanical fasteners or by brazed or spot welded at selected points. In further embodiments any of the above described wall structured may be formed as a metal casting with various protective material layers formed on selected surfaces of the metal casting by well-known methods including plating, sputtering, spray coating hot dipping or the like.

However, in other non-limiting embodiments of the present technology portions of the external and or internal walls of the hot zone enclosure walls (2015) are formed from prefabricated multi-layered composite materials. The composite materials including plate and or tubing stock fabricated with a plurality of dissimilar metals layers which are usable to form various hot zone enclosure walls described herein.

In a first step sheets of dissimilar metals are joined together by an extrusion or rolling process generally referred to as cladding. In an example embodiment, referring to FIG. 5C, a composite sheet comprising a copper mass (2180), a Hastelloy alloy layer (5050) and a Monel alloy layer (5045) are roll welded to form the composite sheet. Once formed, the bottom tube support wall (2075) may be cut from the composite sheet and holes and other features added in secondary operations. The bottom tube support wall (2075) is then assembled to the hot zone enclosure walls (2015) by brazing, welding, mechanical fastening, clamping, high temperature adhesive bonding or the like. Additionally the wall (2140), shown in FIG. 5D, includes the same material layers as the bottom tube support wall (2075) shown in FIG. 5C only in reverse order, may be cut from the same composite sheet and holes and other features added in secondary operations. Each of the wall (2140) and bottom tube support wall (2075) is then assembled to the hot zone enclosure walls (2015) by brazing, welding, mechanical fastening, clamping, high temperature adhesive bonding or the like.

In an example embodiment, referring to FIG. 5E, a composite sheet comprising a thermally conductive copper mass (2160) and a Hastelloy alloy layer (5080) are roll welded to form a composite sheet. In this example embodiment the nickel layer (5075) may be omitted such that the composite sheet has only two layers. Once formed, the fuel input manifold top wall (2170) may be cut from the composite sheet and holes and other features added in secondary operations. The fuel input manifold top wall (2170) is then assembled to the hot zone enclosure walls (2015) by brazing, welding, mechanical fastening, clamping, high temperature adhesive bonding or the like. In a further step the composite sheet may be nickel plated on at least the copper surface to prevent oxidation of the exposed copper surface.

Similarly referring to FIG. 5B, a two layer composite sheet comprising a copper core (5010) and a Hastelloy layer (5030) are roll welded to form a composite sheet. In this example embodiment the nickel layer (5015) and (5020) may be omitted such that the composite sheet has only two layers. Once formed, holes and other features are formed by secondary operations and then the composite sheet is formed into a cylindrical wall. The cylindrical wall is cut to size and assembled with other cylindrical wall sections to form portions of the hot zone enclosure side wall (2002) associated with enclosing a combustion region. The cylindrical wall portions may be joined together by brazing, welding, mechanical fastening, clamping, high temperature adhesive bonding or the like. In a further step the composite sheet may be nickel plated on one or both sides and the assembled host zone enclosure side wall may be nickel plated to protect exposed copper surfaces from oxidation.

4.10 SOFC FUEL CELL STACK CONFIGURATIONS

Figure 6:
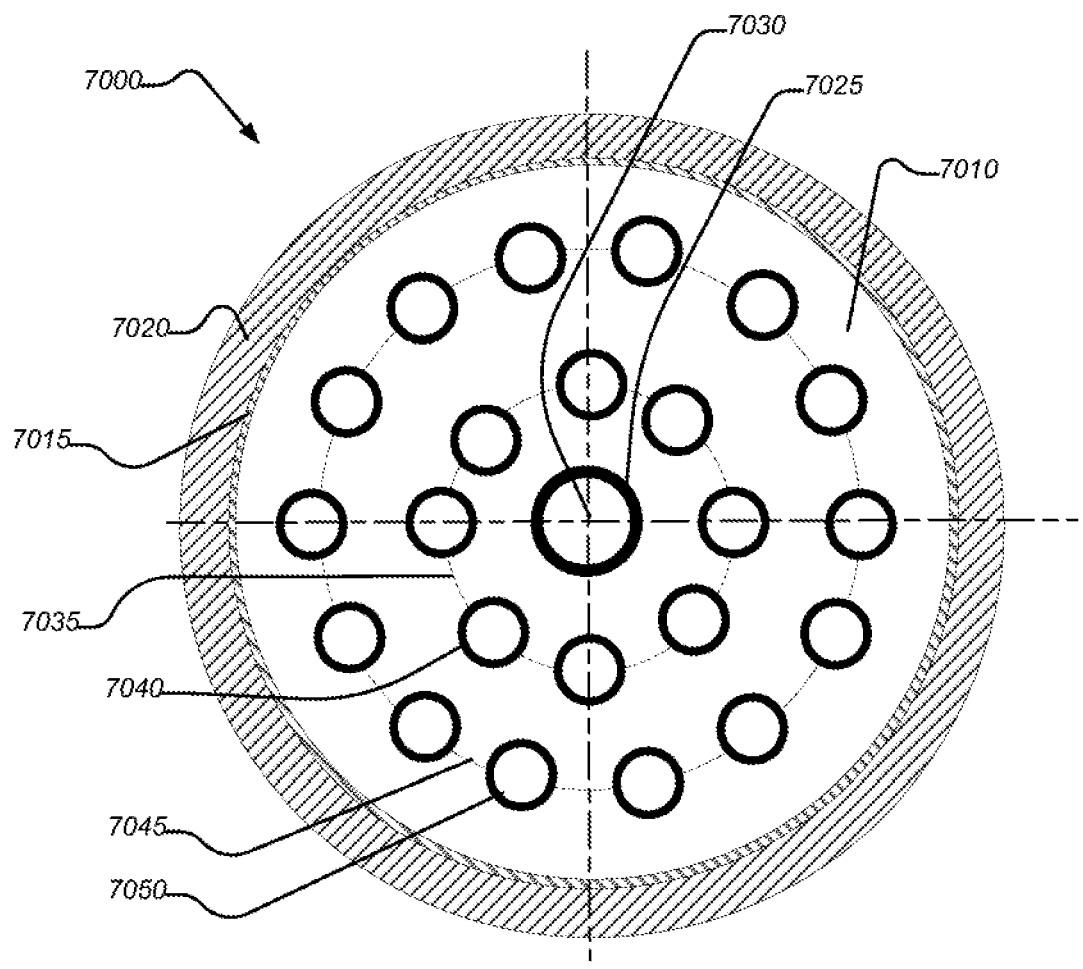
FIG. 6 depicts a schematic top section view of a SOFC system having a plurality of rod shaped fuel cells arranged in two concentric circular patterns according to the present technology.

Referring now to FIG. 6 portions of a non-limiting exemplary embodiment of a SOFC system embodiment (7000) usable with the present technology are shown in a top section view. The configuration (7000) depicts a cathode chamber (7010) enclosed by a circular hot zone enclosure wall (7015) shown in top section view. The circular enclosure wall (7015) is surrounded by a circular thermal insulation layer (7020) separated from the circular enclosure wall by a small air gap, not shown, usable as a gas flow conduit as described above.

A cathode feed tube (7025) is shown centered with respect to the circular hot zone enclosure wall (7015). A plurality of rod shaped fuel cells is disposed in two concentric circular patterns with each circular pattern centered with respect to the same center axes (7030). An inner circular pattern (7035) includes eight inner rod shaped fuel cells (7040). An outer circular pattern (7045) includes fourteen outer rod shaped fuel cells (7050). Other enclosure shapes and fuel cell patterns are usable without deviating from the present technology.

4.11 ALTERNATE SOFC SYSTEM EMBODIMENTS

Turning now to FIGS. 7-9 and 12-15, a first alternate non-limiting exemplary embodiment of a portion of an improved SOFC system (8000), shown in FIGS. 7A-9C, includes a U-shaped primary enclosure wall assembly (8045) enclosing SOFC stack (8005). A second alternate non-limiting exemplary embodiment of a portion of an improved SOFC system is shown in FIGS. 12-13B. The second alternative SOFC system includes two L-shaped primary enclosure wall assemblies (12045) with each L-shaped primary enclosure wall assembly (12045) enclosing a single SOFC stack (8005) to provide a duel stack SOFC system (12000). A third alternate non-limiting exemplary embodiment of a portion of an improved SOFC system (14000), is shown in FIG. 14. The third alternative SOFC system (14000) includes one L-shaped primary enclosure wall assembly (12045) enclosing a single SOFC stack (8005). A fourth alternate non-limiting embodiment of a portion of an improved SOFC system (15000) is shown in FIG. 15. The fourth alternative SOFC system (15000) includes two U-shaped primary enclosure wall assemblies (8045) each enclosing a different SOFC stack (8005). Each SOFC stack (8005) includes a plurality of individual fuel cells (8010). In a non-limiting exemplary embodiment the individual fuel cells (8010) are arranged in pairs of two individual fuel cells positioned side by side along a stack transverse width axis (y) as defined by a system coordinate axes diagram (8100) (shown in FIGS. 9A, 12 and 14). In the present embodiment, a plurality of pairs of two fuel cells (8010) are positioned side by side along a stack longitudinal length axis (x). However, the technology described herein is not limited to the exemplary arrangement of fuel cells in the present embodiment and further is not limited to tubular fuel cells. Any other suitable arrangement of fuel cells within an SOFC stack is usable without departing from the concepts of the technology described herein. The number of fuel cells (8010) in the SOFC stack is selected to meet a predefined electrical power generation demand or other stack capacity consideration. In other embodiments the number of fuel cells arranged along either of the stack transverse width axis (y) or the stack longitudinal length axis (x) can be one or more with the total number of individual fuel cells (8010) selected to meet a predefined electrical power generation demand or other stack capacity consideration.

In a non-limiting exemplary embodiment, each fuel cell (8010) comprises an open-ended hollow fluid conduit disposed along a conduit central axis. The shape of the hollow fluid conduit is preferably cylindrical or oval; however, other fluid conduit shapes such as square, rectangular, triangular, or other polygon, are usable without deviating from the present technology. Alternately, hollow fluid conduits can be arranged in any embodiment that includes an anode layer separated from a cathode layer by an electrolyte layer with an anode gas (e.g., reformate or syngas) passing over the anode layer and a cathode gas (e.g. air) passing over the cathode layer without deviating from the present technology.

Each fuel cell is formed by a perimeter wall surrounding the hollow fluid conduit. The perimeter wall comprises three primary material layers each shown schematically in FIG. 1. The three primary material layers include an anode layer or fuel electrode (150), a cathode layer or air electrode (155), and an electrolyte layer (145) separating the anode layer from the cathode layer. All the layers comprise solid materials, some of which (e.g., an anode) may include a solid material formed with a porous structure. In the present non-limiting exemplary embodiment, the perimeter wall includes an inside surface formed by the anode layer, an outside surface formed by the cathode layer and the electrolyte layer disposed between the anode layer and the cathode layer. Preferably one of the three layers is configured as a support layer, e.g. the anode layer, wherein the support layer is formed with enough structural stiffness and integrity to support each individual fuel cell (8010) in the operating position described below.

Referring to FIGS. 7A and 7B, each fuel cell (8010) includes a fuel input end (8020) and a fuel output end (8025) corresponding with opposing open ends of the hollow fluid conduit. At least the fuel input end (8020) is supported by an interface with a fuel input manifold (8015) or other support structure. In a non-limiting example, the fuel input end (8020) of each fuel cell includes an end cap (2100) formed as cup shaped attaching end (2105) and a journal shaped supporting end (2110) configured to mechanically interface the fuel input end of each fuel cell with a fuel input manifold (8015) such that the end cap (2100) couples the fuel input end with the fuel input manifold. Other mechanical interfaces of each fuel cell with a fuel input manifold (8015) are usable without deviating from the present technology. The mechanical interface of each fuel cell (8010) with the fuel input manifold (8015) is configured to fixedly support each individual fuel cell (8010) in an operating position wherein a central longitudinal axis of the hollow fluid conduit of each individual fuel cell (8010) is supported substantially parallel with the stack gas flow axis (z). The mechanical interface between the fuel input manifold and the fuel input end (8020) of each individual fuel cell (8010) forms a gas tight seal. In a preferred embodiment, the fuel output end (8025) of fuel cell (8010) is unsupported; however, an upper support structure for supporting the fuel output end (8025) of individual fuel cells (8010) with respect to the primary enclosure wall or other mechanical support structure is usable without deviating from the present technology.

As compared with the embodiments shown in FIG. 2 and described above, which delivers a flow of fuel (2027) into a top of the SOFC system and a flow of cathode air (2200) into a bottom of the SOFC system (2000), the fuel flow direction through the SOFC stacks shown in FIGS. 7A, 7B, 12, 14, and 15 is reversed because the corresponding fuel input manifolds (8015) are near the base or bottom end of the corresponding SOFC systems with only the bottom or fuel input end (8020) supported by the fuel input manifold (8015) and the end caps (2100) or other coupling elements. Thus, according to an aspect of the present technology the fuel output end (8025) of the individual fuel cells is not supported or mechanically interfaced with other elements of the SOFC system. This support structure is advantageous because it allows the fuel cells to expand and contract longitudinally during thermal cycling, e.g. on-off cycling thereby avoiding stress in the fuel cells during thermal cycling. Additionally, this support structure is advantageous because it does not require a gas seal at the fuel output end (8025). Overall, the lack of output end support reduces cost and complexity while improving reliability by eliminating potential system failure modes.

As shown in each of FIGS. 7A, 7B, 12, 14, and 15, the fuel output end (8025) of each individual fuel cell (8010) is positioned to expel spent fuel from the fuel output end (8025) to a combustion region (8030) after the fuel has passed through the hollow conduit and interacted with the anode layer that forms the inside surface of each hollow conduit. As shown by the dashed fuel flow indicator lines and arrows of FIGS. 7A, 7B, 12, 14, and 15, a supply of fuel exits from a fuel reactor or fuel reformer (8035), flows through a fuel delivery conduit (8040) to the fuel input manifold (8015) where the fuel flow is distributed from the fuel input manifold to the fuel input end (8020) of each individual fuel cell (8010).

The fuel reformer (8035) is described above as the fuel reformer (2020) shown in FIG. 2 and fuel reformer (165) shown in FIG. 1. Details of a non-limiting embodiment of the fuel reformer (8035) are disclosed in related U.S. patent application Ser. No. 15/287,402 filed on 16 Oct. 2016 and published as U.S. Ser. No. 10/573,911B2 on 25 Feb. 2020.

While passing through each fuel cell, the fuel reacts with oxygen ions (O$^+$) passed from the cathode layer to the anode layer and becomes depleted of hydrogen (H$^2$) and carbon monoxide (MO) in order to generate an electrical current flow. The depleted or spent fuel exits from each fuel cell through the output end (8025) to mix with spent cathode air in the combustion region (8030). Other fuel reformer configurations and operating modes are usable without deviating from the present technology.

The SOFC system (2000) shown in FIGS. 2-4, and described above is configured with individual fuel cell input ports or input ends (2125) positioned at the top of the SOFC stack and with the fuel cell output ports or output ends (2120) positioned at the bottom of the SOFC stack. The SOFC system (2000) also positions the fuel input manifold (2055) above the fuel cell input ports or input ends (2125). The SOFC system (2000) is also configured with an annular cold start combustion chamber (2305) surrounding the catalyzing cavity (2035) of the fuel reformer (2035). The SOFC system (2000) also positions the tail gas chamber (2135) and the recuperator chamber (2210) at the bottom of the SOFC stack to receive spent fuel from the fuel cell output ports or output ends (2120). The SOFC system (2000) receives incoming air (cathode gas) into the recuperator chamber (2210) from the air input ports (2225) situated at the bottom end of the SOFC system (2000) and expels exhaust gases from the recuperator chamber through the hot zone exit port (2165). As further shown in FIG. 2, a supply fuel and air mixture (2025) enters the SOFC system (2000) to the fuel reformer (2020) for steady state operations and to the startup combustion chamber (2305) through the inlet port (2310), both of which are positioned at the top end of the SOFC stack.

According to an aspect of the present technology the alternative SOFC systems (8000, 12000, 14000, 15000) described herein provide alternative gas flow patterns as compared to the gas flow characteristics of the system (2000) described above. Referring to FIGS. 7A, 9A, 12, 14 and 15, a supply fuel and air mixture (2025), is receiving into corresponding fuel reformers (8035) at the top of the SOFC system. From the fuel reformers, (8035) fuel (8150) is delivered to corresponding fuel input manifolds (8015) by a fuel delivery conduit (8040). In preferred embodiments, the fuel delivery conduits (8040) are housed inside an intermediate enclosure (9000) or an outer enclosure (16000) each described below.

As best shown in FIG. 9A, a startup fuel (8152) is delivered to a burner assembly (8155) through a conduit (8145). The burner assembly extends through corresponding combustion regions (8030) and injects the startup fuel (8152) into the combustion regions during cold start operations. An ignitor (8160) is positioned inside the combustion region to ignite fuel flow exiting from the burner assembly to initiate combustion inside the corresponding combustion regions (8030). As shown in FIGS. 12 and 15, when the SOFC system is a duel stack system, these systems preferably include a burner assembly (8155) and an ignitor (8160) provided in each combustion regions (8030). As detailed below, each burner assembly includes a startup up fuel conduit (8145) for receiving a startup fuel (8152) from a connection with the supply fuel input line (160) or from a separate startup fuel source. Each fuel delivery conduit (8040) may include one conduit segments connected to one or more startup up conduits (8145) for use during start up. The corresponding fuel delivery conduits may include control elements, e.g. valves and valve actuator elements operable by an electronic controller (190) to independently modulate fuel flow and or divert fuel from the fuel reformer (8035) to one or more fuel input manifolds (8015) and to divert supply fuel from the supply fuel input line (160) to one or more startup up conduits (8145) under control by the electronic controller (190).

4.12 ALTERNATE SOFC COLD START OPERATION

Referring to FIGS. 7A, 9A, 12, 14 and 15, cathode air is receiving into corresponding recuperator chambers (9050) at the top of the SOFC system through the cathode input port (9040) and exhaust gases are directed out of the hot zone exhaust conduit (9055) through the exhaust (9045) which also positioned at the top of the SOFC system. Accordingly, as best shown in FIG. 16B, each of the alternate SOFC systems (8000, 12000, 14000, 15000) of the present technology is configured with all input and outlet gas ports extending from a top wall of the SOFC system.

The combustion region (8030) includes a burner element (8155), shown in FIG. 9A, through which a startup fuel is delivered, via startup fuel input conduit (8145), during a cold start operation. The startup fuel is ignited in the combustion region (8030), e.g. by an electrical ignitor (8160), to provide thermal energy for heating one or more primary enclosure wall assemblies (e.g., (8045) or (12045)) during the cold start operation. After the SOFC system is heated to an operating temperature that can support a SOFC reaction in the fuel cells, a fuel flow from the fuel reformer (8035) to the SOFC stack through the input manifold (8015) is started in order to initiate a SOFC reaction. The startup fuel can be a reformate generated by the fuel reformer e.g. when the fuel (8150) is delivered to the startup conduit (8145) as startup fuel (8052), supply fuel and air mixture (2025), or an alternate startup fuel (8152), e.g. propane or the like. Startup fuel can be delivered from another source e.g. through an additional start up fuel conduit (16020) shown in FIG. 16A. In this embodiment, the startup input conduit (16020) is fluidly interfaced with one or more start up conduits (8145). An advantage of the configuration of the combustion region (8030) shown in FIGS. 7A, 7B, 12, 14, and 15 is that the combustion region (8030) is configured for two operating modes: a startup mode where fuel is delivered to burner element (8155) or and steady state power generation mode where fuel (8150) is delivered into individual fuel cells from the fuel input manifold (8015) and spent fuel and spent cathode gas are combusted in the combustion region (8030). In other embodiments and operating modes, the fuel delivery conduit (8040) feeds each of the startup conduits (8145) and the startup mode includes simultaneous delivery of fuel (8150) to corresponding startup burner elements (8155) and fuel input manifold (8015). The functional combination of the combustion region (8030) for startup and power generation is advantageous because it reduces the overall volume of the SOFC system and reduces part count and complexity, as well as directly heating the primary enclosure wall assembly (8045) and (12045), described below, the incoming cathode air, and the fuel cells (8010) which are heated on inside surfaces by fuel flowing therethrough and heated on outside surfaces by cathode air flow, and by thermal energy being radiated and convectively transferred from the primary enclosure wall assembly. As compared to embodiments shown in FIGS. 1 through 4, where the startup chamber (2035) more directly heats the fuel reformer and the incoming anode gas configurations that include the combustion regions (8030) surrounded by a combustion wall portion more directly heat the primary enclosure wall assembly (8045, 12045) which redistributes the thermal energy absorbed from the combustion region (8030) to other regions distal from the combustion region by thermal conduction.

4.12.1 U-Shaped Primary Enclosure Wall Assembly

Referring to FIGS. 9A and 9C, an exemplary hot zone enclosure assembly (8042) is shown in a side isometric view. The hot zone enclosure assembly (8042) includes a U-shaped primary enclosure wall assembly (8045) that includes a combustion region wall (8060) formed with a cylindrical radius and two opposing primary enclosure sidewalls (8065, 8070) extending from edges of the combustion region wall (8060). Each of the sidewalls (8065, 8070) extends from the combustion region wall to a lower volume (8142) of the cathode chamber e.g. below the cathode chamber input ports (8095) along an axis that is parallel with the gas flow axis (z). The hot zone enclosure assembly (8042) further includes the fuel input manifold (8015), an optional hot zone enclosure base wall (8075) and two optional hot zone enclosure end walls (8080, 8085). The U-shaped primary enclosure wall assembly (8045) defines a cathode chamber (8055) (shown in the section views of FIGS. 7A and 7B). The cathode chamber (8055) encloses the SOFC stack (8005) and the combustion region (8030) such that the cathode layer formed on outside surfaces of each individual fuel cell (8010) is exposed to the cathode chamber (8055). The cathode chamber (8055) is bounded by the U-shaped primary enclosure wall assembly (8045), the fuel input manifold (8015) and optionally by the hot zone enclosure base wall (8075) and optionally by the hot zone enclosure end walls (8080, 8085).

The cathode chamber (8055) receives a continuous flow of heated cathode gas, in this case a heated air flow, from an external air flow source, e.g. the air delivery control system, (198) shown in FIG. 1. The combustion region (8030) forms an upper most volume of the cathode chamber (8055). A lower volume (8142) of the cathode chamber, proximate to fuel input ends (8020), receives heated air flow (cathode gas) through a plurality of cathode chamber input ports (8095) shown in FIG. 9B. A middle volume (8140) of the cathode chamber extends from the lower volume (8142) of the cathode chamber to the fuel output end (8025) of each individual fuel cell (8010). The heated cathode gas flow reacts with the cathode layer surface of each individual fuel cell (8010) as the heated cathode gas flow passes over external surfaces of the individual fuel cells.

A non-limiting exemplary embodiment of the U-shaped primary enclosure wall assembly (8045) includes a combustion region wall (8060) formed to enclose the combustion region (8030). The combustion region wall (8060) provides an upper boundary of the combustion region (8030) substantially along the full length of the stack length axis (x) and may extend further beyond the full stack length. The U-shaped primary enclosure wall assembly (8045) further includes two opposing primary enclosure side walls (8065, 8070). Each primary enclosure side wall (8065, 8070) extends from the combustion region wall (8060) and is fixedly attached thereto or integrally formed therewith. Preferably each primary enclosure sidewall extends the length of the fuel cell stack (8005) from the open fuel output end (8025) to the fuel input end (8020) parallel with the gas flow axis (z).

Together, the two opposing primary enclosure side walls (8065, 8070) and the combustion region wall (8060) bound a top and opposing sides of the cathode chamber (8055) along the stack length axis (x), this is best shown by the section view of FIG. 7B. Preferably the combustion region wall (8060) and the enclosure side wall or walls (8065, 8070) are formed as a unitary element to promote thermal conduction throughout. However, when combustion region wall (8060) and enclosure side walls (8065, 8070) wall(s) are formed as individual wall elements, the individual elements are joined in a manner that provides high thermal conductivity across the joint boundary, e.g. using a joining material that has a coefficient of thermal conductivity between 100 and 300 W/m° K.

In a non-limiting exemplary first embodiment, shown in FIG. 9C, a hot zone enclosure assembly base wall (8075) is mechanically interfaced with bottom edges of each of the two opposing primary enclosure side walls (8065, 8070). The mechanical interface is a weld or solder interface; however, other mechanical interface elements are usable including fasteners, interconnecting fastening elements, e.g. rivets, clips or interlocking features formed integral with each of the two opposing primary enclosure side walls (8065, 8070) and/or formed integral with the hot zone enclosure base wall (8075), or the hot zone enclosure base wall (8075) can be formed integral with one of the two opposing primary enclosure side walls (8065, 8070). In the non-limiting first embodiment of FIG. 9A the fuel input manifold (8015) can be mechanically interfaced with the hot zone enclosure base wall (8075), e.g. by welding, brazing, soldering, or mechanical fasteners without necessarily being interfaced with one or both of the two opposing primary enclosure side walls (8065, 8070).

In a non-limiting second exemplary embodiment, shown in FIG. 7A, each of the two opposing primary enclosure assembly side walls (8065, 8070) is or can be mechanically interfaced with the fuel input manifold (8015) without a base wall (8075). The mechanical interface between each hot zone enclosure assembly side wall and the fuel input manifold is a weld or solder interface; however, other mechanical interface elements are usable including separate fasteners and/or fastening elements formed integral with one or both of the two opposing primary enclosure assembly side walls (8065, 8070) and/or formed integral with the fuel input manifold (8015) in a manner that provides the desired mechanical interface. In the non-limiting second embodiment of FIG. 7A the hot zone enclosure base wall (8075) is optional when the fuel input manifold (8015) is configured as a lower boundary of the cathode chamber (8055) along the full length of the stack length axis (x) and in some cases further beyond the full stack length. Preferably, the mechanical interface between the two opposing primary enclosure assembly side walls (8065, 8070) and the fuel input manifold (8015) forms a gas seal or provides a high impedance to gas flow at the lower boundary of the cathode chamber (8055) to prevent cathode air flow from escaping from the cathode chamber (8055) lower boundary.

4.12.2 Intermediate Enclosure

The hot zone enclosure wall assembly (8042) installs inside an intermediate enclosure (9000), shown in an isometric transparent view in FIG. 8A. The intermediate enclosure is or can be formed as a gas tight gas flow chamber comprising opposing intermediate enclosure top wall (9005) and intermediate enclosure bottom wall (9010), opposing intermediate enclosure side wall (9015) and intermediate enclosure side wall (9020) and opposing intermediate enclosure end wall (9025) and intermediate enclosure end wall (9030). The intermediate enclosure (9000) includes a fuel access port (9035) for receiving the fuel delivery conduit (8040) there through, a cathode input port (9040) for receiving a cathode air flow there through, and an hot zone exhaust port (9045) for expelling exhaust out therefrom. Each of the ports (9035), (9040) and (9045) passes through a wall of the intermediate enclosure as required to direct the appropriate gas flow interface. In a non-limiting exemplary embodiment, the fuel port passes through one of the side walls (9015, 9020) and each of the cathode gas input port (9040) and the hot zone exhaust port (9045) pass through the intermediate enclosure top wall (9005).

A recuperator chamber (9050) and an hot zone exhaust conduit (9055), shown in FIG. 7A, are each gas flow chambers formed inside the intermediate enclosure (9000) and together form a counter flow gas to gas heat exchanger. The recuperator chamber (9050) receives incoming cathode air flow from a cathode air flow source, e.g. the air delivery control element (198) shown in FIG. 1, through a cathode input port (9040). Inside the recuperator chamber (9050) the incoming cathode air flow, e.g. ambient temperature air, is heated by convection and by radiation being emitted from walls of the hot zone exhaust conduit (9055). The heated cathode air flow is forced through the recuperator chamber (9050) and exits from the recuperator chamber to a cathode input manifold (9070) through a recuperator exit port (9065). The cathode air flow source includes a variable speed air moving device (e.g., a fan or blower) that can be controlled to increase or decrease the flow rate of the incoming cathode air flow in accordance with electrical output demands and other process control commands.

The hot zone exhaust conduit (9055) receives a hot gas mixture from the combustion zone (8030) through a combustion exhaust port (9060). Inside the hot zone exhaust conduit (9055), the hot gas mixture is cooled as energy is convectively and radiatively transferred to the walls of the hot zone exhaust conduit (9055). The hot gas mixture is forced through the combustion exhaust channel (9060) and out of the SOFC system through the hot zone exhaust port (9045) by operation of the variable speed air moving device (e.g., a fan or blower) that can be controlled to increase or decrease the flow rate of the incoming cathode air flow.

In the non-limiting exemplary configuration of FIG. 7A, the recuperator chamber (9050) is formed inside the hot zone exhaust conduit (9055) and the two chambers share a common wall (9075). When high temperature gas mixture is forced from the combustion region (8030) into the hot zone exhaust conduit (9055), the high temperature gas mixture transfers thermal energy to the shared wall (9075) by radiant emission and convection. The shared wall (9075) then transfers thermal energy to the cathode air flow passing through the recuperator chamber (9050) by convection and radiant emission therefrom. Other gas to gas heat exchange configurations including providing a plurality of heat exchange chambers connected in serial or in parallel are usable without deviating from the present technology.

Each of the recuperator chamber (9050) and the hot zone exhaust conduit (9055) is preferably disposed along the length of the SOFC stack along the stack length axis (x). Each of the cathode input port (9040), and/or the hot zone exhaust port (9045), and/or the combustion exhaust port (9060) can each be implemented as a single port, as a plurality of ports e.g. spaced apart along the stack length axis (x), and/or a one or more openings disposed along the stack length axis (x), e.g. formed as circular, slotted or other openings that provide gas flow passages. Alternately, each of the recuperator chamber (9050) and the hot zone exhaust conduit (9055) can be implemented as a single recuperator chamber and a single exhaust chamber extending along the stack length axis (x) or as a plurality of separated recuperator and exhaust chambers disposed along the stack length axis (x) in parallel, with each separate chamber provided with its own cathode input port (9040), and/or the hot zone exhaust port (9045).

In a preferred embodiment each wall portion of the intermediate enclosure (9000) is fabricated from ferritic stainless steel such as Alloy18 SR® Stainless Steel, e.g. distributed by Rolled Metal Products, of Alsip, TL, US. The Alloy18 SR® Stainless Steel is preferred because under operating temperatures and conditions of the SOFC system (8000) the added aluminum content advantageously forms a surface layer of aluminum oxide which prevents oxidation of exposed surfaces of the intermediate enclosure (9000) which further prevents chromium from leaching from the Alloy 18 SR® Stainless Steel. In a non-limiting example, the Alloy18 SR® Stainless Steel has the following chemical composition in approximate weight percentage, carbon 0.015, chromium 18.0, manganese 0.30, silicon 0.60, aluminum 2.0, titanium 0.25 with the remaining weight percentage iron. The Alloy18 SR® Stainless Steel has a coefficient of thermal conductivity of about 22.8 (W/m° K) and a coefficient of thermal expansion of $5.9 \times 10^{-6}$ (Ft/Ft/° F.) or $10.1 \times 10^{-6}$ (m/m/° K). A preferred thickness of the Alloy18 SR® Stainless Steel, at least for the surrounding intermediate enclosure walls (9005, 9010, 9015, 9020, 9025, 9030), is 4 mm (0.16 inches); however, a thickness range of 0.127 mm to 8.0 mm (0.005 to 0.32 inches) is usable and may depend on the shape and size of the intermediate enclosure (9000), the forming methods used to form the intermediate enclosure (9000), the availability of standard rolled stock thickness, the desired operating life in hours, or the like, without deviating from the present technology.

With respect to material selection, the walls surrounding intermediate enclosure walls (9005, 9010, 9015, 9020, 9025, 9030) may have different thickness than the walls that form the hot zone exhaust conduit (9055), the recuperator chamber (9050), the baffle(s) (9080) and various ports (9040, 9045, 9060) since the wall thickness selection can depend on, a wall operating temperature requirements, a desired operating life of the SOFC system, a thermal energy management demand and/or structural and fabrication technique differences from one SOFC system to another. In an alternate exemplary embodiment, at least a portion of the walls of the intermediate enclosure (9000) can comprise a chromium free high temperature metal alloy such as Monel which is a nickel-copper alloy with small addition of aluminum and titanium.

4.12.3 Cathode Input Manifold

Referring to FIGS. 7A, 8A, the intermediate enclosure (9000) is formed as a cathode gas flow chamber that includes the recuperator chamber (9050) and a cathode input manifold (9070). The cathode input manifold receives incoming cathode air flow from the recuperator chamber which fills the cathode input manifold (9070). The hot zone enclosure assembly (8042) is installed inside the cathode input manifold (9070) and the U-shaped primary enclosure wall assembly (8045) separates the cathode input manifold from the cathode chamber (8055) except that cathode air flow can pass from the cathode input manifold to the cathode chamber through the plurality of cathode chamber input ports (8095) which are positioned proximate to the open fuel input end (8020) of each of the plurality of SOFC fuel cells in order to direct cathode gas flow into the bottom volume of the cathode chamber so that cathode gas flows inside the cathode chamber passes over the full length of the cathode of each fuel cell along the gas flow axis (z). The cathode input manifold (9070) is bounded by inward facing surfaces of each of the intermediate enclosure bottom wall (9010), the intermediate enclosure side walls (9015, 9020), the intermediate enclosure end walls (9025, 9030), by outward facing surface of the bottom wall (9059) of the hot zone exhaust conduit (9055), and by outward facing surfaces of the U-shaped primary enclosure wall assembly (8045). The cathode input manifold (9070) receives heated cathode air flow from the recuperator exit port (9065). Inside the cathode input manifold (9070) the heated cathode air flow is further heated by radiation emitted from the U-shaped primary enclosure wall assembly (8045) and the intermediate enclosure walls, e.g. (9005, 9010, 9015, 9020, 9025, 9030) shown in FIG. 8A as the heated cathode air flow received from the recuperator exit port (9065) and by convection due to movement of the cathode air flow through the cathode input manifold. Cathode air flow exits from the cathode input manifold (9070) and enters the cathode chamber (8055) through one or more cathode chamber input ports (8095) passing from the cathode input manifold (9070) to the lower volume (8142) of the cathode chamber (8055). In a preferred embodiment, a plurality of cathode chamber input ports (8095) pass through each of the primary enclosure sidewalls (8065, 8070) proximate to bottom edges thereof. Once inside the cathode chamber (8055) the preheated cathode air flows upward from the cathode chamber input ports (8095) to the cathode chamber middle volume where the cathode air reacts with external surface of the fuel cells to promote the SOFC reaction. The preheated cathode air then reaches the combustion region (8030) where spent cathode air mixes with spent fuel and the mixture is combusted.

The cathode air flow through the SOFC system (8000) is illustrated in FIG. 7A, as indicated by sold black lines with black arrow heads showing the direction of the cathode air flow and its pathway. Input cathode air flow is received from an air delivery module (198) which includes a variable speed fan or other air moving device and a corresponding air flow rate delivery controller. Cathode air flow passes from the air delivery module (198) to the cathode input port (9040) to the recuperator chamber (9050) and exits the recuperator chamber through the recuperator exit port (9065) to the cathode input manifold (9070). From the cathode input manifold (9070) the air flow passes into the cathode chamber lower volume (8142), through the cathode flow passages (8095) before passing over the cathode electrode surfaces of each individual fuel cell (8010) and then mixing with spent fuel exiting from the fuel output end (8025) of each individual fuel cell (8010). The spent fuel and the spent cathode air combust inside the combustion region (8030) further heating the primary enclosure wall assembly (8045). The combusted hot gas mixture passes from the combustion region (8030) to the hot zone exhaust conduit (9055) and through the combustion exhaust port (9060) and then flows out of the system through the hot zone exhaust port (9045).

The fuel flow through the SOFC system is also illustrated in FIG. 7A, indicated by dashed black lines and arrow heads showing the direction of the fuel flow and its pathways. A hydrogen rich fuel supply mixed with air is received from a supply fuel deliver control system (197) which includes a variable speed fan, pressure regulator, atomizer or other gas or fluid flow rate regulator device and a corresponding fuel delivery flow rate controller. The fuel passes from the fuel delivery control system to the fuel reformer (8035) where the supply fuel is reformed to provide a fuel, usually a reformate comprising hydrogen, carbon monoxide, and carbon dioxide. The fuel flows from the fuel reformer (8035) to the fuel input manifold (8015) through the fuel delivery conduit (8040). Inside the fuel input manifold, the fuel is heated by radiation and convection as it flows past walls of the input fuel manifold (8015). From the fuel input manifold (8015) the fuel flows into the hollow chamber of each individual fuel cell (8010) where it passes over the anode electrode surfaces thereof to participate in the SOFC reaction. The fuel is exits each individual fuel cell through the open output end (8025) to the combustion region (8030) where the spent fuel mixes with spent cathode air. The spent fuel and the spent cathode air combust inside the combustion region (8030). The combusted hot gas mixture passes from the combustion region (8030) to the hot zone exhaust conduit (9055) through the combustion exhaust port (9060) and then flows out of the system through the hot zone exhaust port (9045). Thermal energy generated by combusting the spent syngas and spent cathode air mixture is transferred to inside surfaces of the U-shaped primary enclosure wall assembly (8045). Both the fuel delivery control system (197) and the cathode air delivery module (198) are independently operable to vary flow rates as required to adjust electrical current output, e.g. by varying the fuel flow rate, or to adjust a stack temperature, e.g. by varying the air flow rate.

4.12.4 Heat Flow and Gas Flow Diagrams

A thermal energy flow diagram shown in FIG. 7B depicts a non-limiting thermal energy transfer pattern enabled by the present technology. Solid black lines with black arrow heads pointing inwardly from wall surfaces toward either a cathode or a fuel flow region represent radiant emission from higher temperature wall surfaces to lower temperature gas flows or to lower temperature surfaces of other walls, e.g. walls of the intermediate enclosure (9000). While not indicated by flow arrows, convective heat flow from high temperature fluid/gas flows to lower temperature fluid/gas regions takes place in each of the gas flows as high temperature gas volumes proximate to higher temperature wall surfaces mixes with cooler gas volumes distal from high temperature surfaces. The flow of cathode gas is indicated by solid black lines with solid black arrow heads. The flow of anode gas is indicated by dashed black lines with solid black arrows. As noted above, each of the fuel flow and the cathode gas flow enters the cathode chamber (8055) proximate to the input end (8020) of each fuel cell and flows upward toward the combustion region (8030) where spent fuel gas and spent cathode gases are mixed and combusted before exiting from the cathode chamber to the recuperator chamber (9050) through the combustion exhaust port (9060). Additionally, dashed black lines with solid black arrows shown inside the thermally a thermally conductive core (8200) of the of the U-shaped primary enclosure wall assembly (8045), described below, indicate the direction and pathways of thermal conduction along thermally conductive pathway provided thereby. As shown, the direction of the thermal conduction provided by the thermally conductive core (8200) is from the high temperature combustion region wall portion (8060) toward distal ends of each of the sidewalls (8065, 8070).

Incoming cathode air flow enters the recuperator chamber (9050) at ambient temperature and the temperature of the cathode air flow is increased when the cathode air flow is heated by heat exchange between the higher temperature shared wall (9075) and the lower temperature incoming cathode air flow as indicated by arrow heads directed into the recuperator chamber (9050) from the shared wall (9075). Inside the cathode input manifold (9070) the temperature of the cathode air flow is further increased when the cathode air flow is heated by heat exchange between the higher temperature U-shaped primary enclosure wall assembly (8045) and the lower temperature cathode airflow as indicated by arrow heads directed from outside surfaces of the U-shaped primary enclosure wall assembly (8045) into the cathode input manifold (9070). Additionally, each of the intermediate enclosure walls (9005, 9010, 9015, 9020, 9025, 9030) are heated by radiant emissions from the higher temperature U-shaped primary enclosure wall assembly (8045) and by heat exchange with the cathode air flow. The cathode air flow is further heated by heat exchange between the intermediate enclosure walls and the cathode air flow whenever the temperature of the intermediate enclosure walls is higher than the temperature of the cathode air flow. Alternately, when the temperature of the intermediate enclosure walls is less than the temperature of the cathode air flow, e.g. during a start-up cycle, the intermediate enclosure walls are heated by heat exchange between the higher temperature cathode air flow and the intermediate enclosure walls.

Inside the cathode chamber (8055), the temperature of the cathode air flow is further increased by heat exchange between inner surfaces of the U-shaped primary enclosure wall assembly (8045), outer surfaces of individual fuel cells (8010), and surfaces of the input fuel manifold (8015) and the cathode air flow with the heat flow direction going from the higher temperature surfaces or higher temperature gas flow regions to the lower temperature surfaces or gas flow regions, as indicated by arrow heads directed from the above listed surfaces and the cathode air flow. Thus, the temperature of the cathode air flow continuously increases as it flows through the cathode chamber from the cathode chamber flow passages (8095) to the combustion region (8030).

In a non-limiting example operating mode, the temperature of the gas mixture in the combustion region (8030) and inside at least a portion of the anode surfaces inside the cells is at least 350° C. before a steady state SOFC reaction and DC current output from the SOFC stack (8005) can be maintained. Once a steady state SOFC reaction is established, the temperature of the gas mixture in the combustion region (8030) can exceed 500° C. Accordingly, the gas mixture while passing from the combustion region (8030) through the hot zone exhaust conduit (9055) to the hot zone exhaust port (9045) has a temperature that is much higher than the temperature of the incoming cathode air flow and higher than the surrounding walls of the hot zone exhaust conduit (9055). The temperature of the gas mixture therefore decreases while passing through the hot zone exhaust conduit (9055) as heat is transferred by heat exchange between the higher temperature exhaust gas and walls of the hot zone exhaust conduit (9055), including the shared wall (9075). The heated walls of the hot zone exhaust conduit (9055), especially the shared wall (9075), which causes heat exchange to the cooler incoming cathode air as incoming cathode air flows through the recuperator chamber (9050).

Referring again to FIG. 7B, incoming fuel air mixture enters the fuel reformer (8035) at ambient temperature and is heated by partial combustion by the Catalytic Partial Oxidation (CPOX) reactor or fuel reformer (8035). During the CPOX reaction, the temperature of the fuel can peak near 1200° C. Accordingly, the temperature of fuel exiting from the fuel reformer (8035) decreases as the fuel passes from the fuel reformer through the fuel conduit (8040) and the fuel input manifold (8015) and through each of the fuel cells from the fuel input end (8020) to the fuel output end (8025). Thus during steady state operation, after a SOFC reaction that produces output current has been established, the temperature of the fuel flow is likely continuously reduced along the flow path that extends from the fuel reformer (8035) to the input fuel manifold (8015) and then may be increased or decreased as the fuel flow passes from the input fuel manifold to the combustion region (8030) as heat flows from the fuel flow by heat exchange to the lower temperature surfaces of the surrounding fuel passageways including the walls of the fuel input manifold (8015) and the walls of the fuel cells (8010) which increase in temperature as a result of absorbing heat flow from the fuel flow. In some embodiments, the direction of heat exchange can change, e.g. when the temperature of the fuel flow becomes less that the temperature of the inside walls of the fuel cells. As noted above, the temperature of the gas mixture from the combustion region (8030) continues to decrease as it flows out of the SOFC system.

Referring again to FIG. 7B, dashed black lines with black arrows show the direction and pathways of thermal energy transfer by thermal conduction from a high temperature region of the thermally conductive core to a low temperature region of the thermally conductive core. The thermally conductive core passively reduces a thermal gradient between the core top portion (8215) and each of the core side walls (8205) and (8210). The core top portion bounds the combustion region (8030) which as noted above has a temperature of at least 350° C. and reach up to about 1200° C. The gas mixture inside the combustion region has a higher temperature than the surrounding surfaces such that heat flows from the gas mixture to the combustion region wall (8060) by forced heat convention and the radiation absorbed by the combustion region wall is transferred to each of the sides walls (8065, 8075) by thermal conduction as will be described below.

4.12.5 U-Shaped Hot Zone Enclosure Assembly

Referring now to FIGS. 7A, 9A, 9B, and 9C, the hot zone enclosure assembly (8042) comprises the SOFC stack (8005), the fuel input manifold (8015) and the U-shaped primary enclosure wall assembly (8045). Optionally the hot zone enclosure assembly (8042) further includes the hot zone enclosure base wall (8075), a first hot zone enclosure end wall (8080), and a second hot zone enclosure end wall (8085). The U-shaped primary enclosure wall assembly (8045) includes a combustion region wall portion (8060), a first primary enclosure side wall (8065) and a second primary enclosure side wall (8070) which are both joined with the combustion region wall portion.

Each primary enclosure wall portion (8060), (8065) and (8070) includes a thermally conductive core (8200) and the core is protected from oxidation by outer layers applied to exposed surfaces thereof. The thermally conductive core (8200) comprises one or more materials having a coefficient of thermal conductivity that is greater than 100 W/(m° K) and preferably greater than 200 W/(m° K). In a non-limiting exemplary embodiment, the one or more thermally conductive core materials comprise copper, molybdenum, aluminum, beryllium, iridium, rhodium, silver, tungsten, or alloys or combinations therefore that can be fabricated with a desired thermal conductivity and that can reliably meet the structural requirements at the hot zone operating temperatures. In a preferred embodiment, the thermally conductive core (8200) comprises copper or a copper alloy having a thermal conductivity of 370 (W/m° K) at 500° C. and 332 (W/m° K) at 1027° C. as described above. The thermally conductive core (8200) preferably has a thickness in the range of 0.127 to 3.2 mm, (0.005 to 0.125 inches); however, other thicknesses e.g. 0.5 to 6.0 mm (0.02 to 0.24 inches) are usable without deviating from the present technology. The core thickness can increase or decrease as needed to meet design requirements. A thicker thermally conductive core (8200) e.g. up to 6.0 mm (0.24 inches, or more) requires more thermal energy to heat the core material to a desired operating temperature; however, increasing the core thickness is beneficial because this increases the rate of thermal energy transfer from one region of the core to another which advantageously redistributes thermal energy more rapidly. Other reasons to increase the core thickness would be to conduct thermal energy over a longer distance or to achieve a longer operating life if surface oxidation is a likely failure mode. As will be recognized, the thicker the thermally conductive core (8200), the longer it takes for thicker walls to oxidize to a degree that the core becomes unusable. Additionally, aluminum can be used as a core material in SOFC systems that can generate electrical power when the SOFC system capable of generating electrical power without subjecting the core material to a temperature in excess of about 550° C.

The thermally conductive core (8200) is a passive element that emits radiation and absorbs radiation in proportion to the fourth power of absolute temperature difference (in ° K) between the thermally conductive core and its surroundings in accordance with standard black body principles. Additionally, thermal energy is transferred to and from the thermally conductive core by thermal conduction from other surfaces of the U-shaped primary enclosure wall assembly (8045) in thermally conductive contact. Thermal energy is further transferred from one region of the thermally conductive core to another region of the thermally conductive core by conduction when there is a thermally conductive pathway and a temperature difference between the regions.

In a first non-limiting exemplary embodiment, the thermally conductive core (8200) is a unitary element shaped to enclose the SOFC stack (8005) and form the cathode chamber (8055) around the stack. The unitary element is formed from a flat sheet of the core material, described above, sized to include the three primary enclosure wall portions (8060), (8065) and (8070) and bent to form the U-shape core element (8200) shown in FIG. 9C. As will be recognized, the U-shape core element (8200) can be formed by a metal bending fixture configured to bend a flat metal sheet into the desired U-shape. Other shapes are usable, e.g. a rectangular shaped core element, without deviation from the present technology.

In a second non-limiting exemplary embodiment, the thermally conductive core (8200) comprises three separate core portions (8205, 8210, 8215) each comprising one or more of the core materials described above and each having a wall thickness in the thickness range described above. The three separate core portions include two substantially identical side portions (8205) and (8210) and a core top wall portion (8215). The core top wall portion (8215) is formed with a cylindrical radius, or the like, along the longitudinal length thereof, and each of the side portions (8205) and (8210) is formed from a flat metal sheet. The longitudinal dimension along the stack length axis (x) is preferably the same for all three separate core portions. The three separate core portions (8205, 8210, 8215) are joined together e.g. by solder joints, by braze joints, by welded joints, and or by other mechanical joining techniques such as by rolling or pressing mating edges of each side wall with corresponding mating edges of the core top wall portion (8215), by cladding sheets of dissimilar metal together along the joints between the core portion mating edges, or by otherwise fastening the core portion mating edges of each side wall with corresponding core portion edges of the core top portion (8215). Irrespective of the fastening or joining method, the mechanical interface between the three separate core portions provides a thermally conductive pathway passing between the core top portion (8215) and each of the two side core portions (8205) and (8210), and preferably the thermally conductive pathway is along the entire longitudinal length and full thickness of the joined core wall portions.

To prevent oxidation of the thermally conductive core (8200), each of the core portions (8205, 8210, 8215) is protected by a protective layer applied over or attached to exposed surfaces of the thermally conductive core (8200). In a first non-limiting exemplary embodiment, the protective layer comprises nickel plating applied by an electro-plating process to a thickness of at least 0.0005 inches and ranging up to 0.002 inches or more. The nickel plating is applied in order to prevent oxygen diffusion there through at operating temperatures of 350 to 1200° C. In a second non-limiting exemplary embodiment the protective layer comprises an anodized surface formed over exposed core materials. The anodized surface may be formed in a preassembly controlled electroplating or oxygen rich environment or the anodized surface may be formed by exposure of protective layer surfaces to oxygen, i.e. cathode air flow, over time during operation of the SOFC system. In a non-limiting exemplary embodiment, the anodized surface is formed directly onto core material surfaces when the core material comprises aluminum or an aluminum copper alloy. When the anodized surface is formed in a preassembly controlled environment by an electroplating or an oxygen rich anodizing process the desired thickness of the anodized layer is preferably 0.0005 inches but ranging up to about 0.002 inches in some applications in order to prevent oxygen diffusion through the anodized surfaces at operating temperatures of 350 to 1200° C. Irrespective of the electro-plating process or other anodizing layer application type, the thickness of the protective layer will be dependent upon the desired operating life of the SOFC system or of the thermally conductive core, based on the average and/or peak operating temperatures proximate to the thermally conductive core and based on the oxidant concentrations and/or oxidation rate that the plating thickness will be exposed to.

In a third non-limiting exemplary embodiment, the protective layer comprises one or more metal sheets disposed in mating contact with exposed surfaces of each of the three core portions (8205), (8210) and (8215). The metal sheets can be applied directly to uncoated surfaces of the thermally conductive core or can be applied over electroplated surfaces of the thermally conductive core. However as noted above an electroplated nickel layer can serve as the protective layer without the metal sheets. As shown in the exploded isometric view of FIG. 9C, an inner protective sheet metal layer (8220) is fabricated as a U-shaped structure formed to attach to the inside surfaces of each of the three core portions (8205), (8210), (8215) wherein the inside surfaces of the inner protective layer (8220) face the SOFC stack. Preferably, the outside surfaces of the inner protective layer (8220), facing away from the SOFC stack, and the inside surfaces of the three core wall portions (8205, 8210, 8215) are in mating contact over the entire inside surface area of the three core wall portions. The inner protective layer (8220) can extend beyond portions of the U-shaped thermally conductive core (8200) e.g. when a longitudinal length of the inner protective layer (8220) along the stack longitudinal length axis (x) extends beyond the longitudinal length of the thermally conductive core (8200) or when a dimension of the inner protective layer along the gas flow axis (z) is greater than the dimension of the thermally conductive core along the same axis, e.g. as shown in FIG. 9C where a bottom edges (8240, 8245) of inner protective layer (8220) each extends to mate with the hot zone enclosure base wall (8075), or other mechanical interface surfaces such as may be provided by the fuel input manifold (8015). Similarly, side edges of the inner protective layer (8220) can extend beyond side edges of all three core portions (8205), (8210), (8215) e.g. to mate with a hot zone enclosure end walls (8080) and (8085) and/or to extend the length of the cathode chamber (8055) along the stack longitudinal axis (x). The inner protective layer (8220) includes an inner top portion (8225) formed with a cylindrical radius along the stack length axis (x) and two opposing inner side wall portions (8230) and (8235) each extending from a different edge of the cylindrical radius of the inner top portion (8225).

Each of the inner protective layer side wall portions (8230) and (8235) is attached to the hot zone enclosure base wall (8075) e.g. by a mechanical interface between the inner side wall bottom edges (8240) and (8245) and the primary enclosure base wall (8075) which are joined along the entire interface e.g. by welding, soldering, or other mechanical interfaces configured as a gas seal or to provide a high impedance to gas flow. The hot zone enclosure base wall (8075) is also attached to the intermediate enclosure (9000) at its bottom wall (9010) and/or the side and end walls (9015, 9020, 9025, 9030) such that the mechanical interface between the inner side wall bottom edges (8240) and (8245) and the primary enclosure base wall fixedly supports the U-shaped primary enclosure wall assembly (8045) inside the intermediate enclosure (9000). Alternately, each of the inner protective layer side wall portions (8230) and (8235) is directly attached to the intermediate enclosure bottom wall (9010) by a mechanical interface between the inner side wall bottom edges (8240) and (8245) and the intermediate enclosure bottom wall (9010), which are fixedly attached e.g. by welding, brazing, soldering, or other mechanical interfaces. Alternately, each of the side wall portions (8230) and (8235) is attached to the fuel input manifold (8015) by a mechanical interface between the inner side wall bottom edges (8240) and (8245) and the fuel input manifold (8015), which are fixedly attached e.g. by welding, brazing, soldering, or other mechanical interfaces. In this embodiment the fuel input manifold (8015) is attached to the intermediate enclosure bottom wall (9010) or other intermediate enclosure walls such that the mechanical interface between the inner side wall bottom edges (8240) and (8245) and the fuel input manifold (8015) fixedly supports the U-shaped primary enclosure wall assembly (8045) inside the intermediate enclosure (9000). Irrespective of the attachment technique, the mechanical interface between the inner side wall bottom edges (8240) and (8245) and the hot zone enclosure base wall (8075), or between the inner side walls and the input fuel manifold (8015), or between the inner side walls and the intermediate enclosure bottom wall (9010), the mechanical interface preferably provides a gas seal or provides a high impedance to gas flow corresponding with a lower boundary of the cathode chamber (8055). In a preferred embodiment, each of the inner protective layer side wall portions (8230) and (8235) includes a plurality of cathode chamber input ports (8095) passing through an inner side wall portion that extends below bottom edges of the thermally conductive core side walls (8205) and (8210) proximate to the bottom edges (8240) and (8245) thereof, and the input ports (8095) are disposed evenly spaced apart along the stack length axis (x). The position of the cathode chamber input ports (8095) along the gas flow axis (z) is selected to deliver cathode air flow into the lower volume (8142) of the cathode chamber (8055) proximate to the fuel input end (8020). Alternate cathode chamber input port embodiments include a single slotted opening and/or a plurality of apertures of various opening shapes such as circular, oval, square, rectangular, or the like. Alternately, the cathode chamber input ports (8095) can pass through the inner side walls (8230, 8235) and the core side walls (8205, 8210) when inside surfaces of the cathode chamber input ports (8095) are protected from oxidation e.g. by electroplating or an insert configured to prevent oxidation.

An outer protective layer (8250) comprises two substantially identical outer side wall portions (8255) and (8260) and an outer top portion (8265). As shown in the exploded isometric view of FIG. 9C, the three outer protective layer portions, when joined together with each other, and joined together with corresponding outer surfaces of the thermally conductive core (8200) form a U-shaped sheet metal structure shaped to attach to and protect the outside surfaces of the thermally conductive core (8200) from exposure to oxygen rich cathode air flow, e.g. flowing through the cathode air input manifold (9070). Preferably, the inside surfaces of the outer protective layer (8250) are in mating contact with corresponding outside surfaces of the thermally conductive core (8200) that face away from the SOFC stack. The outer protective layer top wall portion (8265) is formed with a cylindrical radius along the stack length axis (x) wherein an inside radius of the cylindrical radius of the outer protective layer top wall portion (8260) is matched with an outside radius of the cylindrical radius of the thermally conductive core top portion (8215) such that when the inside and outside radii are joined together they provide mating contact therebetween. Each of the outer protective layer side wall portions (8255) and (8260) are formed from a flat sheet metal blank cut with a height dimension along the gas flow axis (z) and a length dimension along the stack length axis (x). The height dimension of each side wall portion (8255, 8260) is selected to position outer side wall bottom edges (8270) and (8275) below or matched with corresponding bottom edges of the thermally conductive core sidewall portions (8205) and (8210). When the cathode flow passages (8095) only pass through the inner side walls, (8230, 8235) the height dimension of the outside side walls (8255, 8260) is short enough to prevent the outside side walls from covering the cathode flow passages (8095). In other embodiments, the cathode flow passages (8095) can pass through the outside side walls (8260, 8255), the core side walls (8205, 8210), and the inner side walls (8230, 8235). Preferably, inside surfaces of the outer side walls (8255, 8260) and outside surfaces of the core sidewalls (8205, 8210) are in mating contact after assembly.

In a preferred embodiment, each wall portion of the inner protective layer and of the outer protective layer is fabricated from ferritic steel such as Alloy18 SR® Stainless Steel, e.g. distributed by Rolled Metal Products, of Alsip, TL, U.S. The Alloy18 SR® Stainless Steel is preferred because under operating temperatures and the oxygen rich conditions of the SOFC system (8000) the added aluminum content advantageously forms a surface layer of aluminum oxide in response to oxygen exposure which prevents further oxidation of exposed surfaces of the inner protective layer and of the outer protective layer, and prevents chromium from leaching from the Alloy 18 SR® Stainless Steel. A preferred thickness of the Alloy18 SR® Stainless Steel is 4 mm (0.16 inches); however, a thickness range of 0.13 to 6.0 mm (0.005 to 0.24 inches) is usable and may depend on the shape and size of the inner protective layer and the outer protective layer, the forming methods used to form the inner and outer protective layers, the availability of standard rolled stock thickness, the desired operating life in hours, or the like, without deviating from the present technology. In an alternate exemplary embodiment, the inner protective layer and the outer protective layer at least in part comprise a chromium-free high temperature metal alloy such as Monel which is a nickel-copper alloy with small addition of aluminum and titanium. A preferred thickness of each wall portion is approximately 4 mm (0.16 inches); however, the actual thickness can range between 0.13 to 6.0 mm (0.005 to 0.24 inches) without deviating from the present technology.

The hot zone enclosure base wall (8075) and each of the hot zone enclosure end walls (8080, 8085) can each optionally include a thermally conductive core portion (8200) and two protective layer portions including an inner protective layer (8280) and an outer protective layer (8285), e.g. as depicted in section view in FIG. 8B. As with other protective layers described herein, the inner and outer protective layers (8280, 8285) can comprise nickel plating applied to exposed surfaces of the thermally conductive core or the thermally conductive layer can be protected by inner and outer protective layers like the sidewalls (8230, 8235, 8255, 8260) described above that are configured to form an anodized layer either prior to assembly or formed by exposure to cathode air during operation of the SOFC system. As noted above, surfaces of the thermally conductive core (8200) are protected by an electro-plating process wherein nickel is applied to a thickness of at least 0.0005 inches and ranging up to 0.002 inches or more and/or by attachment of sheet metal forms comprising the Alloy18 SR® Stainless Steel with a thickness of 4 mm (0.16 inches) or a thickness range of range of 0.13 to 6.0 mm (0.005 to 0.24 inches).

The thermally conductive core portions (8200) and protective layer portions (8280) and (8285) are configured like the primary enclosure walls (8060), (8065) and (8070) described above wherein the thermally conductive core portion (8200) is protected from oxidation by two protective layer portions (8280) and (8285). The thermally conductive core portion (8200) comprises one or more materials having a coefficient of thermal conductivity that is greater than 100 W/(m° K) and preferably greater than 200 W/(m° K).

More generally each of the above described protective layers (8250, 8220), shown in FIG. 9C and (8280, 8285), shown in FIG. 8B as well as the nickel plating and/or an anodized layer applied by an electro-plating process, is selected to provide a stabilized protective outer layer that prevents oxygen from diffusing through the stabilized protective outer layer. Preferably the stabilized protective layer does not include chromium; however, the stabilized protective layer preferably prevents chromium from leaching through the stabilized protective layer. Example stabilized protective outer layer materials include aluminum oxide, titanium oxide, or other suitable oxide or passivation layers.

The hot zone enclosure assembly (8042) shown in FIG. 9A is equipped with a startup fuel input conduit (8145) in fluid communication with a fuel delivery control module (197) shown in FIG. 1 for delivering a startup fuel flow (8152) into the startup fuel input conduit (8145) which is in fluid communication with a burner element (8155) passing through the combustion region (8030). A fuel ignitor element (8160), shown in FIG. 7A, extends into the combustion region (8030) and is used to ignite the startup fuel flow (8152) as it exits from the burner element (8155) inside the combustion region during a cold start cycle to rapidly increase the temperature of the U-shaped primary enclosure wall assembly (8045) and the SOFC stack (8005). The startup fuel flow (8152) comprises a mixture of hydrogen rich fuel and air that has not been reformed or an unreformed hydrocarbon rich gas such as propane. During a cold start of the SOFC system, the fuel delivery control module (197) can deliver startup fuel flow (8152) directly into the burner element (8155) and ignite the fuel exiting from the burner element (8155) using the ignitor element (8160). Additionally, the air delivery module (198) shown in FIG. 1 can deliver an air flow into the recuperator chamber (9050) to be heated before passing through the cathode input manifold (9070) and the cathode chamber (8055) and then to the combustion region (8030). When the U-shaped primary enclosure wall assembly (8045) and the SOFC stack (8005) reach a predetermined start up temperature, the fuel delivery control module can deliver startup fuel flow (8152) into the burner element (8155) and supply fuel flow (8050) the fuel reformer (8035) to initiate a flow of fuel (8150) through the SOFC stack (8005) while a heated air flow is moved through the cathode chamber to eventually initiate a SOFC reaction.

4.12.5.1 Enclosure Wall Assembly Fabrication Processes

In a first non-limiting exemplary fabrication process, each of the inner protective layer (8220) and the thermally conductive core (8200) is formed as a unitary flat sheet from the appropriate material described above. Each flat sheet is cut to predetermined finished dimensions corresponding with the final dimensions of the inner protective layer and the thermally conductive core. Any additional processing for either sheet is preferably completed while the unitary flat sheet is still a flat sheet. The additional processing at least includes drilling, punching, or otherwise forming the cathode chamber input ports (8095) that pass through the inner protective layer (8220) (or the inner protective layer and the core) and adding other holes or formed features as may be required to provide mechanical interface elements used to attach the inner protective layer bottom edges (8240, 8245) with the hot zone enclosure base wall (8075), or to attach the inner protective layer bottom edges (8240, 8245) with the input fuel manifold (8015) and/or to attach the inner protective layer bottom edges (8240, 8245) to the intermediate enclosure (9000). Additional holes or features as may be required to provide other mechanical interface features such as for attaching the inner protective layer (8220) to the hot zone enclosure end walls (8080, 8085) or for attaching the inner protective layer (8220) or the outer protective layer (8250), to the thermally conductive core (8200) or for providing fuel or cathode air flow ports, e.g. the combustion exhaust port (9060), or providing access for the fuel delivery conduit (8040), or for providing a fuel conduit to the combustion region for use during cold start-up, or for providing access for electrical interfaces for sensor attachment points, or the like, are also added before assembling the U-shaped primary enclosure wall assembly (8045).

After preparing the flat sheets for assembly, including electroplating, machining, punching etc., the inner protective layer (8220) and the thermally conductive core (8200) are joined together in the flat e.g. by aligning and clamping the two sheets in mating contact with each other and joining the two sheets together to form a composite sheet metal structure which is still a flat sheet. The joining technique may include welding, brazing, soldering, fastening, e.g. riveting, self-riveting or self-clinching, by folded tab joints or the like.

In the case where either of the sheet materials is a rolled sheet, the grain direction runs parallel to the rolling direction. Thus, the rolling direction of each sheet should be identified before cutting and assembling the sheets together and consideration should be given to orienting the grain direction with respect to a bending axis if the sheets will be bent. Additionally, the grain direction of the thermally conductive core can have a different coefficient of thermal conductivity with respect to other axes of the core sheet material. Accordingly, the thermally conductive core should be oriented with the highest thermal conductivity axis directed from the core top portion (8215) to the bottom edges of the core sidewalls (8205, 8210).

The composite sheet, comprising the thermally conductive core (8200) and the inner protective layer (8220) joined together in mating contact, is then bent to form the U-shaped structure shown in FIG. 9C with the inner protective layer positioned to face the SOFC stack. The cylindrical radius has a longitudinal axis along the stack length axis (x). In a non-limiting exemplary embodiment, the bend radius is formed by a hydraulic bending device operable to bend or form the composite sheet metal structure at room temperature (air bending) on a press break, or the like. A bend radius that can be bent without damaging the materials and managing undesirable consequences, such as spring back, is influenced by the material properties, e.g. hardness, tensile strength, the material thicknesses, the material grain direction, or the like and these properties are taken into consideration when determining the fabrication process of different embodiments of the U-shaped primary enclosure wall assembly (8045). Generally, it is preferable to bend the material transverse to the material grain direction to avoid material cracking and separation of the joined material layers; however, this varies with material thickness. The composite sheet metal structure can be preheated prior to bending, e.g. to 90 to 150° to reduce local stress during bending, thereby helping to prevent material separation and/or undesirable deformation. Other forming methods such as forging at higher temperatures are usable without deviating from the technology.

In the first non-limiting exemplary fabrication process, outer protective layer (8250) is formed from three separate flat sheets of the appropriate sheet material described above. The three separate flat sheets correspond with the outer top portion (8265) and each of the two outer side portions (8255) and (8260). Each flat sheet is cut to predetermined finished dimensions corresponding with the final dimensions of the U-shaped primary enclosure wall assembly (8045). Any additional processing for each of the three flat sheets is completed while the sheets are still a flat sheet and may be processed before the sheets are cut to the final dimensions. The additional processing may include drilling, punching or otherwise forming passages for providing fuel or cathode air flow ports, e.g. the combustion exhaust port (9060) or a passage for providing access for a fuel delivery conduit into the combustion region for use during a cold startup, or for providing access for electrical interfaces for current collection, sensor attachment points, or the like. Additional holes or features as may be required to provide other mechanical interface features such as for attaching the outer protective layer elements (8265, 8255, 8260) with the thermally conductive core (8200), and/or with the hot zone enclosure end walls (8080, 8085) or for attaching the outer protective layers with the inner protective layers as may be required, are added at this point in the fabrication process.

After preparing the flat sheets for assembly, including electroplating, machining, punching etc., the outer top portion (8265) is bent to form the U-shaped structure shown in FIG. 9C with the inside radius of the outer top portion positioned to face the SOFC stack. The cylindrical radius has a longitudinal axis along the stack length axis (x) and has an inside radius that matches with the outside radius of the core top portion (8215). The bend radius is formed by a hydraulic bending device operable to bend or form the flat sheet metal structure at room temperature (air bending) on a press break, or the like. A bend radius that can be bent without damaging the materials and managing undesirable consequences, such as spring back, is influenced by the material properties, e.g. hardness, tensile strength, the material thicknesses, the material grain direction, or the like and these properties are taken into consideration when determining the fabrication process of different embodiments of the outer top portion (8265). Generally, it is preferable to bend the material transverse to the material grain direction to avoid material cracking and separation of the joined material layers; however, this varies with material thickness. The composite sheet metal structure can be preheated prior to bending, e.g. to 90 to 150° to reduce local stress during bending, thereby helping to prevent material separation and/or undesirable deformation. Other forming methods such as forging at higher temperatures are usable without deviating from the subject technology.

After preparing the two flat sheets (8255, 8260) and the bent outer top portion (8265) for assembly, including machining, punching etc., each of the three outer protective layers is assembled to outside surfaces of the thermally conductive core (8200) and joined to the thermally conductive core. The joining technique may include welding, brazing, soldering, fastening, e.g. riveting, self-riveting or self-clinching, by folded tab joints or a combination thereof. As noted above the three outer protective layers are assembled to completely cover outside surfaces of the thermally conductive core (8200) to prevent oxidation by cathode air flow and or the mixture of spent cathode gas and spent syngas in the combustion region (8030).

4.12.5.2 Fabrication Process: Three Sheets Joined Together

In a second non-limiting exemplary fabrication process, each of the inner protective layer (8220), the thermally conductive core (8200), and the outer protective layer (8250) are formed as a unitary flat sheet from the appropriate sheet material thereof as described above. Each flat sheet is cut to predetermined finished dimensions corresponding with the final dimensions of the U-shaped primary enclosure wall assembly (8045). Any additional processing for each of the three unitary flat sheets is completed while the unitary flat sheets are still flat sheets. The additional processing at least includes drilling, punching, or otherwise forming the cathode chamber input ports (8095) that pass through the inner protective layer (8220) and adding other holes or formed features as may be required to provide mechanical interface elements used to attach the inner protective layer bottom edges (8240, 8245) with the hot zone enclosure base wall (8075), or to attach the inner protective layer bottom edges (8240, 8245) with the input fuel manifold (8015), and/or to attach the inner protective layer bottom edges (8240, 8245) to the intermediate enclosure (9000). Additional holes or features as may be required to provide other mechanical interface features such as for attaching the inner protective layer (8220) to the hot zone enclosure end walls (8080, 8085), or for attaching the inner protective layer (8220) or the outer protective layer (8250) to the thermally conductive core (8200), or for providing fuel or cathode air flow ports, e.g. the combustion exhaust port (9060) or providing access for the fuel delivery conduit (8040) or for providing a fuel conduit to the combustion region for use during cold start-up, or for providing access for electrical interfaces for current collection, sensor attachment points, or the like, are also added before assembling the U-shaped primary enclosure wall assembly (8045).

After preparing the three flat sheets for assembly, including electroplating, machining, punching etc., the flat sheets corresponding with the inner protective layer (8220) and the outer protective layer (8250) are each jointed to the flat sheet corresponding with the thermally conductive core (8200), e.g. by aligning and clamping the three sheets in mating contact with each other and brazing the three sheets together to form a composite sheet metal structure which is still a flat sheet. As noted above, the rolling direction of each sheet is identified before cutting and assembling the sheets together and consideration is given to orienting the grain direction with respect to a bending axis corresponding with the bend radius of the inner top portion (8225), the core top wall (8215) and the outer top portion (8265). The composite sheet metal structure is then bent to form the U-shaped structure shown in FIG. 9C with the inner protective layer positioned to face the SOFC stack. The cylindrical radius has a longitudinal axis along the stack length axis (x). The bend radius is formed by a hydraulic bending device operable to bend or form the composite sheet metal structure at room temperature (air bending) on a press break, or the like. A bend radius that can be bent without damaging the materials and managing undesirable consequences, such as spring back, separation of the individual sheets, or cracking along the bend axis is influenced by the material properties, e.g. hardness, tensile strength, the material thicknesses, the material grain direction, or the like and these properties are taken into consideration when determining the fabrication process of different embodiments of the U-shaped primary enclosure wall assembly (8045). Generally, it is preferable to bend the material transverse to the material grain direction to avoid material cracking and separation of the joined material layers; however, this varies with material thickness. The composite sheet metal structure can be preheated prior to bending, e.g. to 90 to 150° to reduce local stress during bending, thereby helping to prevent material separation and/or undesirable deformation. Other forming methods, such as forging at higher temperatures, are usable without deviating from the subject technology.

4.12.5.3 Additional Fabrication Process Embodiments

As described in the first and second fabrication processes above, any one of the inner protective layer (8220), the thermally conductive core (8200) and the outer protective layer (8250) can be formed from a unitary flat sheet stock that includes all three portions, including the top portion that will be bent to a cylindrical radius and the two side portions that extend from opposing edges of the cylindrical radius. According to a further fabrication process, two or three of the three of the unitary flat sheet stock portions can be joined together by cladding. The cladding may be carried out by a single cladding step wherein the flat sheet stock corresponding with the inner protective layer (8220) and the outer protective layer (8250) are each jointed to the flat sheet corresponding with the thermally conductive core (8200) in a single cladding or rolling step. Alternately, the cladding may be carried out in a two-step process wherein the flat sheet stock corresponding with the inner protective layer (8220) or the outer protective layer (8250) is joined to the flat sheet corresponding with the thermally conductive core (8200), followed by joining the remaining flat sheet stock corresponding with the inner protective layer (8220) or the outer protective layer (8250) to the flat sheet corresponding with the thermally conductive core (8200) in a second cladding step.

In a cladding process a width of the cladded stock is transverse to the rolling direction such that the width of the cladding stock is preferably selected to correspond with a desired length dimension of the U-shaped primary enclosure wall assembly (8045), along the SOFC stack axis (x).

From the cladding stock, a composite cladded sheet is cut to predetermined finished dimensions corresponding with forming the inner protective layer, the thermally conductive core, and the outer protective layer. Any additional processing of the composite cladded sheet is completed while the composite cladded sheet is still flat. The additional processing at least includes drilling, punching, or otherwise forming the cathode chamber input ports (8095), plus adding other holes or formed features as may be required to provide mechanical interface elements used to attach the composite cladded sheet to the hot zone enclosure base wall (8075), and/or to the input fuel manifold (8015) and/or to the intermediate enclosure (9000) and other holes or features as may be required to provide other mechanical interface features such as for attaching the composite cladded sheet with the hot zone enclosure end walls (8080, 8085) or for providing fuel or cathode air flow ports, e.g. the combustion exhaust port (9060) or providing access for the fuel delivery conduit (8040) or for providing a fuel conduit to the combustion region for use during cold start-up, or for providing access for electrical interfaces for current collection, sensor attachment points, or the like, are also added before bending the single cladded flat sheet embodiment.

After preparing the composite cladded sheet, including electroplating, machining, punching, etc., the composite cladded sheet is bent to form the U-shaped structure shown in FIG. 9C with the inner protective layer positioned to face the SOFC stack. The cylindrical radius has a longitudinal axis along the stack length axis (x). The bend radius is formed by a hydraulic bending device operable to bend or form the composite sheet metal structure at room temperature (air bending) on a press break, or the like. A bend radius that can be bent without damaging the materials and managing undesirable consequences, such as spring back, separation of the individual sheets, or cracking along the bend axis is influenced by the material properties, e.g. hardness, tensile strength, the material thicknesses, the material grain direction, or the like and these properties are taken into consideration when determining the fabrication process of different embodiments of the U-shaped primary enclosure wall assembly (8045). Generally, it is preferable to bend the composite cladded sheet transverse to the material grain direction to avoid material cracking and separation of the joined material layers; however, this varies with material thickness. The composite cladded sheet can be preheated prior to bending, e.g. to 90 to 150° or up to 1000° C. to reduce local stress during bending, thereby helping to prevent material separation and/or undesirable deformation.

As further described in the first and second fabrication processes above, any one of the inner protective layer (8220), the thermally conductive core (8200) and the outer protective layer (8250) can be formed as three separate flat sheet stock elements corresponding with the top portion that will be bent to a cylindrical radius and the two side portions that extend from opposing edges of the cylindrical radius. In the case of the thermally conductive core (8200), it is fabricated by cutting each of the core top portion (8215) and the two core sidewall portions (8205, 8210) from a flat sheet of the core material. Thereafter any drilling, punching, machining, or electroplating is performed while the three core portions are still flat. The core top portion (8215) is then bent to the desired cylindrical radius and then the two core sidewall portions (8205, 8210) are attached along different edges of the cylindrical radius to form the assembled thermally conductive core (8200).

Each of the inner protective layer (8220) and the outer protective layer (8250) are fabricated in the same manner wherein the inner and outer top portions (8225, 8265) and the inner and outer sidewall portions (8230, 8235) and (8255, 8260) are formed from a flat sheet of the core material. Thereafter any drilling, punching, machining, or electroplating is performed while the inner and outer protective layer portions are still flat. The inner and outer top portions (8225) and (8265) are then bent to the desired cylindrical radius, e.g. to match the corresponding inner and outer radius of the core top portion (8215). Thereafter the inner and outer top portions (8225, 8265) and the inner and outer sidewall portions (8230, 8235) and (8255, 8260) are mounted to the assembled thermally conductive core, clamped in place, and then soldered, welded, or otherwise mechanically attached to the thermally conductive core.

As further described in the first and second fabrication processes above, any one of the inner protective layer (8220), the thermally conductive core (8200) and the outer protective layer (8250) can be formed as separate flat sheet stock elements corresponding with all three of the top portion and the two side wall portions of the final element. Thereafter any drilling, punching, machining, or electroplating is performed while the three separate flat sheet stock elements are still flat. Thereafter each of the three separate flat sheet stock elements is bent to the desired cylindrical radius in three independent bending steps. Thereafter each of the three previously bent elements is assembled together, clamped and joined together by soldering, welding, or other mechanical fastening elements.

4.12.6 Thermal Conduction Through the Core Material

Referring to FIGS. 7B and 9C, thermal energy radiated from the combustion region (8030) largely impinges on the combustion region wall portion (8060) and specifically on the inner top wall portion (8225). Additionally, gases moving through the combustion region (8030) largely transfer thermal energy to the inner top wall portion (8225) by convection. While the same thermal energy transfer mechanisms occur at each of the inner protective layer sidewalls (8230, 8235), the rate of thermal energy transfer from the gases in the combustion region wall portion (8060) is greater than the rate or thermal energy transfer from gases that are not in the combustion region is less because the temperature or the gases in the combustion region (8030) is higher. Thus, the rate of thermal energy transfer to the inner top wall portion (8225) is higher than the rate of thermal energy transfer to inner side walls (8230, 8235).

Thermal energy is transferred from the inner protective layer (8220) to the thermally conductive core (8200) by a combination of thermal conductivity between mating surfaces of the inner protective layer (8220) and the thermally conductive core (8200) and radiation emitted from higher temperature surfaces to lower temperature surfaces. Additionally, thermal energy is transferred from higher temperature regions of the inner protective layer, in this case the inner protective top portion (8225), to the lower temperature inner sidewalls (8230, 8235) by thermal conduction through the material of the inner layer. Likewise, thermal energy is transferred from higher temperature regions of the thermally conductive core, in this case the core top portion (8215), to the lower temperature core sidewalls (8205, 8210)) by thermal conduction through the material of the thermally conductive core. However, because the material of the thermally conductive core has a much higher coefficient of thermal conductivity than the material of inner the protective layer (8220), the rate of thermal energy transfer by thermal conduction from the core top portion (8215) to each of the core side walls (8205) and (8210) is seven times greater than the rate of thermal energy transfer from the inner the protective layer top portion (8025) to the inner protective layer side portions (8235) and (8240). The thermally conductive energy flow pathway from core top portion (8215) to each of the core side walls (8205) and (8210) is shown in FIG. 7B by dashed black lines with back arrows directed from the core top portion (8215) to each of the core side walls (8205) and (8210). The transfer of thermal energy from the core top portion (8215) reduces a thermal gradient present in the core material resulting in decrease in the temperature of the core top portion and a corresponding increase the temperature of the core side wall portions. Ideally the increased thermal energy transfer rate in the thermally conductive core passively reduces the thermal gradient between the core top portion (8215) and the two core side walls (8205) and (8210) resulting in a reduction of thermal gradient in each of the inner protective layer (8220) and the outer protective layer (8250). When the thermal gradient is reduced, the entire U-shaped primary enclosure wall assembly (8045) emits thermal energy more uniformly along the gas flow axis (z) and therefore redistributes thermal energy received from the combustion region (8030) to cathode air passing through the middle and lower volumes of the cathode chamber (8055) and the cathode input manifold (9070) and to the SOFC tubes (8010) and walls of the intermediate enclosure. Applicants note that a single core side wall such as either one of core side wall (8205) or (8210) is usable to provide the desired passive reduction in the thermal gradient between the core top portion (8215) and only core side wall without deviating from the present technology.

A significant benefit of the thermal gradient reduction along the gas flow axis (z) is a thermal gradient reduction along the SOFC stack (8005) along the gas flow (z) axis. By expanding the surface area of the anode and cathode layers that are maintained at an optimal SOFC reaction temperature, an SOFC reaction yield is increased, e.g. as measured in DC current generation per unit of syngas delivery. When only a portion of the anode and cathode surface area is participating in the SOFC reaction because non-participating portions of the anode and cathode surface area are not at optimized reaction temperature, or when the cathode gas flow is not at optimized reaction temperature, reducing the thermal gradient, as described above, tends to convert non-participating SOFC reaction portions of the SOFC system to participating portions thereby increasing electrical current output.

A second benefit is that a more uniform temperature of the SOFC stack along the gas flow axis (z) potentially decreases damage to the SOFC fuel cells and other components caused by thermal expansion mismatch. The fuel cells are formed by three ceramic layers that each have a different coefficient of thermal expansion. Cracking or separation of the three ceramic layers is a common failure mode when the length change of each material layer along the gas flow axis (z) during thermal cycling, e.g. start up or shut down, is different. Any reduction in a temperature gradient along the gas flow axis (z) potentially decreases damage to the SOFC fuel cells. Similarly, the hot zone enclosure assembly (8042) includes three walls, the thermally conductive core (8200) and the two protective layers (8220, 8250) formed from two different materials each having a different coefficient of thermal expansion. Separation and deformation of the three metal layers is a potential failure mode during thermal cycling when the different wall material expand at different rates. The reduction in temperature gradient variation along the gas flow axis (z) potentially decreases damage to the U-shaped hot zone enclosure assembly walls during thermal cycling.

Thermal conduction is described as a rate of thermal energy transfer (per unit time), also called heat flow or flux, which can be expressed in Watts or joules per second. Equation 1 below defines flux Q as, $$Q = k\, A/d(\Delta T) \qquad \text{EQUATION 1}$$

wherein (Q) is the rate of thermal energy transfer in Watts, (k) is the coefficient of thermal conductivity in W/(m° K), (A) is the area of the thermally conductive pathway e.g. in meters squared (m$^2$), (d) is the length of the conduction pathway, in meters, and ($\Delta T$) is the temperature gradient expressed in degrees Kelvin. In the case of the thermally conductive core of the present embodiment, the length of the thermally conductive pathway (d) is equal to the linear distance from the center of the thermally conductive core top portion (8215) to a bottom edge of one of the side portions (8205) and (8210). The dimensions of the area (A) are the product of the thickness of thermally conductive pathway and the length of the thermally conductive pathway e.g. along the stack length axis (x).

In a sample calculation, based on a thermal gradient $\Delta T$ of 200° K, a coefficient of thermal conductivity of 350 W/(m° K), a core thickness of 2.5 mm (0.0025 m) and a length dimension (d) of 0.4 m, a unit area of the core material e.g. having square dimensions equal to the core thickness provides a heat flow or flux of 1.1 W per unit area wherein the unit area is a square with side dimensions of 2.5 mm (0.1 inches). When the area dimension is over the entire stack length dimension (e.g. 0.61 m or 24 inches), the heat flow or flux from thermal conductivity is 267 W through each side wall. By comparison when the core material has a coefficient of thermal conductivity of 50 W/(m° K) the heat flow or flux is 38.0 W through each side wall. Thus the thermally conductive core of the present embodiment potentially provides a 7× increase in heat flow through the thermally conductive core (8200) as compared to hot zone enclosure walls fabricated from a conventional high temperature environment material that has a coefficient of thermal conductivity of 50 W/(m° K) or less, e.g. steel alloys, including Hastelloy, as well as Monel and Inconel.

4.12.7 Black Body Characteristics

In addition to thermal conduction, the thermally conductive core (8200) has black body characteristics wherein energy radiated per unit surface area per unit time across all wavelengths is proportional to the black body temperature to the fourth power. Black body radiation is depicted in FIG. 7B and described above including black body energy radiated from gas flows. In the case of the thermally conductive core, radiation emitted thereby tends to be incident on the inner protective layer (8220) and on the outer protective layer (8250) and radiation absorbed by the thermally conductive core tends to be emitted by the inner protective layer (8220) and on the outer protective layer (8250).

Black body radiant emittance is described in equation 2 with the assumption that the emitter has a surface emissivity of one which it likely does not.

$$Q = \sigma A(T_{ir}^4 - T_s^4) \qquad \text{EQUATION 2}$$

wherein Q is the rate of thermal energy transfer per unit time, in Watts, A is the area of the radiating surface in m$^2$, a is the Stefan's constant, (5.6703×10$^{-8}$ W/s$^2$K$^4$), $T_{ir}$ is the temperature of the irradiating surface and Ts is the temperature of the surrounding walls in degrees Kelvin. As will be recognized, when thermal energy is thermally conducted, by the thermally conductive core (8200), from the core top portion (8215) to lower ends of the core side walls (8230, 8235), the temperature of the core top portion is decreased while the temperature of the core side wall portions is increased. The change in both wall temperatures alters the black body radiant emittance at each location in proportion to the fourth power of the temperature difference. In an exemplary comparison, assume that the temperature of the lower ends of the primary enclosure side walls (8065, 8070) is increased from 650° C. (923° K) to 700° C. (973° K), as a result of thermal conduction through the core and assume that the temperature of the surrounding wall surfaces is unchanged, e.g. 550° C. (823° K) and that the area of the radiation surface is one square centimeter (1.0×10$^{-4}$ m$^2$) as was used above. In this example, at a temperature of 650° C. the rate of thermal energy transfer (radiant emittance), is 1.514 W. At the increased temperature of 700° C., the rate of thermal energy transfer is 2.481 W, which is a 64% increase in radiant emittance per square centimeter

4.12.8 Temperature Measurements Demonstrate Passive Thermal Gradient Reduction Referring now to FIGS. 10A, 10B, 11A and 11B, the passive reduction of thermal gradient along the gas flow axis (z) of a plurality of individual fuel cells mounted on a test fixture is demonstrated by temperature measurements made by five thermocouple devices. FIG. 10A schematically depicts five SOFC fuel cells (10005) arranged on a test fixture (10000). The SOFC fuel cells are tube shaped with a cylindrical outer wall surrounding a fluid conduit. An anode surface is formed onto an inside diameter of fluid conduit of each fuel cell and a cathode surface is formed onto an outside diameter of each fuel cell. The test fixture includes a fuel input manifold (10010) disposed to support each fuel cell from a bottom end thereof. A syngas flow is delivered into each tube fluid conduit by the fuel input manifold. A cathode chamber is formed by enclosing the test fixture fuel cells within a test enclosure designed to provide the same functionality as the hot zone enclosure assembly (8042) described above. As described below, two test enclosure units were constructed. A first test enclosure does not include the thermally conductive core of the present technology and a second test enclosure that includes the thermally conductive core of the present technology.

The test fixture includes five thermocouples (TC1 through TC5) located at five locations indicated by five star symbols (10030), shown in FIG. 10A. The five thermocouples (TC1-TC5) are distributed along the gas flow axis (z) and are evenly spaced apart. The thermocouples are mounted between the fuel cells (10005) or proximate to a surface of one of the fuel cells. The length of each fuel cell (10005) along the gas flow axis (z) is selected to match desired fuel cell dimensions, e.g. 150-300 mm (6-12 inches). Thermocouple TC5 is positioned approximately 15 mm, (0.6 inches) from SOFC stack upper end and the remaining thermocouples evenly distributed along the cell length. Each thermocouple (TC1 through TC5) was electrically interfaced with an electronic controller, not shown. The electronic controller is configured to receive temperature signals from each of the five thermocouples, to process the temperature signals, e.g. to compare the temperature signals to a temperature calibration table, to store a series of temperature signals detected by each thermocouple over a time duration and to determine average temperature values over given time periods.

During a first set of temperature measurements, each of the five thermocouples was operated to monitor temperature at each of the five star locations (10030) over a two and one half hour start-up through cool-down operating cycle to record temperature data at predetermined time intervals and to calculate an average temperature. The first set of temperature measurements was recorded as the test fixture was heated from a cold start to an operating temperature corresponding with generating electrical current output, recorded during the entire time the test fixture was generating electrical current and recorded as the test fixture was cooling down to the cold start temperature. In the present example, the operating temperature corresponding with generating electrical current output was maintained for about one and a half hours and the start-up and cool down phase each lasted about 30 minutes.

During the first set of temperature measurements the test fixture was operated inside a furnace without installing a thermally conductive core to enclose the stack.

The first set of temperature measurements is shown graphically in FIG. 10B by the black bars (10035) wherein each black bar indicates the average temperature corresponding with one thermocouple during steady state operation. The dashed lines (10050) extend between each black bar (10035) and one of the thermocouples (TC1-TC5) to indicate which thermocouple the average temperature value relates to. Each temperature measurement corresponding with a black bar (10035) is an average temperature measured by the corresponding thermocouple during electrical current output by the test fixture. As shown by the black bars (10035) the average temperature measured at TC1 is approximately 775° C., the average temperature measured at TC2 is approximately 700° C., the average temperature measured at TC3 is approximately 720° C., the average temperature measured at TC4 is approximately 630° C. and the average temperature measured at TC5 is approximately 640° C. The temperatures were averaged over about a one hour operating cycle.

During the second set of temperature measurements the test fixture was operated with the second test enclosure assembly that did include a thermally conductive core. The second test enclosure assembly used the U-shaped primary enclosure wall assembly (8045) described above that included the inner protective layer (8220), the thermally conductive core (8200) and the outer protective layer (8250) as shown in FIG. 9C. The inner protective layer (8220) and outer protective layer (8250) of the second test enclosure assembly were formed from the Monel which has a coefficient of thermal conductivity of about 22.8 (W/m° K) and the thickness of the inner and outer protective layers was about 4.0 mm (0.16 inches). The thermally conductive core (8200) of the second test enclosure was formed from a copper alloy that had a coefficient of thermal conductivity of about 350 (W/m° K) and the thickness of the thermally conductive core corresponding with the second test enclosure was about 3.0 mm (0.12 inches).

The second set of temperature measurements corresponding with the second test enclosure is shown graphically in FIG. 10B by the white-striped bars (10040) wherein each white-striped bar is associated with one thermocouple as indicated by the dashed lines (10050) that extend between each white-striped bar (10040) and one of the thermocouples (TC1-TC5). Each temperature measurement corresponding with a white-striped bar is an average temperature recorded during the period when the test fixture was generating electrical current output. As show by the white-striped bars (10040) the average temperature measured at TC1 is approximately 710° C., the average temperature measured at TC2 is approximately 720° C., the average temperature measured at TC3 is approximately 730° C., the average temperature measured at TC4 is approximately 740° C. and the average temperature measured at TC5 is approximately 710° C.

As predicted in the description above, the thermal gradient along the stack gas flow axis (z) is reduced by addition of the copper core in the second test fixture. The temperature measurement data for the first set of temperature values measured using the first test enclosure assembly that does not include a thermally conductive core and the second set of temperature values measured using the second test enclosure assembly (that includes the thermally conductive core) are listed in Table 1 below. As is readily apparent from the data listed in Table 1 and shown graphically in FIG. 10B, addition of the thermally conductive core to the second test enclosure assembly reduces the thermal gradient along the gas flow axis (z) of the test fixture fuel cells (10005). Applicants further note that in the second data set corresponding with the second test enclosure assembly that includes the thermally conductive core, the highest temperature measured was at TC4 indicating that addition of the thermally conductive core actually shifts the position of peak temperature away from the combustion region (8030) to a point that is below the mid-point of the fuel cells.

TABLE 1

| Temperature change (° C.) at each temperature measurement location | | | | | | |
|---|---|---|---|---|---|---|
| Thermocouple ID | TC1 | TC2 | TC3 | TC4 | TC5 | Temperature range |
| Test 1 no core | 775 | 700 | 720 | 630 | 640 | 145° C. between TC1 and TC4 |
| Test 2 core included | 710 | 720 | 730 | 740 | 710 | 30° C. between TC4 and TC1 and between TC4 and TC5 |

TABLE 1-continued

Temperature change (° C.) at each temperature measurement location

| Thermocouple ID | TC1 | TC2 | TC3 | TC4 | TC5 | Temperature range |
|---|---|---|---|---|---|---|
| Temperature change Test 1 to test 2 | −65 | +20 | +10 | +110 | +70 | |

FIG. 11A graphically depicts temperature measurement data recorded during the first test cycle utilizing the first test enclosure assembly that does not include a thermally conductive core. A vertical axis of the graphical representation represent of FIG. 11A corresponds with temperature in ° C. as measured by the five thermocouples and a horizontal axis of FIG. 11A corresponds with time in hours. The graphical representation of FIG. 11A includes five different temperature vs time plots with one plot corresponding with for each of the five thermocouple locations. A legend (10045) shows which data plots correspond with which thermocouple location (TC1, TC2, TC3, TC4, TC5).

Similarly, FIG. 11B graphically depicts temperature measurement data recorded during the second test cycle utilizing the second test enclosure assembly that does include a thermally conductive core. A vertical axis of the graphical representation represent of FIG. 11B corresponds with temperature in ° C. as measured by the five thermocouples and a horizontal axis of FIG. 11B corresponds with time in hours. The graphical representation of FIG. 11B includes five different temperature vs time plots with one plot corresponding with for each of the five thermocouple locations. A legend (10055) shows which data plots correspond with which thermocouple location (TC1, TC2, TC3, TC4, TC5).

A comparison of the two plots reveals that during the startup cycle, when the temperature of the thermocouples increases from 100° C. to above 700° C. over a period of about 30 minutes, the rate of temperature increase at each of the five thermocouple positions was nearly the same when the thermally conductive core was in place (FIG. 11B) and clearly not the same without the thermally conductive core in place, (FIG. 11A). This is apparent when comparing the startup period of FIG. 11A with the start-up period of FIG. 11B. FIG. 11A indicates that the rate of temperature increase in ° C./unit time was greatest at the thermocouple position (TC1) and least at the thermocouple position (TC5). Conversely, FIG. 11B indicates that the rate of temperature increase in ° C./unit time was much more uniform at over the five thermocouple positions (TC1, TC2, TC3, TC4, TC5) throughout the start up period.

When different portions of individual fuel cells (8010) are heated at different rates, this can lead to layer cracks and or chipping of the fuel cell ceramic layers as well as failures of the interfaces between ceramic and metallic components in the stack. Similarly, when different portions of the hot zone enclosure assembly walls are heated at different rates, this can lead to layer delamination and or buckling of the thermally conductive core and the inner and outer protective layers.

4.12.9 Additional SOFC System Embodiments

Referring now to FIG. 12, a non-limiting exemplary SOFC system (12000) includes two hot zone enclosure assemblies (12042). The two hot zone enclosure assemblies are each disposed inside an intermediate enclosure (9000), shown in FIGS. 9, 16B and 17, and spaced apart along the stack transvers with axis (y). Each hot zone enclosure assembly (12042) includes an SOFC stack (8005), a fuel input manifold (8015) that is fluidly connected to a fuel reformer (8035) by a fuel delivery conduit (8040) and a L-shaped primary enclosure wall assembly (12045). Each SOFC stack (8005) is enclosed within a different cathode chamber (12055). Each cathode chamber (12055) is bounded in part by one of the L-shaped primary wall assemblies (12045) and in part by intermediate enclosure base wall (9010) side walls (9015 or 9020), shown in FIG. 13. Additionally, each cathode chamber can be bounded by opposing primary enclosure end walls (8080, 8085) and a primary enclosure base wall (8075) shown in FIG. 9C.

FIG. 13 depicts two L-shaped primary enclosure wall assemblies (12045), with one disposed over a first SOFC stack (8005) and the other disposed over another SOFC stack (8005). As shown in FIG. 13A each L-shaped primary enclosure wall assembly (12045) is formed with three wall portions, combustion region curved wall portion (12062), combustion region a flat wall portion (12064) extending from a first edge of the curved wall portion and a primary enclosure sidewall (12070) extending from a second edge of the curved wall portion. The combined curved wall portion (12060) and combustion region flat wall portion (12064) provide and upper boundary of a cathode chamber (12055), described below, and form an upper boundary of the combustion region (8030) in order to receive thermal energy therefrom. The sidewall portion extends from an edge of the curved wall portion and is disposed along the gas flow axis (z) between SOFC tube output ends (8025) and SOFC tube input ends (8020).

Each L-shaped primary enclosure wall assembly (12045) defines a cathode chamber (12055). The cathode chamber (12055) encloses a corresponding SOFC stack (8005) and a combustion region (8030) such that the cathode layer formed on outside surfaces of each individual fuel cell (8010) is exposed to the cathode chamber (12055). Cathode chambers (12055) are bounded in part by a corresponding L-shaped primary enclosure wall assembly (12045), by an intermediate enclosure side wall (9015 or 9020) and by the intermediate enclosure bottom wall (9010) or by the fuel input manifold (8015), or another bottom wall e.g. (8075) shown in FIG. 9C. Each L-shaped primary enclosure wall assembly (12045) defines a different cathode chamber (12055).

The SOFC system (12000) includes a recuperator chamber (9050) and a hot zone exhaust conduit (9055) each formed inside the intermediate enclosure (9000). The recuperator chamber (9050) and hot zone hot zone exhaust conduit (9055) together form a counter flow gas to gas heat exchanger described above in the description of FIGS. 7A and 7B. Ambient temperature cathode air flow is received into the recuperator chamber (9050) through the cathode input port (9040) and exhaust gases are expelled from the exhaust conduit through a hot zone exhaust port (9045).

Inside the recuperator chamber (9050) incoming cathode air flow, e.g. ambient temperature air, is heated by convection and by radiation being emitted from walls of the recuperator chamber and especially a shared wall (9075) which separates the hot zone exhaust conduit (9055) from the recuperator chamber (9050). The heated cathode air flow is forced through the recuperator chamber (9050) and exits from the recuperator chamber through one or more recuperator exit ports (9065) to a cathode input manifold (13070). The cathode air flow source includes a variable speed air moving device (e.g., a fan) that can be controlled to increase or decrease the flow rate of the incoming cathode air flow in accordance with electrical output demands and other process control commands.

The hot zone exhaust conduit (9055) receives a hot gas mixture from two combustion zones (8030) through two combustion exhaust ports (9060) wherein each combustion exhaust port (9060) extends from one of the two combustion regions (8030) to the hot zone exhaust conduit (9055). Inside the hot zone exhaust conduit (9055) the hot gas mixture is cooled as energy is convectively and radiatively transferred to the walls of the hot zone exhaust conduit (9055). The hot gas mixture passes from the combustion region (8030) through the exit the SOFC hot zone through the hot zone hot zone exhaust port (9045) and finally exits the SOFC hot zone through the hot zone hot zone exhaust port (9045).

Each of the recuperator chamber (9050) and the hot zone exhaust conduit (9055) is preferably disposed along the full length of the SOFC stack along the stack length axis (x). Each of the cathode input port (9040), the hot zone exhaust port (9045), and the two combustion exhaust port (9060) can be implemented as a single instance of all three ports e.g. posited at the center or at one end of the stack length along the length axis (x) or a plurality of cathode input ports (9040), hot zone exhaust ports (9045) and combustion exhaust ports (9060) can be spaced apart along the stack length axis (x) to more uniformly distribute cathode air flow to individual fuel cells and to more uniformly distribute exhaust gases from the SOFC hot zone. The port apertures may be circular, slotted, or other port shaped instances that are disposed along the stack length axis (x). Alternately, each of the recuperator chamber (9050) and the hot zone exhaust conduit (9055) can be implemented as a single chamber instance extending along the entire stack length axis (x) or the recuperator chamber and exhaust conduit can be configured as a plurality of separate chamber and conduit instances disposed side by side along the stack length axis (x), with each separate chamber instance provided with its own cathode input port (9040), and/or the hot zone exhaust port (9045) and with one combustion exhaust port (9060) for each cathode chamber.

As shown in FIG. 12, a single cathode input manifold (13070) is shared by the two cathode chambers (12055). A cathode input manifold (13070) top boundary is defined by a exhaust conduit bottom wall (9059). Opposing cathode input manifold side boundaries are defined by outside surfaces of each of the two L-shaped primary enclosure wall assemblies (12045) and the cathode input manifold (13070) has a bottom boundary defined by the intermediate enclosure bottom wall (9010) or another bottom wall (8070) described above, or both. Each end of the cathode input manifold (13070) can be bounded by intermediate enclosure end walls (9025, 9030) or by end walls (8065, 8085) described above.

Cathode gas flow is shown in FIG. 12 by solid flow lines with arrows. The cathode air flow enters through the cathode input port (9040), passes through the recuperator chamber (9050) and then enters the cathode input manifold (13070) through each of two recuperator exit ports (9065). Inside the cathode input manifold (13070) the cathode air flow is guided downward from the recuperator exit ports (9065) to enter two sets of cathode chamber input ports (8095), with one set of cathode flow passages corresponding with each L-shaped primary enclosure wall (12045). The cathode air then passes from the cathode input manifold (13070) to each of the two cathode chambers (12055). Inside the cathode chambers, the cathode gas flows upward past the exposed cathode surfaces of the SOFC stack until reaching the combustion region (8030) where spent cathode air flow is mixed with spent fuel. The further flow path of the mixture of spent fuel and spent cathode air is indicated by dashed flow lines with arrows which show the mixture flowing from the combustion region (8030) through the two combustion exhaust ports (9060), one for each cathode chamber, and through the hot zone exhaust conduit (9055) where the mixture transfers thermal energy to the shared wall (9075) and other wall surfaces before exiting the SOFC system through the hot zone hot zone exhaust port (9045). The combustion region wall portions (12060) formed with a combustion region curved wall portion (12062) and the flat combustion region wall (12264) each extending from a different intermediate enclosure side was (9015) or (9020) side wall to form a top boundary of the corresponding cathode chamber (12055) and the primary enclosure sidewall (12070) extending from a second edge of the combustion region curved wall portion (12062) forms a side boundary of the corresponding cathode chamber (12055). The L-shaped primary enclosure wall (12045) is disposed along the full length of the stack length axis (x) and may extend further beyond the full stack length dimension.

Referring to FIGS. 13B, and 14, each L-shaped primary enclosure wall assembly (12045) includes a thermally conductive core (12200), protected by an inner protective layer (12220) and an outer protective layer (12250). Thermally conductive core (12200) is substantially similar in material, construction, function, and thermal characteristics as the thermally conductive core (8200) discussed herein in relation to FIGS. 7A, 7B, 8B, 9A, 9B, and 9C comprising a core material having a coefficient of thermal conductivity of more than 100 W/(m° K) and preferably more than 200 W/(m° K) such as one or more of copper, molybdenum, aluminum nickel, beryllium, iridium, rhodium, silver, tungsten, or alloys or combinations therefore that can be fabricated with a desired thermal conductivity and that can reliably meet the structural requirements at the hot zone operating temperatures. In a particular exemplary, non-limiting embodiment, thermally conductive core (12200) comprises a copper mass having a thermal conductivity approximately ranging from 370 W/(m° K) at 500° C. and 332 W/(m° K) at 1027° C.

The L-shaped primary enclosure wall assembly (12045) includes an inner protective layer (12220) and outer protective layer (12250) configured to protect the thermally conductive core wall (12200) from oxidation. Application of the inner protective layer and the outer protective layer (12220, 12250) is described above. In a first embodiment each of the inner protective layer (12220) and the outer protective layer (12250) comprises nickel plating applied to the thermally conductive core (12200) by an electro-plating process to a thickness of at least 0.0005 inches and ranging up to 0.002 inches or more. The nickel plating is applied in order to prevent oxygen diffusion there through at operating temperatures of 350 to 1200° C. In a second embodiment, the inner protective layer (12220) comprises an inner sheet metal layer formed to mate with inside surfaces of the thermally conductive core (12200) and the outer protective layer (12250) comprises and outer sheet metal layer formed to mate with outside surfaces of the thermally conductive core (12200) in order to prevent oxygen diffusion through either of the protective layers at operating temperatures of 350 to 1200° C.

The inner and outer protective sheet metal layers are fabricated with the same materials described above for inner protective layer (8220) and outer protective layer (8250) shown in FIG. 9C and described above. In an exemplary, non-limiting embodiment, each inner protective layer (12220) and outer protective layer (12250) is formed from a material that is resistant to corrosion and especially oxidation at SOFC operating conditions. In a preferred embodiment each inner protective layer (12220) and outer protective layer (12250) is fabricated from ferritic stainless steel such as Alloy18 SR® Stainless Steel, e.g. distributed by Rolled Metal Products, of Alsip, TL, US. As shown in FIG. 12, the inner protective layers (12220) face the cathode chamber (12055) and outer protective layers (12250) face cathode input manifolds (13070).

In an exemplary operating mode, thermal energy generated in combustion region (8030) is transferred by radiation and convection to combustion region wall (12060). The thermal energy absorbed by the combustion region wall is passively conducted through inner protective layer (12220) to the conductive core (12200). The thermal energy that reaches the conductive core is passively conducted, via conductive core (12200), to lower temperature regions of the thermally conductive core e.g. to a distal end of the primary enclosure side wall (12070). As a result, a temperature gradient present in the core (12200) is reduced. During steady state operation, a thermal gradient between the combustion region wall (12060) and the bottom end of the primary enclosure side wall (12070) is reduced. Thermal energy is exchanged, primarily via radiation, between each L-shaped primary enclosure wall assembly (12045) and SOFC cells (8010). However, when the thermal gradient between the combustion region wall and the sidewalls is reduced, a corresponding thermal gradient along the length of each SOFC cell along the gas flow axis z is also reduced. Thermal energy is conducted between the conductive core (12200) and the outer protective layer (12250). Thermal energy exchange, via conduction and convection, between the outer protective layer (12250) and cathode gas flowing within the cathode input manifolds (13070, 14070, 15070) heats the cathode gas.

Referring to FIG. 13B, in a non-limiting exemplary embodiment, L-shaped primary enclosure wall assembly (12045) includes inner protective layer (12220) formed as a single piece of material having an inner side wall portion (12230), an inner curved wall portion (12225) and an inner top wall portion (12227). Exemplary conductive core (12200) is preferably formed from a single piece of material having a core side wall portion (12210), a core curved wall portion (12215) and a core top wall portion (12217). As shown in FIG. 13B, outer protective layer (12250) is formed as three separate parts: an outer side wall portion (12260), a outer curved wall portion (12265), and outer top wall portion (12267). The inner protective layer (12220), the thermally conductive core (12200), and outer protective layer (12250) can be formed and joined together using any of the methods discussed in relation to the U-shaped primary enclosure wall assembly (8045) as illustrated in, for example, FIG. 9C.

Referring to FIG. 14 an SOFC system (14000) comprises a single L-shaped hot zone enclosure assembly (14042) enclosing a single SOFC stack (8005) and input fuel manifold (8015) and fuel delivery conduit (8040). The L-shaped hot zone enclosure assembly (14042) is described above in the description related to FIGS. 12-13B. The single L-shaped hot zone enclosure assembly (14042) is installed inside an intermediate enclosure (9000) sized to receive a single L-shaped hot zone enclosure assembly (14042). The intermediate enclosure provides a recuperator chamber (9050), a hot zone exhaust port (9045), a cathode input port (9040), a cathode input manifold (14070) and a cathode chamber (12055) all described above. An advantage of the SOFC hot zone (14000) is its compact size.

Referring to FIG. 15, an SOFC hot zone (15000) comprises a hot zone enclosure assembly (15042) shown in a schematic view. The hot zone enclosure assembly (15042) includes two SOFC stacks (8055), two fuel input manifolds (8015) and a U-shaped primary enclosure wall assembly (8045) each enclosing one of the two SOFC stacks and forming an isolated cathode chamber (8055) surrounding each SOFC stack as described herein in relation to FIGS. 7A, 7B, 9A, 9B, and 9C. A cathode input manifold (15070) is sized to receive the hot zone enclosure assembly (15042) therein and is bounded by inward facing surfaces of intermediate enclosure side walls (9015, 9020) and intermediate enclosure bottom wall (9010), by outward facing surfaces of each of the two U-shaped primary enclosure wall assemblies (8045), by the bottom wall (9059) of the hot zone exhaust conduit (9055), and by inward facing surfaces of hot zone enclosure end walls (8080, 8085) show in FIG. 9C.

4.12.10 Intermediate Enclosure

The hot zone enclosure wall assemblies (12045, 14045, 15042) each installs inside an intermediate enclosure (9000), shown in an isometric view in FIGS. 16b and 17. The intermediate enclosure is formed as a chamber comprising opposing intermediate enclosure top wall (9005) and intermediate enclosure bottom wall (9010), opposing intermediate enclosure side wall (9015) and intermediate enclosure side wall (9020) and opposing intermediate enclosure end wall (9025) and intermediate enclosure end wall (9030). The intermediate enclosure (9000) encloses fuel delivery conduits (8040) in a gap between intermediate enclosure end wall (9025) and hot zone enclosure end wall (8080). The intermediate enclosure includes a cathode input port (9040) for receiving a cathode air flow there through, and a hot zone exhaust port (9045) for expelling exhaust out therefrom. The intermediate enclosure includes a startup fuel inlet port (8145) for receiving a flow of fuel during a startup operating mode of the SOFC system and for directing the flow of fuel to each of startup burner element (8155). Each of the ports (8145), (9040), and (9045) passes through a wall of the intermediate enclosure as required to direct gas flow to receiving area interface. In a non-limiting exemplary embodiment, the fuel ports passes through one of the side walls (9015, 9020) and each of the cathode gas input port (9040) and the hot zone exhaust port (9045) pass through the intermediate enclosure top wall (9005). The intermediate chamber (9000) also encloses or partially encloses the recuperator chamber (9050) and a hot zone hot zone exhaust conduit (9055), hot zone exhaust port (9045), cathode input port (9040), combustion exhaust ports (9060, 9060a, 9060b), recuperator exit ports (9065) each of which function as described in relation to FIGS. 7A, 7B, and 8A.

4.12.11 Outer Enclosure

As shown in FIGS. 16A, 16B, and 17 the intermediate enclosure (9000) installs inside an insulating layer (2012) which preferably includes top and bottom portions, not shown, to thermally insulate the intermediate enclosure surfaces. The intermediate enclosure and the surrounding insulation layer each install inside an outer enclosure (16000). In a first non-limiting exemplary embodiment, outer enclosure (16000) includes two opposing outer enclosure side walls (16015) and two opposing outer enclosure end walls (16010), an outer enclosure top wall (16005) and an opposing outer enclosure bottom wall (16002). Preferably the outer enclosure walls are thermally insulated from the intermediate enclosure (9000). In a preferred embodiment the thermal insulation layer (2012) is disposed between the inner enclosure (9000) and the outer enclosure (16000) and is configured to prevent a temperature of the outer walls from exceeding a maximum temperature, e.g. 60° C. greater than ambient temperature. The outer enclosure is formed to provide various input and output ports to interface with anode gas fuel and cathode air conduits, exhaust gas exit ports, electrical power output from the SOFC stack and an interface to a control system which include temperature and electrical power sensors, fluid flow meters, and other control elements as may be required. Preferably the outer enclosure is formed with a structural integrity designed to protect the inner intermediate enclosure, the fuel cells, and other internal systems from damage from shock or moisture and to prevent contaminants from escaping from the SOFC hot zone and/or from entering the SOFC hot zone from outside.

The outer enclosure (16000) is preferably formed by metal walls e.g. steel, stainless steel, aluminum or the like. In some embodiments, the outer enclosure or portions of the outer enclosure or elements extending from inside the outer enclosure may be utilized as a radiator to radiate thermal energy that has been absorbed from inside the SOFC system, e.g. from the fuel reformer, exhaust gas passages, or recuperator to air surrounding the SOFC hot zone. All patents, patent applications and other references disclosed herein are hereby expressly incorporated in their entireties by reference.

It will also be recognized by those skilled in the art that, while the technology has been described above in terms of preferred embodiments, it is not limited thereto. Various features and aspects of the above described technology may be used individually or jointly. Further, although the technology has been described in the context of its implementation in a particular environment, and for particular applications (e.g. Solid oxide fuel cell systems), those skilled in the art will recognize that its usefulness is not limited thereto and that the present technology can be beneficially utilized in any number of environments and implementations where it is desirable to increase thermal energy transfer by thermal conduction using high thermal conductivity materials at high temperatures and in corrosive environments. Accordingly, the claims set forth below should be construed in view of the full breadth and spirit of the technology as disclosed herein.

What is claimed is:

1. A Solid Oxide Fuel Cell (SOFC) system, comprising:
an elongated SOFC stack disposed inside a hot zone cavity along an axis, wherein the elongated SOFC stack has a top end and a bottom end and wherein the top end is disposed within a top portion of the hot zone cavity;
a combustion region for combusting mixed fuel and air is disposed within the top portion of the hot zone cavity; and
a unitary thermal mass enclosing the top portion of the hot zone cavity, at least one side of the hot zone cavity, and the combustion region, the unitary thermal mass extending from the top of the hot zone cavity toward the bottom end of the SOFC stack along the axis to enclose a side of the hot zone cavity,
wherein a portion of the unitary thermal mass is:
a primary wall assembly configured to enclose a cathode chamber therein, the primary wall assembly comprising one or more inner surfaces facing the cathode chamber and one or more outer surfaces opposing the one or more inner surfaces, the primary wall assembly formed to provide one or more uninterrupted thermally conductive pathways extending between different regions of the primary wall assembly; and
the elongated SOFC stack is enclosed by the primary wall assembly and disposed within the cathode chamber;
further comprising:
an intermediate enclosure configured to enclose a primary wall assembly with a cathode manifold formed internal to the intermediate enclosure and external to the primary wall assembly, wherein at least one of the one or more outer surfaces of the primary wall assembly forms a surface of the cathode manifold;
wherein the second portion transfers heat to a cathode air flow passing through the cathode flow manifold and over the at least one of the one or more outer surfaces of the primary wall assembly by heat exchange outside of the primary enclosure.

2. A Solid Oxide Fuel Cell (SOFC) system as recited in claim 1, further comprising at least one of the outer layer on the primary wall assembly that forms an oxide layer during operation of the SOFC stack, wherein the outer layer on the primary wall assembly forms a wall of the cathode flow manifold.

3. A Solid Oxide Fuel Cell (SOFC), comprising:
an elongated SOFC stack disposed inside a hot zone cavity along an axis, wherein the elongated SOFC stack has a top end and a bottom end and wherein the top end is disposed within a top portion of the hot zone cavity;
a combustion region for combusting mixed fuel and air is disposed within the top portion of the hot zone cavity; and
a unitary thermal mass enclosing the top portion of the hot zone cavity, at least one side of the hot zone cavity, and the combustion region, the unitary thermal mass extending from the top of the hot zone cavity toward the bottom end of the SOFC stack along the axis to enclose a side of the hot zone cavity,
wherein a portion of the unitary thermal mass comprises a hot zone enclosure assembly for balancing temperature in a solid oxide fuel cell (SOFC) stack, the hot zone enclosure assembly comprising:
a combustion region wall defining a top wall of the hot zone cavity and a top wall of the combustion region around the outlet end of the SOFC stack for collecting anode fuel and cathode air exiting the SOFC stack, wherein the anode fuel and the cathode air, burn and generate heat in the combustion region so that the heat is absorbed by the combustion region wall during operation of the SOFC system; and
a sidewall depending from the combustion region wall along the SOFC stack, wherein: the sidewall and the combustion region wall are formed as a unitary element; the sidewall has a distal end adjacent an inlet end of the SOFC stack; the side wall is configured as a thermally conductive pathway extending from the combustion region wall toward the distal end of the sidewall such that the absorbed heat passes by conduction toward the distal end of the sidewall; and the sidewall is configured to radiate thermal energy such that absorbed heat radiates between the sidewall and the SOFC stack to balance temperature along the SOFC stack.

4. A Solid Oxide Fuel Cell (SOFC) system as recited in claim 3 further comprising:
a second sidewall depending from the combustion region wall opposing the sidewall; a hot zone enclosure base wall coupled to the sidewall and the second sidewall; and
first and second hot zone enclosure end walls coupled to the combustion region wall, the sidewall, and the second sidewall to enclose the SOFC stack and the combustion region within the hot zone enclosure;
wherein the combustion region wall, the side wall, and the second side wall form the unitary thermal mass and wherein the combustion region is enclosed by no more than three walls comprising the unitary thermal mass.

5. A Solid Oxide Fuel Cell (SOFC) system as recited in claim 3, wherein the combustion region wall comprises a thermally conductive core.

6. A Solid Oxide Fuel Cell (SOFC) system as recited in claim 5, wherein the thermally conductive core-:-has a coefficient of thermal conductivity that is greater than 100 W/m° Kat a temperature of350° C.

7. A Solid Oxide Fuel Cell (SOFC) system as recited in claim 3, the combustion region comprising a burner element disposed therein for providing a flow of fuel and air during a startup of the SOFC system, wherein the fuel and air burn and generate heat in the combustion region so that the heat is absorbed by the combustion region wall and conducted away from the combustion region during the startup of the SOFC system.

8. A Solid Oxide Fuel Cell (SOFC) system as recited in claim 3, wherein the SOFC stack includes a first row of SOFC cells and a second row of SOFC cells separated from each other by the sidewall, the sidewall disposed between the first row and the second row.

9. A Solid Oxide Fuel Cell (SOFC) system as recited in claim 3, wherein the SOFC stack is at least two rows of SOFC cells, wherein the sidewall comprises a first outer sidewall depending from the combustion region wall and enclosing a first of the at least two rows with the sidewall and wherein the sidewall further comprises a second outer sidewall depending from the combustion region wall and enclosing a second of the at least two rows with the sidewall, wherein the first and second outer sidewalls receive heat from the combustion region wall by thermal conduction and radiate heat to the inlet end of the SOFC stack.

10. A Solid Oxide Fuel Cell (SOFC) system as recited in claim 3, further comprising an intermediate enclosure, wherein the hot zone enclosure assembly is disposed within the intermediate enclosure, and wherein an air gap comprising a cathode flow manifold is disposed external to the hot zone enclosure assembly and within the intermediate enclosure.

11. A Solid Oxide Fuel Cell (SOFC) system as recited in claim 10, wherein the SOFC stack comprises at least a first row of SOFC cells and a second row of SOFC cells, the intermediate enclosure comprising a first intermediate enclosure side wall and a second intermediate enclosure side wall opposing the first intermediate enclosure side wall,
the hot zone enclosure further comprising:
a second combustion region wall and a second sidewall depending from the second combustion region wall, the second combustion region wall and second sidewall comprising a second thermal mass;
wherein the first row of SOFC cells is disposed in a first cathode chamber at least partially enclosed by the combustion region wall, the sidewall, and the first intermediate enclosure side wall;
the second row of SOFC cells is disposed in a second cathode chamber at least partially enclosed by the second combustion region wall, the second sidewall, and the second intermediate enclosure side wall; and
wherein the cathode flow manifold extends between the sidewall and the second sidewall.

12. A Solid Oxide Fuel Cell (SOFC) system as recited in claim 4, further comprising an intermediate enclosure, wherein the hot zone enclosure assembly is disposed within the intermediate enclosure, and wherein an air gap comprising a cathode flow manifold is disposed external to the hot zone enclosure assembly and within the intermediate enclosure;
wherein the combustion region wall, the sidewall, and the second sidewall form a U-shaped primary wall enclosure and wherein the cathode flow manifold is disposed between the U-shaped primary wall enclosure and the intermediate enclosure.

13. A Solid Oxide Fuel Cell (SOFC) system as recited in claim 6, wherein the intermediate enclosure has a coefficient of thermal conductivity that is less than 100 W/mK at a temperature of 350° C.

14. A Solid Oxide Fuel Cell (SOFC) system comprising:
an elongated SOFC stack disposed inside a hot zone cavity along an axis, wherein the elongated SOFC stack has a top end and a bottom end and wherein the top end is disposed within a top portion of the hot zone cavity;
a combustion region for combusting mixed fuel and air is disposed within the top portion of the hot zone cavity; and
the hot zone cavity further comprising a start-up combustion region disposed within the top portion of the hot zone cavity, the start-up combustion region comprising a burner element disposed between the outlet end of the SOFC stack and the unitary thermal mass,
the burner element for providing fuel for combustion during a start-up of the SOFC system, wherein the unitary thermal mass is disposed to absorb thermal energy generated by combustion of the fuel during the start-up and to conduct the thermal energy from the start-up combustion region through the unitary thermal mass to other regions of the unitary thermal mass and to radiate the thermal energy between the unitary thermal mass and the SOFC stack.

15. A Solid Oxide Fuel Cell (SOFC) system comprising:
an elongated SOFC stack disposed inside a hot zone cavity along an axis, wherein the elongated SOFC stack has an outlet end and an inlet end; and
a thermal mass receiving heat from the hot zone cavity, conducting heat from the outlet end to the inlet end along the axis, and radiating heat to the inlet end radially with respect to the axis;
wherein the hot zone cavity has a bottom end adjacent to the inlet end and a top end in which the outlet end is disposed and the thermal mass encloses the top end of the hot zone cavity and extends along the axis toward the inlet end of the SOFC stack to enclose a side of the hot zone cavity;
the thermal mass comprising a unitary thermally conductive core and an inner protective layer, wherein the inner protective layer comprises an inner surface facing the hot zone cavity and an outer surface opposing the inner surface, wherein the unitary thermally conductive core is mounted on the outer surface of the inner protective layer in thermally conductive contact with the inner protective layer, wherein the inner protective layer is formed and disposed to receive heat from the cathode chamber at a first location and to conduct the heat to the thermally conductive core, and the thermally conductive core is formed and disposed to conduct heat from the top end to other portions of the thermal mass and to communicate thermal energy by radiation between the thermal mass and the SOFC stack.

16. A Solid Oxide Fuel Cell (SOFC) system as in claim 15, further comprising a combustion region disposed at the outlet end, the SOFC stack and the combustion region disposed within the hot zone cavity and enclosed by the thermal mass; the combustion region for burning fuel during a system startup and for burning a mixture of spent cathode and anode gas during operation of the SOFC system, the combustion region comprising a burner element for providing a flow of fuel and air into the combustion region during the system startup; and the inner protective layer formed and disposed to receive heat from the combustion region and to conduct the heat to the thermally conductive core, and the thermally conductive core formed and disposed to conduct heat from the outlet end toward the inlet end.

17. A Solid Oxide Fuel Cell (SOFC) system as in claim 15, wherein a coefficient of thermal conductivity of the thermal mass has a value greater than a value of a coefficient of thermal conductivity of the inner protective layer at an operating temperature of the SOFC stack.

18. A Solid Oxide Fuel Cell (SOFC) system as in claim 15, further comprising an intermediate enclosure, wherein the thermal mass comprises a hot zone enclosure assembly, the hot zone cavity disposed within the hot zone enclosure assembly, wherein the hot zone enclosure assembly is disposed within the intermediate enclosure with an air gap external to the hot zone enclosure assembly and internal to the intermediate enclosure; wherein the air gap forms a cathode air manifold for providing a flow of cathode air to the cathode chamber, wherein the thermal mass transfers thermal energy to cathode air flowing through the cathode-manifold.

19. A Solid Oxide Fuel Cell (SOFC) system as in claim 18, the thermal mass having a coefficient of thermal conductivity having a value greater than a value of a coefficient of thermal conductivity of the intermediate enclosure at an operating temperature of the SOFC stack.

* * * * *